（12) United States Patent
Itoh et al.

(10) Patent No.: US 9,494,355 B2
(45) Date of Patent: Nov. 15, 2016

(54) REFRIGERANT CYCLE DEVICE

(71) Applicant: DENSO CORPORATION, Kariya, Aichi-pref. (JP)

(72) Inventors: Satoshi Itoh, Kariya (JP); Atsushi Inaba, Okazaki (JP); Mikiharu Kuwahara, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 3 days.

(21) Appl. No.: 14/622,967

(22) Filed: Feb. 16, 2015

(65) Prior Publication Data
US 2015/0159933 A1 Jun. 11, 2015

Related U.S. Application Data

(62) Division of application No. 13/438,216, filed on Apr. 3, 2012, now Pat. No. 8,984,903.

(30) Foreign Application Priority Data

Apr. 4, 2011 (JP) ................ 2011-082761
Jun. 15, 2011 (JP) ................ 2011-133584
Mar. 19, 2012 (JP) ................ 2012-061367

(51) Int. Cl.
*F25B 49/02* (2006.01)
*F24F 3/14* (2006.01)
(Continued)

(52) U.S. Cl.
CPC ......... *F25B 49/022* (2013.01); *B60H 1/00921* (2013.01); *F24F 3/1405* (2013.01); *F25B 41/04* (2013.01); *B60H 1/00807* (2013.01); *F25B 2341/066* (2013.01); *F25B 2600/2513* (2013.01)

(58) Field of Classification Search
CPC F25B 41/04; F25B 49/022; F25B 2341/066; F25B 2600/2513; B60H 1/00807; B60H 1/00921; F24F 3/1405
See application file for complete search history.

(56) References Cited

U.S. PATENT DOCUMENTS 5,305,822 A 4/1994 Kogetsu et al.
5,419,149 A 5/1995 Hara et al.
(Continued)

FOREIGN PATENT DOCUMENTS

JP 05-231731 9/1993
JP 6-341732 12/1994
(Continued)

OTHER PUBLICATIONS

Office Action dated Mar. 24, 2015 in the corresponding JP application No. 2012-061367.

*Primary Examiner* — Marc Norman
(74) *Attorney, Agent, or Firm* — Harness, Dickey & Pierce, P.L.C.

(57) ABSTRACT

A refrigerant cycle device includes a first refrigerant passage for guiding refrigerant from a refrigerant radiator to an inlet side of an outdoor heat exchanger, a first throttle part capable of varying an opening area of the first refrigerant passage, a second refrigerant passage for guiding the refrigerant from the outdoor heat exchanger to a compressor-suction side, a first opening/closing part for opening/closing the second refrigerant passage, a third refrigerant passage for guiding the refrigerant from the outdoor heat exchanger to the compressor-suction side via an evaporator, a second throttle part capable of varying an opening area of the third refrigerant passage, a bypass passage for guiding the refrigerant flowing between the refrigerant radiator and the first throttle part to a position between the outdoor heat exchanger and the second throttle part in the third refrigerant passage, and a second opening/closing part for opening/closing the bypass passage.

4 Claims, 47 Drawing Sheets

(51) Int. Cl.
*F25B 41/04* (2006.01)
*B60H 1/00* (2006.01)

(56) References Cited

U.S. PATENT DOCUMENTS

| | | |
|---|---|---|
| 5,526,650 A | 6/1996 | Iritani et al. |
| 5,560,217 A * | 10/1996 | Takahashi ......... B60H 1/00392 62/200 |
| 5,634,348 A | 6/1997 | Ikeda et al. |
| 6,422,308 B1 | 7/2002 | Okawara et al. |
| 6,826,921 B1 | 12/2004 | Uselton |
| 7,434,415 B2 | 10/2008 | Knight et al. |
| 7,461,517 B2 | 12/2008 | Kurosawa |

FOREIGN PATENT DOCUMENTS

| | | |
|---|---|---|
| JP | 1994-341732 A | 12/1994 |
| JP | H07-132729 | 5/1995 |
| JP | 2000-16072 | 1/2000 |
| JP | 3645324 | 5/2005 |
| JP | 2006-242402 | 9/2006 |

* cited by examiner (COOLING OPERATION)

(HEATING OPERATION)

(DEHUMIDIFYING AND HEATING OPERATION)

(COOLING OPERATION)

(HEATING OPERATION)

(DEHUMIDIFYING AND HEATING OPERATION)

(COOLING OPERATION)

(HEATING OPERATION)

(DEHUMIDIFYING AND HEATING OPERATION)

REFRIGERANT CYCLE DEVICE

CROSS REFERENCE TO RELATED APPLICATION

This application is a divisional of U.S. patent application Ser. No. 13/438,216 filed on Apr. 3, 2012. This application is based on Japanese Patent Applications No. 2011-082761 filed on Apr. 4, 2011, No. 2011-133584 filed on Jun. 15, 2011, and No. 2012-061367 filed on Mar. 19, 2012, the contents of which are incorporated herein by reference in its entirety.

TECHNICAL FIELD

The present disclosure relates to a refrigerant cycle device. The refrigerant cycle device can be applied to an air conditioner capable of cooling, dehumidifying, and heating air to be blown to a space to be air-conditioned.

BACKGROUND

There has been known an air conditioner that has an indoor evaporator and an indoor condenser arranged in a chamber and that cools and dehumidifies air to be blown into the chamber by the indoor evaporator and that reheats the air, which has been dehumidified by the indoor evaporator, by the indoor condenser and that blows off the air into the chamber to thereby dehumidify the interior of the chamber (see, for example, patent document 1 (JP-B1-3645324), patent document 2 (JP-6-341732A)).

In an air conditioner described in the patent document 1, a heating and dehumidifying operation of dehumidifying feed air at the time of heating the interior of the chamber and a moderate cooling and dehumidifying operation of dehumidifying feed air at the time of cooling the interior of the chamber can be performed by switching a refrigerant passage of a refrigerant cycle of a vapor compression type.

Specifically, at the time of performing the heating and dehumidifying operation, the refrigerant passage of the refrigerant cycle is switched to a refrigerant passage of coupling the indoor evaporator to an outdoor heat exchanger, which makes a refrigerant exchange heat with an outdoor air, in parallel on the downstream side of the indoor condenser to thereby make the outdoor heat exchanger function as a heat absorbing device. In this case, the refrigerant absorbs heat from the feed air in the indoor evaporator, and the refrigerant absorbs heat from the outdoor air in the outdoor heat exchanger, whereby an amount of heat radiated by the refrigerant in the indoor condenser can be ensured. In this way, the feed air having a high temperature can be blown off into the chamber.

On the other hand, at the time of performing the moderate cooling and humidifying operation, the refrigerant passage of the refrigerant cycle device is switched to a refrigerant passage of coupling the indoor condenser to the outdoor heat exchanger in parallel on the downstream side of a compressor to thereby make the outdoor heat exchanger function as a refrigerant radiator. In this case, the refrigerant radiates heat to the feed air in the indoor condenser, and the refrigerant radiates heat to the outdoor air in the outdoor heat exchanger, whereby an amount of heat absorbed by the refrigerant in the indoor evaporator can be ensured. In this way, the feed air having a low temperature can be blown off into the chamber.

In an air conditioner described in the patent document 2, at the time of performing the heating and dehumidifying operation, the refrigerant passage of the refrigerant cycle is switched to the same refrigerant passage as in the patent document 1, whereas at the time of performing the moderate cooling and dehumidifying operation, the refrigerant passage of the refrigerant cycle is switched to a refrigerant passage of coupling the indoor condenser, the outdoor heat exchanger, and the indoor evaporator in series on the downstream side of the compressor to thereby make the outdoor heat exchanger function as a refrigerant radiator. Also in this case, the refrigerant radiates heat in both of the indoor condenser and the outdoor heat exchanger, whereby an amount of heat absorbed by the refrigerant in the indoor evaporator can be ensured.

Here, in the case where the refrigerant passage of the refrigerant cycle is switched to the refrigerant passage of coupling the indoor evaporator to the outdoor heat exchanger in parallel to thereby make the outdoor heat exchanger function as the heat absorbing device, as in the case of the heating and dehumidifying operation in the patent documents 1, 2, even if an attempt to vary an amount of heat absorbed by the refrigerant in the indoor evaporator is made so as to vary the temperature of the air blown off into the chamber, the amount of heat absorbed by the refrigerant from the outdoor air in the outdoor heat exchanger cannot be adequately adjusted. As a result, the temperature adjustment range of the air blown off into the chamber is limited.

This is because in the refrigerant passage of coupling the indoor evaporator to the outdoor heat exchanger in parallel as described in the patent documents 1, 2, a refrigerant evaporation temperature in the indoor evaporator is equal to a refrigerant evaporation temperature in the outdoor heat exchanger.

For example, in order to increase the temperature of the air blown off into the chamber, it is only necessary to decrease the refrigerant evaporation temperature in the outdoor heat exchanger to thereby increase the amount of heat absorbed by the refrigerant in the outdoor heat exchanger. However, when the refrigerant evaporation temperature in the outdoor heat exchanger is decreased, the refrigerant evaporation temperature in the indoor evaporator is also decreased, so that frost can be formed on the indoor evaporator.

On the other hand, in order to decrease the temperature of the air blown off into the chamber, it is only necessary to increase the refrigerant evaporation temperature in the outdoor heat exchanger to thereby decrease the amount of heat absorbed by the refrigerant in the outdoor heat exchanger. However, when the refrigerant evaporation temperature in the outdoor heat exchanger is increased, the refrigerant evaporation temperature in the indoor evaporator is also increased, so that the feed air cannot be sufficiently dehumidified.

Further, even in the case where the refrigerant passage of the refrigerant cycle is switched to the refrigerant passage of coupling the indoor condenser to the outdoor heat exchanger in parallel as in the case of the moderate cooling and heating operation of the patent document 1, or even in the case where the refrigerant passage of the refrigerant cycle is switched to the refrigerant passage of coupling the indoor condenser to the outdoor heat exchanger in series as in the case of the moderate cooling and heating operation of the patent document 2, in the case where the outdoor heat exchanger is made to function as the refrigerant radiator, even if an attempt to increase the amount of heat radiated by the refrigerant in the indoor condenser is made in order to increase the temperature of the air blown off into the chamber, if the amount of heat radiated by the refrigerant to the outdoor air in the outdoor heat exchanger cannot be adequately decreased, to expand the temperature adjustment range of the air blown off into the chamber to a higher temperature side is limited.

In other words, in the air conditioners described in the patent documents 1, 2, at the time of performing the dehumidifying operation, the capacity (heat radiating capacity and heat absorbing capacity) of the outdoor heat exchange cannot be adequately adjusted, so that as shown in FIG. 25, there exists a range in which the temperature of the air blown off into the chamber cannot be adjusted. FIG. 25 is an illustrative drawing to illustrate a temperature adjustment range of the air blown off into a chamber in a conventional an air conditioner. In FIG. 25, R1 designates a region in which a blowoff temperature cannot be controlled, R2 designates a temperature adjustable range at the time of performing a heating and dehumidifying operation, R3 designates a region in which the blowoff temperature cannot be controlled in a middle temperature range, R4 designates a temperature adjustable range at the time of performing a moderate cooling and dehumidifying operation, and RT designates a refrigerant evaporation temperature in the indoor evaporator.

In this way, in the air conditioners described in the patent documents 1, 2, the temperature adjustment range of the air blown off into the chamber at the time of performing the dehumidifying operation can be limited in some cases, and in some cases, a comfortable air conditioning of the chamber cannot be realized.

Further, there is provided a refrigerant cycle device used for an air conditioner that cannot utilize the waste heat of an engine of an electric automobile or the like. This refrigerant cycle device is provided with: a compressor for sucking, compressing, and discharging a refrigerant; a condenser for radiating heat of the refrigerant discharged from the compressor to an external fluid; an expansion valve for reducing pressure of the refrigerant flowing out of the condenser to expand the refrigerant; and an evaporator for evaporating the refrigerant reduced in pressure by the expansion valve to thereby absorb heat from the external fluid. The evaporator and the condenser are arranged in an air-conditioning duct and the evaporator is made a heat exchanger for cooling and dehumidifying air for air conditioning and the condenser is made a heat exchanger for heating the air for air conditioning. In this way, the air-conditioned air dehumidifies and heats the interior of a vehicle compartment (patent document 3 (JP-A-2000-16072)).

However, in the refrigerant cycle device of the patent document 3, there is a case where, for example, in order to prevent frost from being formed on the evaporator for absorbing heat from the air, a lower limit is set to the pressure of the refrigerant in the evaporator. When the lower limit is set to the pressure of the refrigerant in the evaporator, a heat absorbing capacity of the evaporator is limited and hence the load of the evaporator is made low, which makes the evaporator unable to sufficiently exert its heat absorbing capacity. Hence, there is also presented a problem that an air heating capacity (capacity of heating an external fluid) of the condenser that is a refrigerant radiator will be deficient.

SUMMARY

The present disclosure has been made in view of the matters described above.

According to a first aspect of the present disclosure, a refrigerant cycle device is for an air conditioner that performs a dehumidifying operation of cooling and dehumidifying feed air to be blown into a space to be air-conditioned and of heating the dehumidified feed air. The refrigerant cycle device includes: a compressor which compresses and discharges refrigerant; a refrigerant radiator disposed to make refrigerant discharged from the compressor exchange heat with the feed air to thereby radiate an amount of heat of the refrigerant discharged from the compressor; an outdoor heat exchanger disposed to make the refrigerant flowing out of the refrigerant radiator exchange heat with outdoor air; an evaporator disposed to make the refrigerant flowing out of the outdoor heat exchanger exchange heat with the feed air before passing through the refrigerant radiator to thereby evaporate the refrigerant flowing out of the outdoor heat exchanger; a first refrigerant passage provided to guide the refrigerant flowing out of the refrigerant radiator to an inlet side of the outdoor heat exchanger; a first throttle part that is arranged in the first refrigerant passage to be capable of changing a passage opening area of the first refrigerant passage; a second refrigerant passage provided to guide the refrigerant flowing out of the outdoor heat exchanger to a suction side of the compressor; a first opening/closing part that is arranged in the second refrigerant passage and that opens or closes the second refrigerant passage; a third refrigerant passage provided to guide the refrigerant flowing out of the outdoor heat exchanger to the suction side of the compressor via the evaporator; a second throttle part that is arranged between the outdoor heat exchanger and the evaporator in the third refrigerant passage to be capable of changing a passage opening area of the third refrigerant passage; a bypass passage provided to guide the refrigerant flowing between the refrigerant radiator and the first throttle part to a position between the outdoor heat exchanger and the second throttle part in the third refrigerant passage; and a second opening/closing part that is arranged in the bypass passage and that opens or closes the bypass passage.

According to the first aspect, when the second refrigerant passage and the bypass passage are closed respectively by the first opening/closing part and by the second opening/closing part, a refrigerant passage of the refrigerant cycle device can be set in which the outdoor heat exchanger and the evaporator are coupled in series with respect to a flow of the refrigerant.

In this case, when the passage opening area of the first refrigerant passage and the passage opening area of the third refrigerant passage are varied respectively by the first throttle part and by the second throttle part, a capacity of exchanging heat between the refrigerant and the outdoor air in the outdoor heat exchanger can be adjusted.

In this way, the amount of heat radiated by the refrigerant in the refrigerant radiator or the amount of heat absorbed by the refrigerant in the evaporator can be adjusted and hence the temperature of the feed air cooled and dehumidified in the evaporator can be adjusted by the refrigerant radiator within a wide range from a low temperature to a high temperature.

Further, when the second refrigerant passage and the bypass passage are opened respectively by the first opening/closing part and by the second opening/closing part, the refrigerant passage of the refrigerant cycle device can be made such that the outdoor heat exchanger and the evaporator are coupled in parallel with respect to the flow of the refrigerant.

In this case, the refrigerant flowing out of the refrigerant radiator is branched into a flow to the outdoor heat exchanger and a flow to the evaporator, so that the amount of flow of the refrigerant flowing to the evaporator can be decreased to thereby decrease the amount of heat absorbed by the refrigerant in the evaporator. Thus, the temperature of the feed air dehumidified in the evaporator can be adjusted within a high temperature range. Therefore, the temperature adjustable range of the air blown off into the space to be air-conditioned can be expanded.

Specifically, according to a second aspect of the present disclosure, the second refrigerant passage is closed by the first opening/closing part and the bypass passage is closed by the second opening/closing part in a first dehumidifying and heating mode, and the second refrigerant passage is opened by the first opening/closing part and the bypass passage is opened by the second opening/closing part in a second dehumidifying and heating mode.

According to the second aspect, it is possible to switch between the first dehumidifying and heating mode and the second dehumidifying and heating mode by the simple constructions of the first opening/closing valve and the second opening/closing valve. Thus, a construction of expanding the temperature adjustable range of the air blown off into the space to be air-conditioned can be realized specifically and easily.

According to a third aspect of the present disclosure, in the first dehumidifying and heating mode, as a target temperature of air blown off into the space to be air-conditioned is increased, the first throttle part may decrease the passage opening area of the first refrigerant passage, and in the first dehumidifying and heating mode, as the target temperature of air blown off into the space to be air-conditioned is increased, the second throttle part may increase the passage opening area of the third refrigerant passage.

According to the third aspect, a capacity of exchanging heat between the refrigerant and the outdoor air (a heat radiating capacity and a heat absorbing capacity) in the outdoor heat exchanger can be varied in response to a change in the target temperature of the air blown off into the space to be air-conditioned. Thus, the amount of heat radiated by the refrigerant in the refrigerant radiator and the amount of heat absorbed by the refrigerant in the evaporator can be adequately adjusted.

According to a fourth aspect of the present disclosure, in the second dehumidifying and heating mode, the first throttle part may vary the passage opening area of the first refrigerant passage in such a way that a degree of superheat of the refrigerant on an outlet side of the outdoor heat exchanger becomes a target degree of superheat which is determined in advance.

According to the fourth aspect, when the passage opening of the first refrigerant passage is varied by the first throttle part in such a way that the degree of superheat on the outlet side of the outdoor heat exchanger becomes equal to the target degree of superheat, even if the refrigerant pressure of the outdoor heat exchanger becomes equal to the refrigerant pressure of the evaporator, a region through which a vapor-phase refrigerant passes is produced in a portion of the outdoor heat exchanger. Thus, as compared with the case where only a liquid-phase refrigerant passes through the entire region of the outdoor heat exchanger, the amount of heat absorbed by the refrigerant in the outdoor heat exchanger can be decreased.

Thus, even if the outdoor heat exchanger and the evaporator are coupled in parallel with respect to the flow of the refrigerant, the amount of heat absorbed by the refrigerant in the outdoor heat exchanger and the amount of heat absorbed by the refrigerant in the evaporator can be adequately varied.

The refrigerant cycle device according to a fifth aspect of the present disclosure includes a constant-pressure adjusting part that is arranged on an outlet side of the evaporator in the third refrigerant passage and keeps a pressure of the refrigerant on an outlet side of the evaporator at a specified value.

According to the fifth aspect, even if the refrigerant passage of the refrigerant cycle device is made such that the outdoor heat exchanger and the evaporator are coupled in parallel with respect to the flow of the refrigerant, the refrigerant pressure of the evaporator can be kept at a constant pressure. Thus, the amount of heat absorbed by the refrigerant in the outdoor heat exchanger and the amount of heat absorbed by the refrigerant in the evaporator can be adequately varied.

The refrigerant cycle device according to a sixth aspect of the present disclosure may include a back-flow preventing part that is arranged in the third refrigerant passage, to allow a flow of the refrigerant from an outlet side of the outdoor heat exchanger to an inlet side of the second throttle part, and to prevent a flow of the refrigerant from the inlet side of the second throttle part to the outlet side of the outdoor heat exchanger.

According to a seventh aspect of the present disclosure, a refrigerant cycle device is for an air conditioner that performs a dehumidifying operation of cooling and dehumidifying feed air to be blown into a space to be air-conditioned and of heating the dehumidified air. The refrigerant cycle device includes: a compressor which compresses and discharges refrigerant; a refrigerant radiator disposed to make a high-pressure refrigerant discharged from the compressor exchange heat with the feed air to thereby radiate heat of the high-pressure refrigerant; an outdoor heat exchanger disposed to make the refrigerant flowing out of the refrigerant radiator exchange heat with outdoor air; an evaporator disposed to make a low-pressure refrigerant passing therein exchange heat with the feed air before passing through the refrigerant radiator to thereby evaporate the low-pressure refrigerant; a first throttle part configured to reduce pressure of the refrigerant flowing into the outdoor heat exchanger and being capable of varying a throttle opening; a second throttle part configured to reduce pressure of the refrigerant flowing into the evaporator and being capable of varying a throttle opening; a constant-pressure adjusting part configured to keep a pressure of the refrigerant flowing out of the evaporator at a specified value which is determined in advance; and a refrigerant passage switching part configured to switch at least between a first refrigerant passage and a second refrigerant passage in a refrigerant cycle. The first refrigerant passage makes the refrigerant flowing out of the refrigerant radiator flow in order of: the first throttle part→the outdoor heat exchanger→the second throttle part→the evaporator→the constant-pressure adjusting part→a suction side of the compressor, and the second refrigerant passage makes the refrigerant flowing out of the refrigerant radiator flow in order of: the first throttle part→the outdoor heat exchanger→the suction side of the compressor and at the same time makes the refrigerant flowing out of the refrigerant radiator flow in order of the second throttle part→the evaporator→the constant-pressure adjusting part→the suction side of the compressor.

According to the seventh aspect, when the refrigerant passage switching part switches the refrigerant cycle device to the first refrigerant passage, the refrigerant radiator, the first throttle part, the outdoor heat exchanger, the second throttle part, and the evaporator are coupled in series in this order with respect to the flow of the refrigerant. Further, in this first refrigerant passage, when the throttle opening of the first throttle part and the throttle opening of the second throttle part are varied, the temperature (pressure) of the refrigerant in the outdoor heat exchanger can be easily varied.

Thus, the outdoor heat exchanger can be made to function as the refrigerant radiator for making the refrigerant radiate heat or can be made to function as the evaporator for making the refrigerant absorb heat. Hence, the amount of heat radiated by the refrigerant and the amount of heat absorbed by the refrigerant in the outdoor heat exchanger can be adjusted. As a result, as compared with a cycle construction in which the outdoor heat exchange is made to function as either the refrigerant radiator or the evaporator, the amount of heat radiated by the refrigerant in the refrigerant radiator can be adjusted within a wider range. Hence, the temperature adjustable range of the air blown off into the space to be air-conditioned can be expanded at the time of performing the dehumidifying operation.

On the other hand, when the refrigerant passage switching part switches the refrigerant cycle device to the second refrigerant passage, the outdoor heat exchanger and the evaporator are arranged in parallel with respect to the flow of the refrigerant between the outlet side of the refrigerant radiator and the suction side of the compressor, but the constant-pressure adjusting part is arranged between the evaporator and the compressor, so that a refrigerant evaporation temperature in the evaporator and a refrigerant evaporation temperature in the outdoor heat exchanger can be made different from each other.

Thus, the refrigerant evaporation temperature in the outdoor heat exchanger can be made lower than the refrigerant evaporation temperature in the evaporator to thereby increase the amount of heat absorbed by the refrigerant in the outdoor heat exchanger. As a result, while the refrigerant evaporation temperature in the evaporator is kept at a specified value of preventing frost from being formed on the evaporator, the amount of heat radiated by the refrigerant in the refrigerant radiator can be increased and hence the temperature adjustable range of the air blown off into the space to be air-conditioned can be expanded at the time of performing the dehumidifying operation.

The refrigerant cycle device according to the eighth aspect of the present disclosure may include: a bypass passage that makes the refrigerant flowing out of the refrigerant radiator bypass the first throttle part and the outdoor heat exchanger and guides the refrigerant to an inlet side of the second throttle part; a second refrigerant passage that guides the refrigerant flowing out of the outdoor heat exchanger to a refrigerant outlet side of the constant-pressure adjusting part and the inlet side of the compressor; a third refrigerant passage that guides the refrigerant flowing out of the outdoor heat exchanger to the inlet side of the compressor via the evaporator; and a back-flow preventing part that is arranged in the third refrigerant passage and that allows a flow of the refrigerant from an outlet side of the outdoor heat exchanger to an inlet side of the evaporator and prevents a flow of the refrigerant from the inlet side of the evaporator to the outlet side of the outdoor heat exchanger. Furthermore, a first opening/closing part for opening or closing the second refrigerant passage and a second opening/closing part for opening or closing the bypass passage may be provided as the refrigerant passage switching part.

The refrigerant cycle device according to the ninth aspect of the present disclosure may include an outdoor air temperature detecting part provided to detect an outdoor air temperature. In this case, when the outdoor air temperature is higher than an outdoor air reference temperature which is determined in advance, the refrigerant passage switching part may switch the refrigerant cycle to the first refrigerant passage, and when the outdoor air temperature is lower than the outdoor air reference temperature, the refrigerant passage switching part may switch the refrigerant cycle to the second refrigerant passage.

Here, when the refrigerant cycle device is switched to the second refrigerant passage, the refrigerant evaporation temperature in the outdoor heat exchanger can be made lower than the refrigerant evaporation temperature in the evaporator by the operation of the constant-pressure adjusting part, so that the amount heat absorbed by the refrigerant in the outdoor heat exchanger can be increased as compared with the case where the refrigerant cycle device is switched to the first refrigerant passage. Thus, when the temperature of the outdoor air is decreased, by switching the refrigerant passage of the refrigerant cycle device from the first refrigerant passage to the second refrigerant passage, the temperature of the air blown off into the space to be air-conditioned can be increased.

The refrigerant cycle device according to a tenth aspect of the present disclosure may include: a blowoff temperature detecting part configured to detect a blowoff temperature of the feed air blown off into the space to be air-conditioned; and a target blowoff temperature determining part configured to determine a target blowoff temperature of the feed air blown off into the space to be air-conditioned. In this case, when a temperature difference obtained by subtracting the target blowoff temperature from the blowoff temperature is lower than a reference value, the refrigerant passage switching part switches the refrigerant cycle to the first refrigerant passage. Furthermore, when the temperature difference is higher than the reference value, the refrigerant passage switching part switches the refrigerant cycle to the second refrigerant passage.

As described above, when the refrigerant cycle device is switched to the second refrigerant passage, the amount of heat absorbed by the refrigerant in the outdoor heat exchanger can be increased as compared with the case where the refrigerant cycle device is switched to the first refrigerant passage. Thus, when a gap, that is, a temperature difference between the blowoff temperature and the target blowoff temperature becomes larger than the reference value, by switching the refrigerant passage of the refrigerant cycle device from the first refrigerant passage to the second refrigerant passage, the temperature of the air blown off into the space to be air-conditioned can be increased.

The refrigerant cycle device according to an 11th aspect of the present disclosure may further include: a blowoff temperature detecting part configured to detect a blowoff temperature of the feed air blown off into the space to be air-conditioned; a target blowoff temperature determining part configured to determine a target blowoff temperature of the feed air blown off into the space to be air-conditioned; an evaporator temperature detecting part configured to detect an evaporator blowoff temperature of the feed air blown off from the evaporator; and a target evaporator temperature determining part configured to determine a target evaporator temperature of the feed air blown off from the evaporator. In this case, when the refrigerant passage switching part switches the refrigerant cycle to the first refrigerant passage, one of the first and second throttle parts and the compressor is operated in such a way that the blowoff temperature comes close to the target blowoff temperature and the other of the first and second throttle parts and the compressor is operated in such a way that the evaporator temperature comes close to the target evaporator temperature.

According to the 11th aspect, the cooling capacity of the feed air in the evaporator can be surely ensured by an action of controlling one of the first and second throttle parts and the compressor. Further, when the amount of heat radiated by the refrigerant or the amount of heat absorbed by the refrigerant in the outdoor heat exchanger is adjusted by an action of controlling the other of the first and second throttle parts and the compressor, the temperature adjustable range of the air blown off into the space to be air-conditioned can be expanded at the time of performing the dehumidifying operation.

The refrigerant cycle device according to 12th aspect of the present disclosure may further include: a blowoff temperature detecting part configured to detect a blowoff temperature of the feed air blown off into the space to be air-conditioned; a target blowoff temperature determining part configured to determine a target blowoff temperature of the feed air blown off into the space to be air-conditioned; a super-cooling detecting part configured to detect a physical amount correlated with a degree of super-cooling of the refrigerant on an outlet side of the refrigerant radiator; a target super-cooling determining part configured to determine a target degree of super-cooling of the refrigerant on the outlet side of the refrigerant radiator; a superheat detecting part configured to detect a physical amount correlated with a degree of superheat of the refrigerant on an outlet side of the evaporator; and a target superheat determining part configured to determine a target degree of superheat of the refrigerant on the outlet side of the evaporator. In this case, when the refrigerant passage switching part switches the refrigerant cycle to the second refrigerant passage, (i) the compressor may be controlled in such a way that the blowoff temperature comes close to the target blowoff temperature, (ii) the first throttle part is controlled in such a way that the degree of super-cooling comes close to the target degree of super-cooling, and (iii) the second throttle part is controlled in such a way that the degree of superheat comes close to the target degree of superheat.

According to the 12th aspect, when the refrigerant passage of the refrigerant cycle device is switched to the second refrigerant passage, the action of the first throttle part is controlled in such a way that the refrigerant on the outlet side of the evaporator has the degree of superheat. Thus, the refrigerant on the outlet side of the outdoor heat exchanger coupled in parallel to the evaporator can be put into a vapor-liquid two-phase state to thereby balance the refrigerant cycle.

By balancing the refrigerant cycle in this way, the refrigerant can be made to exert a heat absorbing operation within an entire heat exchange range of the outdoor heat exchanger and hence the amount of heat absorbed by the refrigerant in the outdoor heat exchanger can be increased. As a result, the temperature adjustment range can be expanded to the side that the temperature of the air blown off into the space to be air-conditioned is increased at the time of performing the dehumidifying operation.

The refrigerant cycle device according to 13th aspect of the present disclosure may further include: a blowoff temperature detecting part configured to detect a blowoff temperature of the feed air blown off into the space to be air-conditioned; a target blowoff temperature determining part configured to determine a target blowoff temperature of the feed air blown off into the space to be air-conditioned; an evaporator temperature detecting part configured to detect an evaporator temperature of the feed air blown off from the evaporator; a target evaporator temperature determining part configured to determine a target evaporator blowoff temperature of the feed air blown off from the evaporator; a super-cooling detecting part configured to detect a physical amount correlated with a degree of super-cooling of the refrigerant on an outlet side of the refrigerant radiator; and a target super-cooling determining part configured to determine a target degree of super-cooling of the refrigerant on the outlet side of the refrigerant radiator. In this case, when the refrigerant passage switching part switches the refrigerant cycle to the second refrigerant passage, (i) the compressor may be controlled in such a way that the blowoff temperature comes close to the target blowoff temperature, (ii) one of the first throttle part and the second throttle part is controlled in such a way that the degree of super-cooling comes close to the target degree of super-cooling, and (iii) the other of the first throttle part and the second throttle part is controlled in such a way that the evaporator blowoff temperature comes close to the target evaporator blowoff temperature.

According to the 13th aspect, when the refrigerant passage of the refrigerant cycle device is switched to the second refrigerant passage, by controlling the action of one of the first throttle part and the second throttle part in such a way that the evaporator blowoff temperature comes close to the target evaporator blowoff temperature, the refrigerant on the outlet side of the evaporator can be put into the vapor-liquid two-phase state. Thus, the refrigerant on the outlet side of the outdoor heat exchanger coupled in parallel to the evaporator can be put into a vapor-phase state having the degree of superheat to thereby balance the refrigerant cycle.

By balancing the refrigerant cycle in this way, a region through which the vapor-phase refrigerant passes can be produced in a portion of the outdoor heat exchanger, so that the amount of heat absorbed by the refrigerant in the outdoor heat exchanger can be decreased as compared with the case where the liquid-phase refrigerant passes through the entire region of the outdoor heat exchanger. As a result, the temperature adjustment range can be expanded to the side that the temperature of the air blown off into the space to be air-conditioned is decreased at the time of performing the dehumidifying operation.

A refrigerant cycle device according to 14th aspect of the present disclosure may include: a compressor configured to suck, compress, and discharge refrigerant; a refrigerant radiator disposed to radiate heat of the refrigerant discharged from the compressor to thereby heat an external fluid; a first pressure reducing part disposed to reduce pressure of the refrigerant flowing out of the refrigerant radiator to thereby expand the refrigerant; an evaporator disposed to evaporate the refrigerant reduced in pressure by the first pressure reducing part to thereby absorb heat from the external fluid; and a second pressure reducing part that reduces pressure of the refrigerant evaporated by the evaporator and to be sucked by the compressor and that is configured to vary an amount of pressure reduction. Furthermore, one of an amount of the refrigerant discharged from the compressor and an amount of pressure reduction of the refrigerant of the second pressure reducing part is adjusted in such a way that a heating capacity of the refrigerant radiator or a value of a physical amount related to the heating capacity becomes equal to a heating target value, and the other of the amount of the refrigerant discharged from the compressor and the amount of pressure reduction of the refrigerant of the second pressure reducing part is adjusted in such a way that a heat absorbing capacity of the evaporator or a value of a physical amount related to the heat absorbing capacity becomes equal to a heat-absorption target value.

According to the 14th aspect, the amount of discharge of the refrigerant of the compressor and the amount of pressure reduction of the refrigerant of the second pressure reducing part can be adjusted in such a way that when the heat absorbing capacity of the evaporator or the value of the physical amount related to the heat absorbing capacity is made equal to the heat-absorption target value having a limitation, the heating capacity of the refrigerant radiator or the value of the physical amount related to the heating capacity becomes equal to the heating target value capable of sufficiently heating the external liquid. That is, even in the case of the amount of circulation flow of the refrigerant determined by the limitation of the heat absorbing capacity of the evaporator, by once reducing the pressure of the refrigerant evaporated in the evaporator by the second pressure reducing part and by isentropically compressing the refrigerant reduced in pressure by the second pressure reducing part by the compressor, the enthalpy of the refrigerant flowing into the refrigerant radiator can be increased as compared with the case where the refrigerant evaporated in the evaporator is compressed by the compressor without being reduced in pressure. In this way, the heating capacity of the refrigerant radiator or the value of the physical amount related to the heating capacity can be made equal to the heating target value capable of sufficiently heating the external fluid. Thus, even if the heat absorbing capacity of the evaporator has the limitation, a sufficient capacity of heating the external fluid can be obtained in the refrigerant radiator.

The refrigerant cycle device according to 15th aspect of the present disclosure may further include a control part for controlling the amount of discharge of the refrigerant of the compressor on the basis of the heating capacity or the value of the physical amount related to the heating capacity. In this case, the second pressure reducing part may be a constant-pressure valve that prevents a refrigerant pressure in the evaporator from becoming less than a specified pressure even if pressure of the refrigerant sucked by the compressor becomes lower, the control part may control the amount of discharge of the refrigerant in such a way that the heating capacity or the value of the physical amount related to the heating capacity becomes equal to the heating target value, and the second pressure reducing part may adjust the amount of pressure reduction of the refrigerant in such a way that the heat absorbing capacity or the physical amount related to the heat absorbing capacity becomes equal to the heat-absorption target value.

According to the 15th aspect, the amount of discharge of the refrigerant of the compressor can be controlled by the control part in such a way that the heating capacity of the refrigerant radiator or the value of the physical amount related to the heating capacity becomes equal to the heating target value, and the amount of pressure reduction of the refrigerant can be adjusted by the second pressure reducing part of the constant-pressure valve in such a way that the heat absorbing capacity of the refrigerant radiator or the value of the physical amount related to the heat absorbing capacity becomes equal to the heat-absorption target value. Thus, the control part does not need to perform the control of the amount of pressure reduction of the refrigerant of the second pressure reducing part. Therefore, the control logic can be simplified.

The refrigerant cycle device according to 16th aspect of the present disclosure may further include a control part for controlling the amount of discharge of the refrigerant of the compressor and the amount of pressure reduction of the refrigerant of the second pressure reducing part on the basis of the heating capacity or the value of the physical amount related to the heating capacity and the heat absorbing capacity or the value of physical amount related to the heat absorbing capacity. In this case, the control part controls one of the amount of discharge of the refrigerant and the amount of pressure reduction of the refrigerant in such a way that the heating capacity or the value of the physical amount related to the heating capacity becomes equal to the heating target value, and the control part controls the other of the amount of discharge of the refrigerant and the amount of pressure reduction of the refrigerant in such a way that the heat absorbing capacity or the value of the physical amount related to the heat absorbing capacity becomes equal to the heat-absorption target value.

According to the 16th aspect, one of the amount of discharge of the refrigerant of the compressor and the amount of pressure reduction of the refrigerant of the second pressure reducing part can be controlled by the control part in such a way that the heating capacity of the refrigerant radiator or the value of the physical amount related to the heating capacity becomes equal to the heating target value, and the other of the amount of discharge of the refrigerant of the compressor and the amount of pressure reduction of the refrigerant of the second pressure reducing part can be controlled by the control part in such a way that the heat absorbing capacity of the evaporator or the value of the physical amount related to the heat absorbing capacity becomes equal to the heat-absorption target value. Thus, the adjustment accuracy of the amount of discharge of the refrigerant of the compressor and the adjustment accuracy of pressure reduction of the refrigerant of the second pressure reducing part can be easily ensured.

In the refrigerant cycle device according to 17th aspect of the present disclosure, the second pressure reducing part may include a fixed throttle valve having a throttle fixed, and an opening/closing valve that is arranged in parallel to the fixed throttle valve and that is switched between an opened state and a closed state, and the control part may switch between the opened state and the closed state of the opening/closing valve to control the amount of pressure reduction of the refrigerant.

According to the 17th aspect, the second pressure reducing part capable of varying the amount of pressure reduction can be simply constructed of the fixed throttle valve and the opening/closing valve and the a pressure reduction level by the second pressure reducing part can be varied in two steps.

In the refrigerant cycle device according to 18th aspect of the present disclosure, the refrigerant radiator and the evaporator may be arranged in a duct in such a way that the evaporator is arranged on a more upstream side of a flow of the air than the refrigerant radiator, the evaporator may be configured to absorb heat from the air to dehumidify the air. In this case, the refrigerant radiator may be configured to heat the air flowing from the evaporator.

According to the 18th aspect, the interior of the chamber can be easily dehumidified and heated by the air conditioner that blows off the air into the chamber from the duct and hence the heating capacity at the time of performing the dehumidifying and heating operation can be easily enhanced.

BRIEF DESCRIPTION OF THE DRAWINGS

The above and other objects and advantages of the present disclosure will be more readily apparent from the following detailed description made with reference to the accompanying drawings. In the drawings.

DETAILED DESCRIPTION

Figure 1:
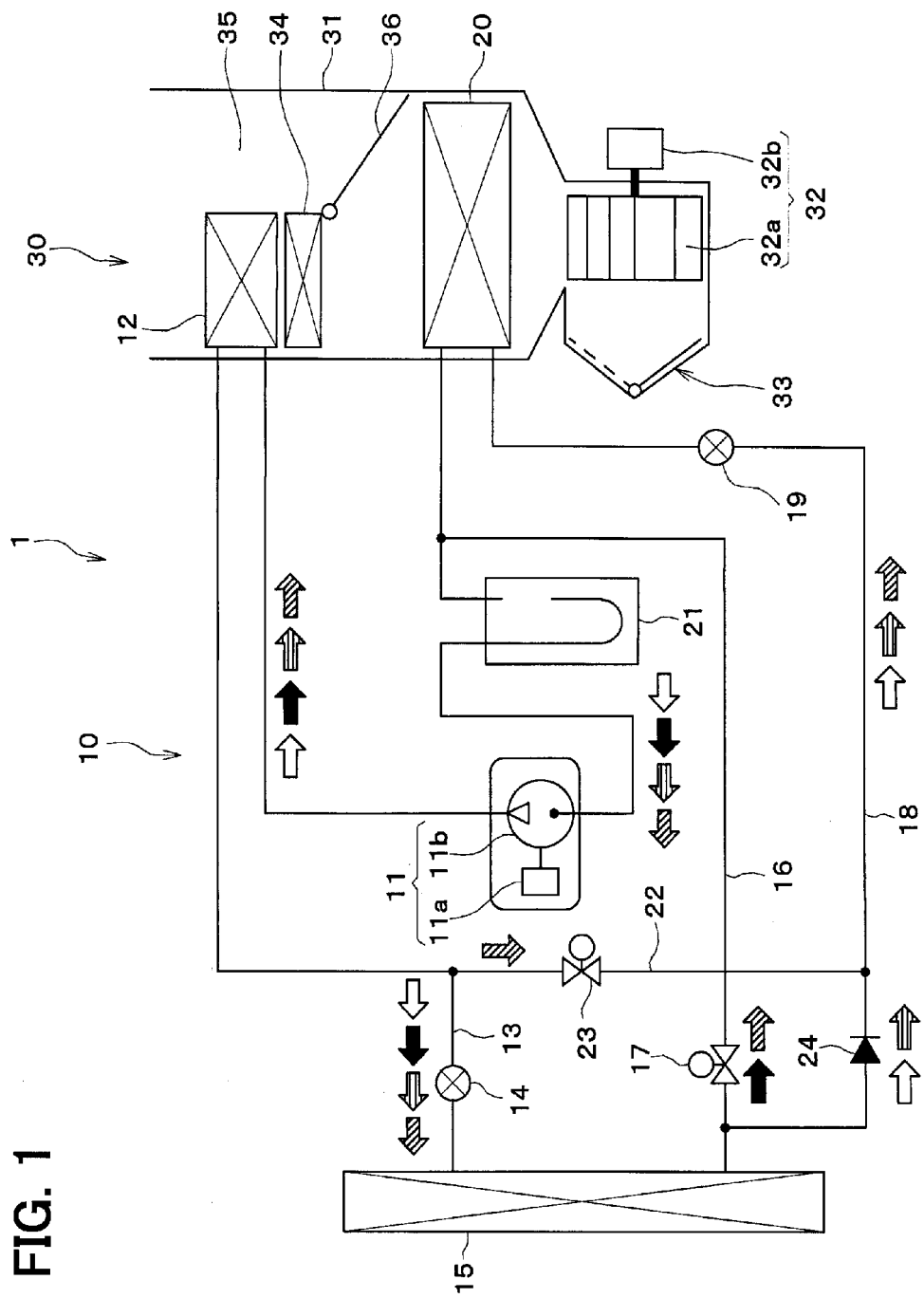
FIG. 1 is a schematic configuration diagram of a vehicular air conditioner according to a first embodiment.

Embodiments of the present disclosure will be described hereafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

A first embodiment of the present disclosure will be described on the basis of FIG. 1 to FIG. 7. FIG. 1 is a schematic configuration diagram of a vehicular air conditioner 1 according to the present embodiment.

In the present embodiment, a refrigerant cycle device 10 is applied to a vehicular air conditioner 1 of a hybrid vehicle acquiring a driving force for driving a vehicle from an internal combustion engine (engine) and a driving electric motor. The refrigerant cycle device 10 has a function of cooling or heating air blown into a vehicle compartment of a space to be air-conditioned (hereinafter referred to as "vehicle compartment feed air") in the vehicular air conditioner 1.

For this reason, the refrigerant cycle device 10 is constructed in such a way as to switch: a refrigerant passage of a cooling mode (cooling operation) for cooling an interior of a vehicle compartment; a refrigerant passage of a dehumidifying and heating mode (dehumidifying operation) for dehumidifying and heating the interior of the vehicle compartment; and a refrigerant passage of a heating mode (heating operation) for heating the interior of the vehicle compartment.

Further, in the refrigerant cycle device 10, as will be described later, a first dehumidifying and heating mode performed at the time of a usual operation and a second dehumidifying and heating mode performed when an outdoor air temperature is extremely low can be performed as the dehumidifying and heating mode.

Moreover, in the refrigerant cycle device 10 of the present embodiment, a usual chlorofluorocarbon-based refrigerant is used as a refrigerant and a subcritical refrigerant cycle is constructed in which the pressure of the high-pressure refrigerant does not exceed a critical pressure of the refrigerant. The refrigerant is mixed with a refrigerant machine oil for lubricating a compressor 11, which will be described later, and a part of the refrigerant machine oil is circulated together with the refrigerant.

The compressor 11 is arranged in an engine room (not shown in the drawing) and sucks, compresses, and discharges the refrigerant in the refrigerant cycle device 10 and is an electric compressor of driving a fixed displacement type compression mechanism 11$a$, whose discharge volume is fixed, by an electric motor 11$b$. Specifically, various types of compression mechanisms such as a scroll type compression mechanism and a vane type compression mechanism can be employed as the compression mechanism 11$a$.

The electric motor 11$b$ has its action (the number of revolutions) controlled by a control signal outputted from a control device (not shown), which will be described, and either type of an AC motor or a DC motor can be employed. The refrigerant discharge capacity of the compression mechanism 11$a$ is varied by the control of the number of revolutions. Thus, in the present embodiment, the electric motor 11$b$ constructs a discharge volume varying part of the compression mechanism 11$a$.

The compressor 11 has an inlet side of an indoor condenser 12 coupled to a discharge port side thereof. The indoor condenser 12 is a refrigerant radiator that is arranged in a casing 31 of an indoor air-conditioning unit 30, which will be described, and that makes a discharge refrigerant (high-pressure refrigerant) discharged from the compressor 11 radiate heat to thereby heat the vehicle compartment feed air passing through an indoor evaporator 20, which will be described.

The indoor condenser 12 has a first refrigerant passage 13 coupled to an outlet side thereof, the first refrigerant passage 13 introducing the refrigerant flowing out of the indoor condenser 12 into an outdoor heat exchanger 15, which will be described later. The first refrigerant passage 13 has a first expansion valve (first throttle part) 14 arranged therein, the first expansion valve 14 being constructed in such a way as to vary a passage area (throttle opening) of the first refrigerant passage 13.

More specifically, the first expansion valve 14 is an electric variable throttle mechanism constructed of a valve body and an electric actuator, the valve body being constructed so as to vary a passage opening (throttle opening) of the first refrigerant passage 13, the electric actuator being made of a stepping motor capable of varying the throttle opening of the valve body.

The first expansion valve 14 of the present embodiment is constructed of a variable throttle mechanism having a full-opening function of fully opening the first refrigerant passage 13 when the throttle opening is fully opened. In other words, the first expansion valve 14 can fully open the first refrigerant passage 13, which prevents the first expansion valve 14 from exerting an operation of reducing the pressure of the refrigerant. Further, the first expansion valve 14 has its action controlled by a control signal outputted from the control device.

The first expansion valve 14 has an inlet side of the outdoor heat exchanger 15 coupled to an outlet side thereof. The outdoor heat exchanger 15 is a device for making the refrigerant passing through its interior exchange heat with an outdoor air blown from a blower fan (not shown). The outdoor heat exchanger 15 functions as an evaporator for evaporating the refrigerant to exert a heat absorbing operation at the time of a heating mode or the like, which will be described later, and functions as a refrigerant radiator for making the refrigerant radiate heat at the time of a cooling mode or the like.

The outdoor heat exchanger 15 has a second refrigerant passage 16 and a third refrigerant passage 18 coupled to an outlet side thereof, the second refrigerant passage 16 guiding the refrigerant flowing out of the outdoor heat exchanger 15 to a suction side of the compressor 11 via an accumulator 21, which will be described, the third refrigerant passage 18 guiding the refrigerant flowing out of the outdoor heat exchanger 15 to the suction side of the compressor 11 via an indoor evaporator 20, which will be descried later, and the accumulator 21.

The second refrigerant passage 16 has a first opening/closing valve (first opening/closing part) 17 arranged therein. The first opening/closing valve 17 is an electromagnetic valve for opening and closing the second refrigerant passage 16 and has its action controlled by a control signal outputted from the control device.

In this regard, in the case where the first opening/closing valve 17 is opened, a pressure loss caused when the refrigerant passes through the second refrigerant passage 16 is smaller than a pressure loss caused when the refrigerant passes through the third refrigerant passage 18. This is because the third refrigerant passage 18 has a check valve 24 and a second expansion valve 19, which will be described later, arranged therein. Thus, in the case where the first opening/closing valve 17 is opened, the refrigerant flowing out of the outdoor heat exchanger 15 flows to the second refrigerant passage 16, whereas in the case where the first opening/closing valve 17 is closed, the refrigerant flowing out of the outdoor heat exchanger 15 flows to the third refrigerant passage 18.

In this way, the first opening/closing valve 17 opens or closes the second refrigerant passage 16 to thereby fulfill a function of switching a cycle construction (refrigerant passage). Thus, the first opening/closing valve 17 constructs a refrigerant passage switching part for switching a refrigerant passage of the refrigerant circulated in a cycle.

Further, the third refrigerant passage 18 has the second expansion valve (second throttle part) 19 arranged therein, the second expansion valve 19 being constructed so as to vary a passage area (throttle opening) of the third refrigerant passage 18. More specifically, the second expansion valve 19 is an electric variable throttle mechanism constructed of a valve body and an electric actuator, the valve body being constructed so as to change a passage opening (throttle opening) of the third refrigerant passage 18, the electric actuator being made of a stepping motor capable of varying the throttle opening of the valve body.

The second expansion valve 19 of the present embodiment is constructed of a variable throttle mechanism having a full-opening function of fully opening the third refrigerant passage 18 when the throttle opening is fully opened and a full-closing function of fully closing the third refrigerant passage 18 when the throttle opening is fully closed. In other words, the second expansion valve 19 can fully open the third refrigerant passage 18, which prevents the second expansion valve 19 from exerting an operation of reducing the pressure of the refrigerant, and the second expansion valve 19 can open and close the third refrigerant passage 18. In this regard, the second expansion valve 19 has its action controlled by a control signal outputted from the control device.

The second expansion valve 19 has an inlet side of the indoor evaporator 20 coupled to an outlet side thereof. The indoor evaporator 20 is an evaporator: which is arranged on an upstream side of the flow of the vehicle compartment feed air of the indoor condenser 12 in the casing 31 of the indoor air-conditioning unit 30; and which makes the refrigerant flowing in itself exchange heat with the vehicle compartment feed air not-yet passing through the indoor condenser 12 at the time of the cooling mode and the dehumidifying and heating mode to evaporate the refrigerant to fulfill a heat absorbing operation, thereby cooling the vehicle compartment feed air.

The indoor evaporator 20 has an inlet side of the accumulator 21 coupled to an outlet side thereof. The accumulator 21 is a vapor-liquid separator for separating the refrigerant flowing into the accumulator 21 into the vapor and the liquid and for accumulating the surplus refrigerant in the cycle. The accumulator 21 has a suction side of the compressor 11 coupled to a vapor-phase refrigerant outlet thereof. Thus, the accumulator 21 prevents a liquid-phase refrigerant from being sucked by the compressor 11 to fulfill a function of preventing liquid compression in the compressor 11.

Further, the present embodiment has a bypass passage 22 for guiding the refrigerant in a region from the outlet side of the indoor condenser 12 to the inlet side of the first expansion valve 14 in the first refrigerant passage 13 to a region from the outlet side of the outdoor heat exchanger 15 to the inlet side of the second expansion valve 19 in the third refrigerant passage 18. In other words, the bypass passage 22 is a refrigerant passage for making the refrigerant flowing out of the indoor condenser 12 bypass the first expansion valve 14 and the outdoor heat exchanger 15 to thereby guide the refrigerant to the inlet side of the second expansion valve 19.

The bypass passage 22 has a second opening/closing (second opening/closing part) 23 arranged therein. The second opening/closing valve 23 is an electromagnetic valve for opening/closing the bypass passage 22 and has its action controlled by a control signal outputted from the control device.

Here, the second opening/closing valve 23 opens or closes the bypass passage 22 to fulfill a function of switching the cycle construction (refrigerant passage). Thus, the second opening/closing valve 23 constructs a refrigerant passage switching part for switching a refrigerant passage of the refrigerant circulating the cycle together with the first opening/closing valve 17.

Further, the present embodiment has a check valve (reverse flow preventing part) 24 arranged between the outlet side of the outdoor heat exchanger 15 and a meeting part of the bypass passage 22 and the third refrigerant passage 18 in the third refrigerant passage 18. The check valve 24 allows the flow of the refrigerant from the outlet side of the indoor heat exchanger 15 to the inlet side of the second expansion valve 19 and inhibits the flow of the refrigerant from the inlet side of the second expansion valve 19 to the outlet side of the indoor heat exchanger 15. The check valve 24 can prevent the refrigerant, which meets the third refrigerant passage 18 from the bypass passage 22, from flowing to the outdoor heat exchanger 15.

Next, the indoor air-conditioning unit 30 will be described. The indoor air-conditioning unit 30 is a unit which is arranged inside an instrument panel at the forefront in the vehicle compartment and which has a blower 32, the indoor condenser 12, the indoor evaporator 20, and a heater core 34 received in the casing 31 forming its outer envelope.

The casing 31 forms an air passage for the vehicle compartment feed air and is formed of resin (for example, polypropylene) having a certain level of elasticity and excellent strength. On the most-upstream side of the feed air flowing in the casing 31 is arranged an inside/outdoor air switching device 33 for switching air in the vehicle compartment (indoor air) and the outdoor air and introducing the indoor air and the outdoor air.

The inside/outdoor air switching device 33 has an indoor air introducing port and an outdoor air introducing port formed therein, the indoor air introducing port introducing the indoor air into the casing 31, the outdoor air introducing port introducing the outdoor air into the casing 31. Further, in inside/outdoor air switching device 33 is arranged an inside/outdoor air switching door for continuously adjusting an opening area of the indoor air introducing port and an opening area of the outdoor air introducing port to change the ratio between the volume of the indoor air and the volume of the outdoor air.

On the downstream side of the flow of air in the inside/outdoor air switching device 33 is arranged the blower 32 for blowing air introduced via the inside/outdoor air switching device 33 into the vehicle compartment. The blower 32 is an electric blower for driving a centrifugal multi-blade fan (sirocco fan) 32a by an electric motor 32b and has the number of revolutions (air volume) controlled by a control signal (control voltage) outputted from the control device, which will be described. Here, the centrifugal multi-blade fan 32a fulfills a function as an air blowing part for blowing air into the vehicle compartment.

On the downstream side of the flow of air of the blower 32, the indoor evaporator 20, the heater core 34, and the indoor condenser 12 are arranged in this order with respect to the flow of the vehicle compartment feed air. In other words, the indoor evaporator 20 is arranged on the upstream side of the flow of the vehicle compartment feed air with respect to the indoor condenser 12 and the heater core 34.

Here, the heater core 34 is a heat exchanger for heating that makes the cooling water of the engine outputting the driving force for driving the vehicle exchange heat with the vehicle compartment feed air. In this regard, the heater core 34 of the present embodiment is arranged on the upstream side of the flow of the vehicle compartment feed air with respect to the indoor condenser 12. Further, in the casing 31 is formed a cooling air bypass passage 35 for making the air passing through the indoor evaporator 20 bypass the indoor condenser 12 and the heater core 34.

An air mixing door 36 for adjusting an air volume ratio between the air passing through the indoor condenser 12 and the heater core 34 and the air passing through the cooling bypass passage 35 of the air after passing through the indoor evaporator 20 is arranged on the downstream side of the flow of air in the indoor evaporator 20 and on the upstream side of the flow of air in the indoor condenser 12 and the heater core 34. Further, a mixing space for mixing the air after passing through the indoor condenser 12 and the air after passing through the cooling bypass passage 35 is provided on the downstream side of the flow of air in the indoor evaporator 20 and on the downstream side of the flow of air in the indoor condenser 12 and the heater core 34.

Further, on the most downstream side of the flow of air of the casing 31 are arranged blowoff ports (not shown) for blowing off the air-conditioned air mixed in the mixing space into the vehicle compartment of the space to be air-conditioned. Specifically, as to the blowoff ports, there are provided a face blowoff port for blowing off the air-conditioned air to the upper body of an occupant in the vehicle compartment, a foot blowoff port for blowing off the air-conditioned air to the feet of the occupant, and a defroster blowoff port for blowing off the air-conditioned air to the inside surface of a front window glass of the vehicle.

Thus, the air mixing door 36 adjusts the air volume ratio between the air passing through the indoor condenser 12 and the air passing through the cooling bypass passage 35, whereby the temperature of the air-conditioned air mixed in the mixing space is adjusted and hence the temperatures of the air-conditioned air blown off from the respective blowoff ports are adjusted. Here, the air mixing door 36 is driven by a servomotor (not shown) activated by a control signal outputted from the control device.

Further, a face door (not shown) for adjusting an opening area of the face blowoff port, a foot door (not shown) for adjusting an opening area of the foot blowoff port, and a defroster door (not shown) for adjusting an opening area of the defroster blowoff port are arranged on the upstream side of the flow of air of the face blowoff port, the foot blowoff port, and the defroster blowoff port, respectively.

Each of the face door, the foot door, and the defroster door constructs a blowoff mode switching part for switching a blowoff mode and is driven by a servomotor (not shown) having its action controlled by a control signal outputted from the control device, which will be described later, via a link mechanism or the like.

Next, an electric control part of the present embodiment will be described. The control device is constructed of a publicly known microcomputer, which includes a CPU, a ROM, a RAM, and the like, and its peripheral circuit. The control device performs various operations and processings on the basis of control programs stored in the ROM and controls the actions of the various control units coupled to the output side thereof.

Further, to the input side of the control device are coupled a set of various kinds of sensors for controlling air conditioning. The set of various kinds of sensors includes: an indoor air temperature sensor for detecting temperature Tr in the vehicle compartment; an outdoor air temperature sensor for detecting an outdoor air temperature Tam; an insolation sensor for detecting the amount of insolation Ts in the vehicle compartment, an evaporator temperature sensor as an evaporator blowoff temperature detection part for detecting a blowoff temperature (evaporator temperature) Te of the air blown off from the indoor evaporator 20; a discharge temperature sensor Td for detecting the temperature of the refrigerant discharged from the compressor 11; and a blowoff air temperature sensor as a blowoff temperature detection part for detecting the temperature of the air blown off into the vehicle compartment (vehicle compartment blowoff air temperature) TAV.

Further, to the input side of the control device is coupled an operation panel (not shown) arranged near the instrument panel of the front in the vehicle compartment. Operation signals are inputted to the control device from various operation switches provided on the operation panel. Specifically, various operation switches provided on the operation panel include an air conditioning switch (A/C switch) for setting whether or not the vehicle compartment feed air is cooled by the indoor air-conditioning unit 30, a temperature setting switch for setting a set temperature in the vehicle compartment, and the like.

In this regard, the control device is an integrated construction of control parts for controlling actions of various control units coupled to the output side thereof, and the respective constructions (software and hardware) for controlling the actions of the respective control units construct the control parts for controlling the actions of the respective control units.

For example, a construction for controlling an electric motor of the compressor 11 constructs a discharge capacity control part, a construction for controlling the first expansion valve 14 constructs a first throttle control part, a construction for controlling the second expansion valve 19 constructs a second throttle control part, and a construction for controlling the first and second opening/closing valves 17, 23 construct passage switching parts.

Next, the action of the vehicular air conditioner 1 of the present embodiment in the construction described above will be described. The vehicular air conditioner 1 of the present embodiment, as described above, can switch the cooling mode for cooling the interior of the vehicle compartment, the heating mode for heating the interior of the vehicle compartment, and the dehumidifying and heating mode for dehumidifying and heating the interior of the vehicle compartment.

Figure 2:
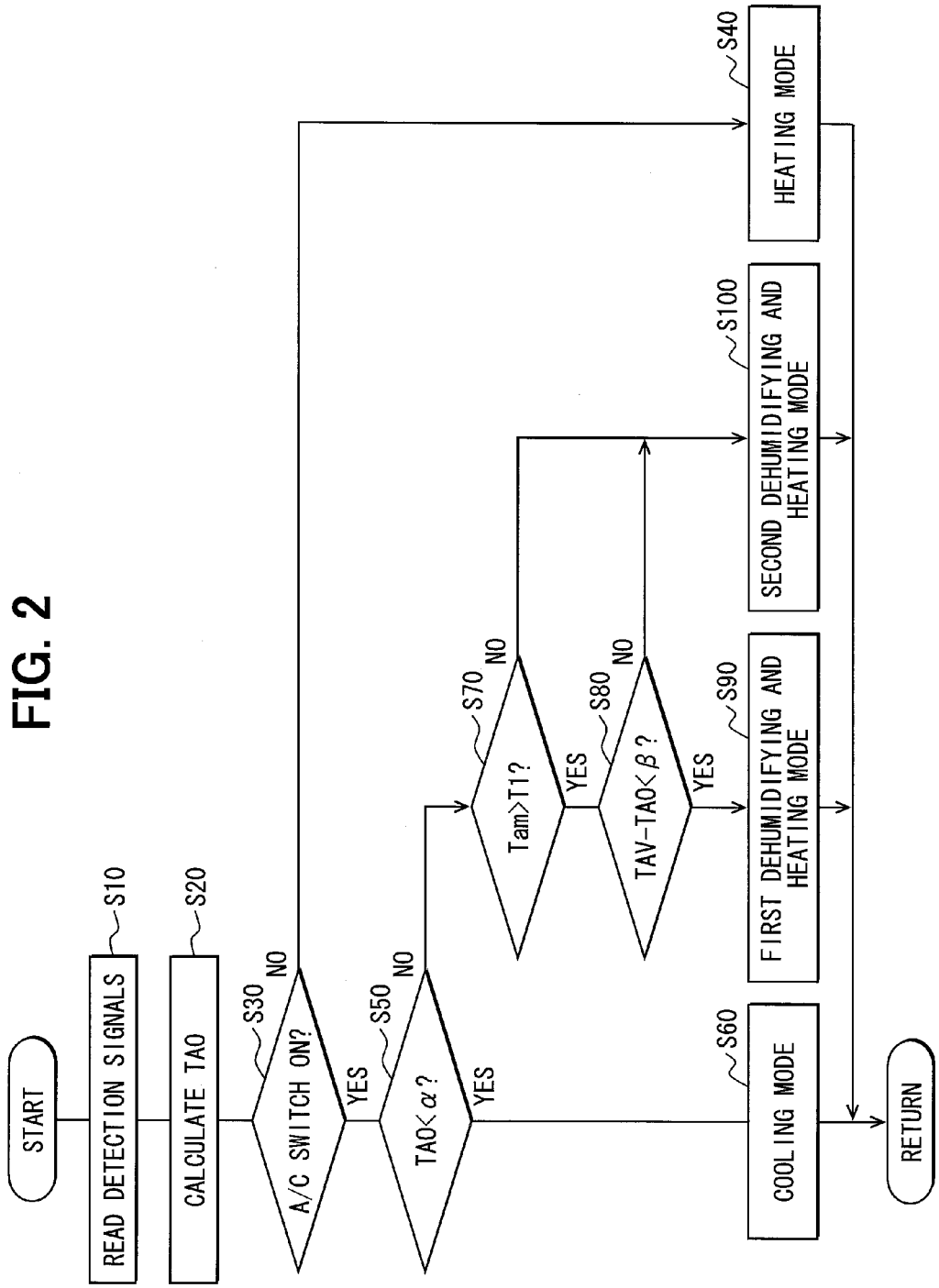
FIG. 2 is a flow chart to show a flow of a control processing carried out by a control device of the vehicular air conditioner according to the first embodiment.

A control processing of switching various operation modes will be described on the basis of FIG. 2. FIG. 2 is a flow chart to show the flow of the control processing performed by the control device of the vehicular air conditioner 1 of the present embodiment. Here, the flow chart shown in FIG. 2 is executed as a sub-routine of a main routine of an air conditioning control (not shown). The respective control steps in FIG. 2 construct various function realizing parts included by the control device.

First, the control device reads detection signals of the set of sensors described above and an operation signal of the operation panel (S10) and calculates a target blowoff temperature TAO of a target temperature of a blowoff air blown off into the vehicle compartment by the following mathematical equation 1 on the basis of the values of the read detection signals and the read operation signal (S20). Thus, the control step S20 of the present embodiment constructs a target blowoff temperature determination part.

$$TAO = Kset \times Tset - Kr \times Tr - Kam \times Tam - Ks \times Ts + C \quad (F1)$$

Here, Tset is a vehicle compartment set temperature set by the temperature setting switch, Tr is a vehicle compartment temperature (indoor air temperature) detected by the indoor air sensor, Tam is an outdoor air temperature detected by the outdoor air sensor, and Ts is the amount of insolation detected by the insolation sensor. Kset, Kr, Kam, and Ks are control gains and C is a constant for correction.

Next, it is determined whether or not the A/C switch of the operation panel is turned on (S30). As a result, if it is determined that the A/C switch is turned off (S30: NO), an operation mode is determined to be the heating mode in which the vehicle compartment feed air is not cooled by the indoor air conditioning unit 30 (S40), whereas if it is determined that the A/C switch is turned on (S30: YES), the control processing proceeds to step S50.

In step S50, it is determined whether or not the target blowoff temperature TAO is smaller than a cooling reference temperature α determined previously. As a result, if it is determined that the target blowoff temperature TAO is smaller than the cooling reference temperature α (S50: YES), the operation mode is determined to be the cooling mode so as to cool the interior of the vehicle compartment (S60), whereas if it is determined that the target blowoff temperature TAO is equal to or more than the cooling reference temperature α (S50: NO), the control processing proceeds to step S70.

In step S70, it is determined whether or not the detection value (outdoor air temperature) of the outdoor air temperature sensor is higher than an outdoor air reference temperature T1 determined previously. As a result, if it is determined that the detection value of the outdoor air temperature sensor is higher than the outdoor air reference temperature T1 (S70: YES), it is further determined whether or not a temperature difference (=TAV−TAO) between the detection value of the blowoff air temperature sensor (vehicle compartment blowoff air temperature TAV) and the target blowoff temperature TAO is smaller than a reference value β determined previously (hereinafter referred to as a threshold β) (S80).

As a result of a determination processing of step S80, if it is determined that the temperature difference between the vehicle compartment blowoff air temperature TAV and the target blowoff temperature TAO is smaller than the reference value β(S80: YES), the operation mode is determined to be the first dehumidifying and heating mode of a dehumidifying and heating mode at the time of a usual operation in which a temperature adjustable range of the air blown off into the vehicle compartment becomes a wide range from a low temperature to a high temperature (S90).

On the other hand, if it is determined that the detection value of the outdoor air temperature sensor is equal to or lower than the outdoor air reference temperature T1 (S70: NO) or that the temperature difference between the vehicle compartment blowoff air temperature TAV and the target blowoff temperature TAO is equal to or more than the reference value β(S80: NO), the operation mode is determined to be the second dehumidifying and heating mode in which the temperature adjustable range of the air blown off into the vehicle compartment becomes a higher temperature range than the first dehumidifying and heating mode (S100).

In this way, the respective operation modes can be suitably switched to the heating mode, the cooling mode, the first dehumidifying and heating mode, and the second dehumidifying and heating mode according to the operation environment of the vehicular air conditioner 1.

Next, the actions in the heating mode, the cooling mode, the first dehumidifying and heating mode, and the second dehumidifying and heating mode will be described.

(A) Heating Mode

In the heating mode, the control device opens the second refrigerant passage 16 by the first opening/closing valve 17 and closes (blocks) the bypass passage 22 by the second opening/closing valve 23. Further, the control device closes (fully closes) the third refrigerant passage 18 by the second expansion valve 19. In this way, the refrigerant passage of the refrigerant cycle device 10 is switched to a refrigerant passage in which the refrigerant flows in the manner shown by black arrows in FIG. 1.

In this construction of the refrigerant passage, the control device determines the operating states of the respective control units (control signals to be outputted to the respective control units) coupled to the control device on the basis of the target blowoff temperature TAO and the detection signals of the set of sensors.

For example, the refrigerant discharge capacity of the compressor 11, that is, the control signal to be outputted to the electric motor 11b of the compressor 11 is determined in the following manner. First, a target condenser temperature TCO of the indoor condenser 12 is determined on the basis of the target blowoff temperature TAO with reference to a control map stored previously in the control device.

A control signal to be outputted to the electric motor 11b of the compressor 11 is determined in such a way as to bring the temperature of air blown off into the vehicle compartment close to the target blowoff temperature TAO on the basis of a difference between the target condenser temperature TCO and the detection value of the discharge temperature sensor by the use of a feedback control technique.

Further, a control signal to be outputted to the first expansion valve 14 is determined in such a way as to bring the degree of super-cooling of the refrigerant flowing into the first expansion valve 14 close to a target degree of super-cooling, which is determined previously in such a way as to bring a coefficient of performance (COP) of the cycle close to a maximum value.

Still further, a control signal to be outputted to the servomotor of the air mixing door 36 is determined in such a way that the air mixing door 36 closes the cooling air bypass passage 35 to thereby make the total amount of flow of the air after passing through the indoor evaporator 20 pass through the air passage of the heater core 34 and the indoor condenser 12.

The control signals determined in the manner described above are outputted to the respective control units. Thereafter, a control routine of: performing a determination processing of the operation mode→determining the operating states of various kinds of control units→outputting the control signal is executed repeatedly at a specified period until the vehicular air conditioner 1 is required to stop its action by the operation panel. Here, the repetition of the control routine like this is performed in the same way at the time of the other operation mode.

Thus, in the refrigerant cycle device 10 at the time of the heating mode, the high-pressure refrigerant discharged from the compressor 11 flows into the indoor condenser 12. The refrigerant flowing into the indoor condenser 12 exchanges heat with the vehicle compartment feed air blown from the blower 32 and passing through the indoor evaporator 20 to thereby radiate heat to the vehicle compartment feed air. In this way, the vehicle compartment feed air is heated.

The refrigerant flowing out of the indoor condenser 12 flows into the first expansion valve 14 via the first refrigerant passage 13, thereby being reduced in pressure and expanded to a low-pressure refrigerant by the first expansion valve 14. The low-pressure refrigerant reduced in pressure by the first expansion valve 14 flows into the outdoor heat exchanger 15 and absorbs heat from the outdoor air blown from the blower fan. The refrigerant flowing out of the outdoor heat exchanger 15 flows into the accumulator 21 via the second refrigerant passage 16, thereby being separated into vapor and liquid.

The vapor-phase refrigerant separated in the accumulator 21 is sucked from a suction side of the compressor 11 and is again compressed by the compressor 11. In this regard, the liquid-phase refrigerant separated in the accumulator 21 is accumulated in the accumulator 21 as a surplus refrigerant which is not required so as to exert a refrigeration capacity required of the cycle. Here, the third refrigerant passage 18 is closed by the second expansion valve 19, so that the refrigerant does not flow into the indoor evaporator 20.

As described above, in the heating mode, the heat of the high-pressure refrigerant discharged from the compressor 11 is radiated to the vehicle compartment feed air in the indoor evaporator 12 and the heat of the cooling water is radiated to the vehicle compartment feed air in the heater core 34, whereby the heated vehicle compartment feed air can be blown off into the vehicle compartment. In this way, the heating of the interior of the interior of the vehicle compartment can be realized.

(B) Cooling Mode

In the cooling mode, the control device closes the second refrigerant passage 16 by the first opening/closing valve 17 and closes the bypass passage 22 by the second opening/closing valve 23. Further, the control device puts the first refrigerant passage 13 into a fully closed state by the first expansion valve 14. In this way, the refrigerant passage of the refrigerant cycle device 10 is switched to a refrigerant passage in which the refrigerant flows in the manner shown by white arrows in FIG. 1.

In this construction of the refrigerant passage, the control device determines the operating states of the respective control units (control signals to be outputted to the respective control units) coupled to the control device on the basis of the target blowoff temperature TAO and the detection signals of the set of sensors.

For example, the refrigerant discharge capacity of the compressor 11, that is, the control signal to be outputted to the electric motor 11b of the compressor 11 is determined in the following manner. First, a target evaporator blowoff temperature TEO of the air blown off from the indoor evaporator 20 is determined on the basis of the target blowoff temperature TAO with reference to a control map stored previously in the control device. Thus, of the control routines executed by the control device, a control step of determining the target evaporator blowoff temperature TEO constructs a target evaporator blowoff temperature determination part.

A control signal to be outputted to the electric motor 11b of the compressor 11 is determined in such a way as to bring the temperature of air passing through the indoor evaporator 20 close to the target blowoff temperature TAO on the basis of a difference between the target evaporator blowoff temperature TEO and the detection value of the evaporator temperature sensor by the use of a feedback control technique.

Further, a control signal to be outputted to the second expansion valve 19 is determined in such a way as to bring the degree of super-cooling of the refrigerant flowing into the second expansion valve 19 close to a target degree of super-cooling, which is determined previously in such a way as to bring the coefficient of performance (COP) of the cycle close to the maximum value.

Still further, a control signal to be outputted to the servomotor of the air mixing door 36 is determined in such a way that the air mixing door 36 closes the air passage of the heater core 34 and the indoor condenser 12 to thereby make the total flow of the air after passing through the indoor evaporator 20 pass through the cooling air bypass passage 35.

Thus, in the refrigerant cycle device 10 at the time of the heating mode, the high-pressure refrigerant discharged from the compressor 11 flows into the indoor condenser 12. At this time, the air mixing door 36 closes the air passage of the heater core 34 and the indoor condenser 12, so that the refrigerant flowing into the indoor condenser 12 hardly exchanges heat with the vehicle compartment feed air and flows out of the indoor condenser 12.

The refrigerant flowing out of the indoor condenser 12 flows into the first expansion valve 14 via the first refrigerant passage 13. At this time, the first expansion valve 14 puts the first refrigerant passage 13 into a fully closed state, so that the refrigerant flowing out of the indoor condenser 12 is not reduced in pressure by the first expansion valve 14 and flows into the outdoor heat exchanger 15. The refrigerant flowing into the outdoor heat exchanger 15 radiates heat to the outdoor air blown from the blower fan in the outdoor heat exchanger 15.

The refrigerant flowing out of the outdoor heat exchanger 15 flows into the second expansion valve 19 via the third refrigerant passage 18, thereby being reduced in pressure and expanded to a low-pressure refrigerant by the second expansion valve 19. The low-pressure refrigerant reduced in pressure by the second expansion valve 19 flows into the indoor evaporator 20 and absorbs heat from the vehicle compartment feed air blown from the blower 32, thereby being evaporated. In this way, the vehicle compartment feed air is cooled.

The refrigerant flowing out of the indoor evaporator 20 flows into the accumulator 21 and is separated into vapor and liquid. The vapor-phase refrigerant separated in the accumulator 21 is sucked from the suction side of the compressor 11 and is again compressed by the compressor 11. In this regard, the liquid-phase refrigerant separated in the accumulator 21 is accumulated in the accumulator 21 as a surplus refrigerant which is not required so as to exert a refrigeration capacity required of the cycle.

As described above, in the cooling mode, the air mixing door 36 blocks the air passage of the indoor condenser 12 and the heater core 34, so that the vehicle compartment feed air cooled by the indoor evaporator 20 can be blown off into the vehicle compartment. In this way, the cooling of the interior of the vehicle compartment can be realized.

(C) First Dehumidifying and Heating Mode

In the first dehumidifying and heating mode, the control device closes the second refrigerant passage 16 by the first opening/closing valve 17 and closes the bypass passage 22 by the second opening/closing valve 23. Further, the control device puts the first and the second expansion valves 14, 19 into a throttle state or a fully opened state. In this way, the refrigerant passage of the refrigerant cycle device 10 is switched to the first refrigerant passage in which the refrigerant flows in the manner shown by white arrows with lateral lines in FIG. 1, as in the case of the cooling mode. Here, in the first dehumidifying and heating mode (first refrigerant passage), the indoor heat exchanger 15 and the indoor evaporator 20 are coupled in series to the flow of the refrigerant.

In this construction of the refrigerant passage, the control device determines the operating states of the respective control units (control signals to be outputted to the respective control units) coupled to the control device on the basis of the target blowoff temperature TAO, the detection signals of the set of sensors, and the like.

For example, the control signal to be outputted to the electric motor 11b of the compressor 11 is determined in the same way as the cooling mode. Further, a control signal to be outputted to the servomotor of the air mixing door 36 is determined in such a way that the air mixing door 36 blocks the cooling air bypass passage 35 to make the total flow of the air after passing through the indoor evaporator 20 pass through the air passage of the heater core 34 and the indoor condenser 12.

Further, the first expansion valve 14 and the second expansion valve 19 have their opening areas varied according to the target blowoff temperature TAO of the target temperature of the air blown off into the vehicle compartment. Specifically, as the target blowoff temperature TAO of the target temperature of the air blown off into the vehicle compartment increases, the control device decreases the passage area of the first refrigerant passage 13 by the first expansion valve 14 and increases the passage area by the second expansion valve 19. In this way, in the first dehumidifying and heating mode, four steps modes from a first mode to a fourth mode are performed.

(C-1) First Mode

The first mode is performed in the case where the target blowoff temperature TAO is equal to or higher than a cooling reference temperature α and is equal to or lower than a first reference temperature determined previously at the time of the first dehumidifying and heating mode.

In the first mode, the first refrigerant passage 13 is put into a fully opened state by the first expansion valve 14 and the second expansion valve 19 is put into a throttle state. Thus, the cycle construction (refrigerant passage) is put into the same refrigerant passage as in the cooling mode, but the air mixing door 36 puts the air passage of the indoor condenser 12 and the heater core 34 into a fully opened state, so that the state of the refrigerant circulated in the cycle changes as shown by a Mollier diagram in FIG. 3.

Figure 3:
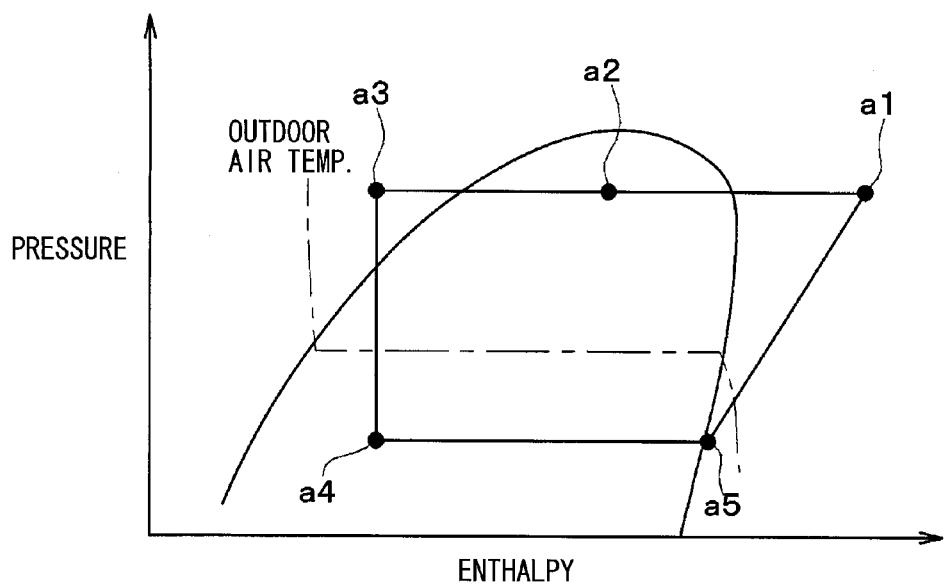
FIG. 3 is a Mollier diagram to show a state of a refrigerant at the time of a first dehumidifying and heating mode (first mode) in a refrigerant cycle device according to the first embodiment.

That is, as shown in FIG. 3, the high-pressure refrigerant (point a1) discharged from the compressor 11 flows into the indoor condenser 12 and exchanges heat with the vehicle compartment feed air cooled and dehumidified by the indoor evaporator 20, thereby radiating heat to the vehicle compartment feed air (point a1→point a2 in FIG. 3). In this way, the vehicle compartment feed air is heated.

The refrigerant flowing out of the indoor condenser 12 flows into the first expansion valve 14 via the first refrigerant passage 13. At this time, the first expansion valve 14 puts the first refrigerant passage 13 into the fully opened state, so that the refrigerant flowing out of the indoor condenser 12 is not reduced in pressure by the first expansion valve 14 and flows into the indoor heat exchange 15. The refrigerant flowing into the outdoor heat exchanger 15 radiates heat to the outdoor air blown from the blower fan in the outdoor heat exchanger 15 (point a2→point a3 in FIG. 3).

The refrigerant flowing out of the outdoor heat exchanger 15 flows into the second expansion valve 19 via the third refrigerant passage 18, thereby being reduced in pressure and expanded to a low-pressure refrigerant by the second expansion valve 19 (point a3→point a4 in FIG. 3). The low-pressure refrigerant reduced in pressure by the second expansion valve 19 flows into the indoor evaporator 20 and absorbs heat from the vehicle compartment feed air blown from the blower 32, thereby being evaporated (point a4→point a5 in FIG. 3). In this way, the vehicle compartment feed air is cooled. The refrigerant flowing out of the indoor evaporator 20, as in the case of the cooling mode, flows to the accumulator 21 and then flows to the suction side of the compressor 11 and is again compressed by the compressor 11.

As described above, at the time of the first mode of the first dehumidifying and heating mode, the vehicle compartment feed air cooled and dehumidified by the indoor evaporator 20 can be heated by the indoor condenser 12 and can be blown off into the vehicle compartment. In this way, the dehumidifying and heating of the interior of the vehicle compartment can be realized.

(C-2) Second Mode

The second mode is performed in the case where the target blowoff temperature TAO is equal to or higher than the first reference temperature and is equal to or lower than a second reference temperature determined previously. In the second mode, the first expansion valve 14 is put into a throttle state and the throttle opening of the second expansion valve 19 (passage area of the third refrigerant passage 18) is put into a throttle state increased as compared with the throttle opening at the time of the first mode. Thus, in the second mode, the state of the refrigerant circulated in the cycle change as shown by a Mollier diagram in FIG. 4.

Figure 4:
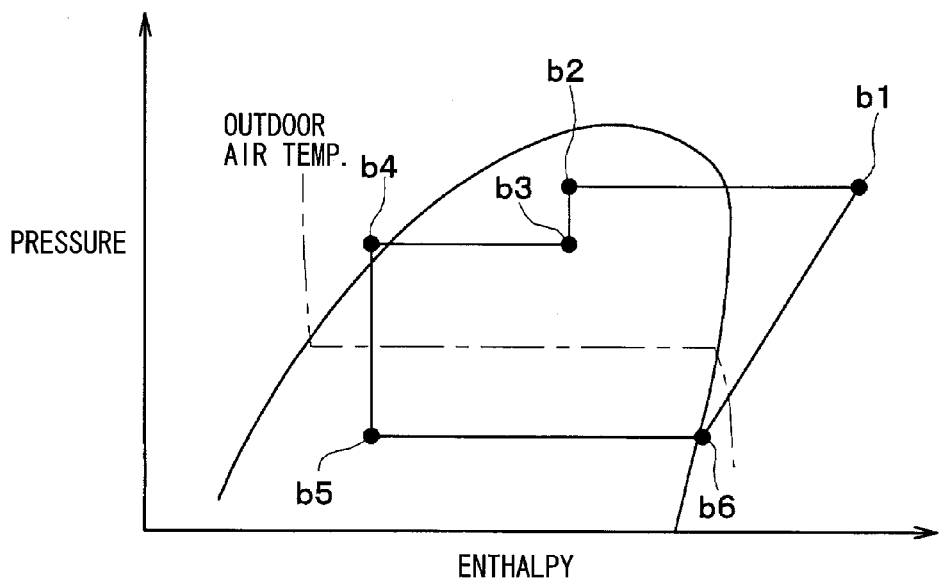
FIG. 4 is a Mollier diagram to show a state of the refrigerant at the time of the first dehumidifying and heating mode (second mode) in the refrigerant cycle device according to the first embodiment.

That is, as shown in FIG. 4, the high-pressure refrigerant (point b1) discharged from the compressor 11 flows into the indoor condenser 12 and exchanges heat with the vehicle compartment feed air cooled and dehumidified by the indoor evaporator 20, thereby radiating heat to the vehicle compartment feed air (point b1→point b2 in FIG. 4). In this way, the vehicle compartment feed air is heated.

The refrigerant flowing out of the indoor condenser 12 flows into the first expansion valve 14 via the first refrigerant passage 13, thereby being reduced in pressure to an intermediate-pressure refrigerant (point b2→point b3 in FIG. 4). The intermediate-pressure refrigerant reduced in pressure by the first expansion valve 14 flows into the outdoor heat exchanger 15 and radiates heat to the outdoor air blown from the blower fan (point b3→point b4 in FIG. 4).

The refrigerant flowing out of the outdoor heat exchanger 15 flows into the second expansion valve 19 via the third refrigerant passage 18, thereby being reduced in pressure and expanded to a low-pressure refrigerant by the second expansion valve 19 (point b4→point b5 in FIG. 4). The low-pressure refrigerant reduced in pressure by the second expansion valve 19 flows into the indoor evaporator 20 and absorbs heat from the vehicle compartment feed air blown from the blower 32, thereby being evaporated (point b5→point b6 in FIG. 4). In this way, the vehicle compartment feed air is cooled. The refrigerant flowing out of the indoor evaporator 20, as in the case of the cooling mode, flows to the accumulator 21 and then flows to the suction side of the compressor 11 and is again compressed by the compressor 11.

As described above, at the time of the second mode of the first dehumidifying and heating mode, as in the case of the first mode, the vehicle compartment feed air cooled and dehumidified by the indoor evaporator 20 can be heated by the indoor condenser 12 and can be blown off into the vehicle compartment. In this way, the dehumidifying and heating of the interior of the vehicle compartment can be realized.

At this time, in the second mode, the first expansion valve 14 is put into the throttle state, so that the temperature of the refrigerant flowing into the outdoor heat exchanger 15 can be decreased as compared with the first mode. Thus, a temperature difference between the temperature of the refrigerant and the temperature of the outdoor air in the outdoor heat exchanger 15 can be decreased and hence the amount of heat radiated by the refrigerant in the outdoor heat exchange 15 can be decreased.

As a result, the amount of heat radiated by the refrigerant in the indoor condenser 12 can be increased without increasing the amount of flow of the refrigerant circulated in the cycle as compared with the first mode, and hence the temperature of the air blown off from the indoor condenser 12 can be increased as compared with the first mode.

(C-3) Third Mode

The third mode is performed in the case where the target blowoff temperature TAO is equal to or higher than the second reference temperature and is equal to or lower than a third reference temperature determined previously. In the third mode, the throttle opening of the first expansion valve 14 (passage area of the first refrigerant passage 13) is put into a throttle state decreased as compared with the throttle opening at the time of the second mode and the throttle opening of the second expansion valve 19 (passage area of the third refrigerant passage 18) is put into a throttle state increased as compared with the throttle opening at the time of the second mode. Thus, in the third mode, the state of the refrigerant circulated in the cycle changes as shown by a Mollier diagram in FIG. 5.

Figure 5:
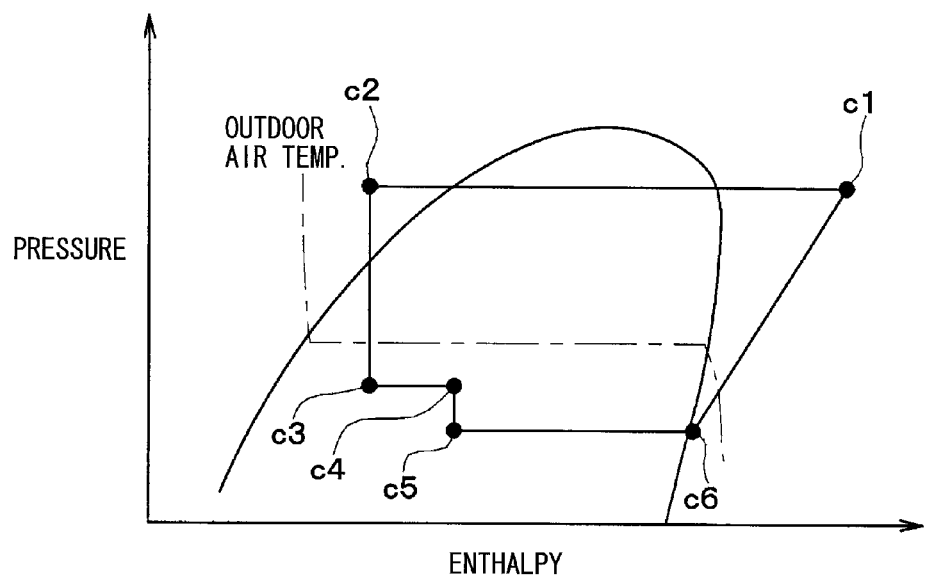
FIG. 5 is a Mollier diagram to show a state of the refrigerant at the time of the first dehumidifying and heating mode (third mode) in the refrigerant cycle device according to the first embodiment.

That is, as shown in FIG. 5, the high-pressure refrigerant (point c1) discharged from the compressor 11 flows into the indoor condenser 12 and exchanges heat with the vehicle compartment feed air cooled and dehumidified by the indoor evaporator 20, thereby radiating heat to the vehicle compartment feed air (point c1→point c2 in FIG. 5). In this way, the vehicle compartment feed air is heated.

The refrigerant flowing out of the indoor condenser 12 flows into the first expansion valve 14 via the first refrigerant passage 13, thereby being reduced in pressure to an intermediate-pressure refrigerant whose temperature is lower than the outdoor air temperature (point c2→point c3 in FIG. 5). The intermediate-pressure refrigerant reduced in pressure by the first expansion valve 14 flows into the outdoor heat exchanger 15 and absorbs heat from the outdoor air blown from the blower fan (point c3→point c4 in FIG. 5).

The refrigerant flowing out of the outdoor heat exchanger 15 flows into the second expansion valve 19 via the third refrigerant passage 18, thereby being reduced in pressure and expanded to a low-pressure refrigerant by the second expansion valve 19 (point c4→point c5 in FIG. 5). The low-pressure refrigerant reduced in pressure by the second expansion valve 19 flows into the indoor evaporator 20 and absorbs heat from the vehicle compartment feed air blown from the blower 32, thereby being evaporated (point c5→point c6 in FIG. 45). In this way, the vehicle compartment feed air is cooled. The refrigerant flowing out of the indoor evaporator 20, as in the case of the cooling mode, flows to the accumulator 21 and then flows to the suction side of the compressor 11 and is again compressed by the compressor 11.

As described above, at the time of the third mode of the first dehumidifying and heating mode, as in the case of the first mode and the second mode, the vehicle compartment feed air cooled and dehumidified by the indoor evaporator 20 can be heated by the indoor condenser 12 and can be blown off into the vehicle compartment. In this way, the dehumidifying and heating of the interior of the vehicle compartment can be realized.

At this time, in the third mode, the throttle opening of the first expansion valve 14 is decreased to make the outdoor heat exchanger 15 function as a heat absorber (evaporator), so that the temperature of the air blown off from the indoor condenser 12 can be increased as compared with the second mode.

As a result, as compared with the second mode, the density of the refrigerant sucked by the compressor 11 can be increased and hence the amount of heat radiated by the refrigerant in the indoor condenser 12 can be increased without increasing the number of revolutions (refrigerant discharger capacity) of the compressor 11. Thus, the temperature of the air blown off from the indoor condenser 12 can be increased as compared with the second mode.

(C-4) Fourth Mode

The fourth mode is performed in the case where the target blowoff temperature TAO is higher than the third reference temperature. In the fourth mode, the throttle opening of the first expansion valve 14 (passage area of the first refrigerant passage 13) is put into a throttle state decreased as compared with the throttle opening at the time of the third mode and the third refrigerant passage 18 is put into the fully opened state by the second expansion valve 19. Thus, in the fourth mode, the state of the refrigerant circulated in the cycle changes as shown by a Mollier diagram in FIG. 6.

Figure 6:
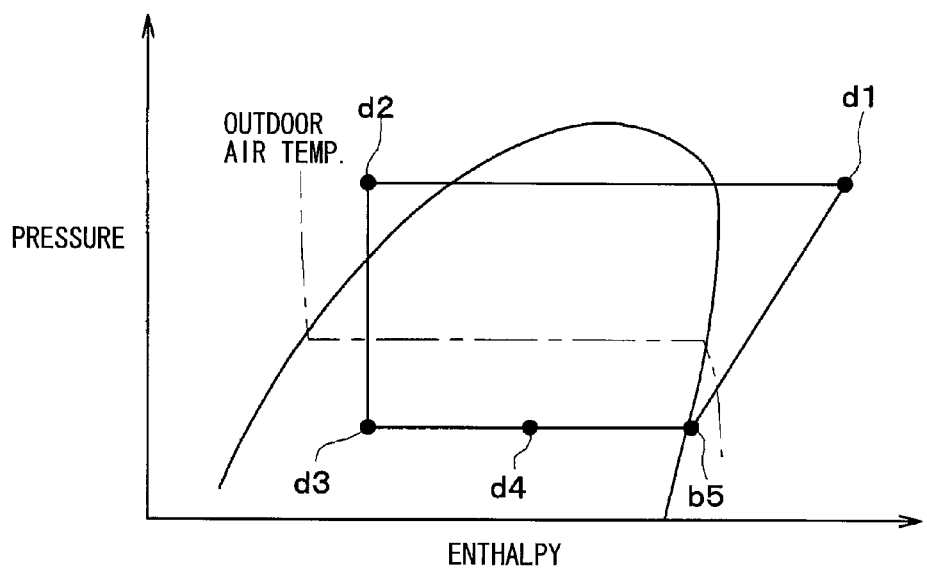
FIG. 6 is a Mollier diagram to show a state of the refrigerant at the time of the first dehumidifying and heating mode (fourth mode) in the refrigerant cycle device according to the first embodiment.

That is, as shown in FIG. 6, the high-pressure refrigerant (point d1) discharged from the compressor 11 flows into the indoor condenser 12 and exchanges heat with the vehicle compartment feed air cooled and dehumidified by the indoor evaporator 20, thereby radiating heat to the vehicle compartment feed air (point d1→point d2 in FIG. 6). In this way, the vehicle compartment feed air is heated.

The refrigerant flowing out of the indoor condenser 12 flows into the first expansion valve 14 via the first refrigerant passage 13, thereby being reduced in pressure to a low-pressure refrigerant (point d2→point d3 in FIG. 6). The intermediate-pressure refrigerant reduced in pressure by the first expansion valve 14 flows into the outdoor heat exchanger 15 and absorbs heat from the outdoor air blown from the blower fan (point d3→point d4 in FIG. 6).

The refrigerant flowing out of the outdoor heat exchanger 15 flows into the second expansion valve 19 via the third refrigerant passage 18. At this time, the second expansion valve 19 leaves the third refrigerant passage 18 in the fully opened state, so that the refrigerant flowing out of the outdoor heat exchanger 15 flows into the indoor evaporator 20 without being reduced in pressure by the second expansion valve 19.

The low-pressure refrigerant flowing into the indoor evaporator 20 absorbs heat from the vehicle compartment feed air blown from the blower 32, thereby being evaporated (point d4→point d5 in FIG. 6). In this way, the vehicle compartment feed air is cooled. The refrigerant flowing out of the indoor evaporator 20, as in the case of the cooling mode, flows to the accumulator 21 and then flows to the suction side of the compressor 11 and is again compressed by the compressor 11.

As described above, at the time of the fourth mode of the first dehumidifying and heating mode, as in the case of the first to third modes, the vehicle compartment feed air cooled and dehumidified by the indoor evaporator 20 can be heated by the indoor condenser 12 and can be blown off into the vehicle compartment. In this way, the dehumidifying and heating of the interior of the vehicle compartment can be realized.

At this time, in the fourth mode, as in the case of the third mode, the outdoor heat exchanger 15 can be made to function as the heat absorber (evaporator) and the throttle opening of the first expansion valve 14 is decreased as compared with the throttle opening in the third mode, so that the evaporation temperature of the refrigerant in the outdoor heat exchanger 15 can be decreased. Thus, as compared with the third mode, a temperature difference between the temperature of the refrigerant and the temperature of the outdoor air in the outdoor heat exchanger 15 can be decreased and hence the amount of heat absorbed by the refrigerant in the outdoor heat exchange 15 can be increased.

As a result, as compared with the third mode, the density of the refrigerant sucked by the compressor 11 can be increased and hence the amount of heat radiated by the refrigerant in the indoor condenser 12 can be increased without increasing the number of revolutions (refrigerant discharger capacity) of the compressor 11. Thus, the temperature of the air blown off from the indoor condenser 12 can be increased as compared with the third mode.

Figure 25:
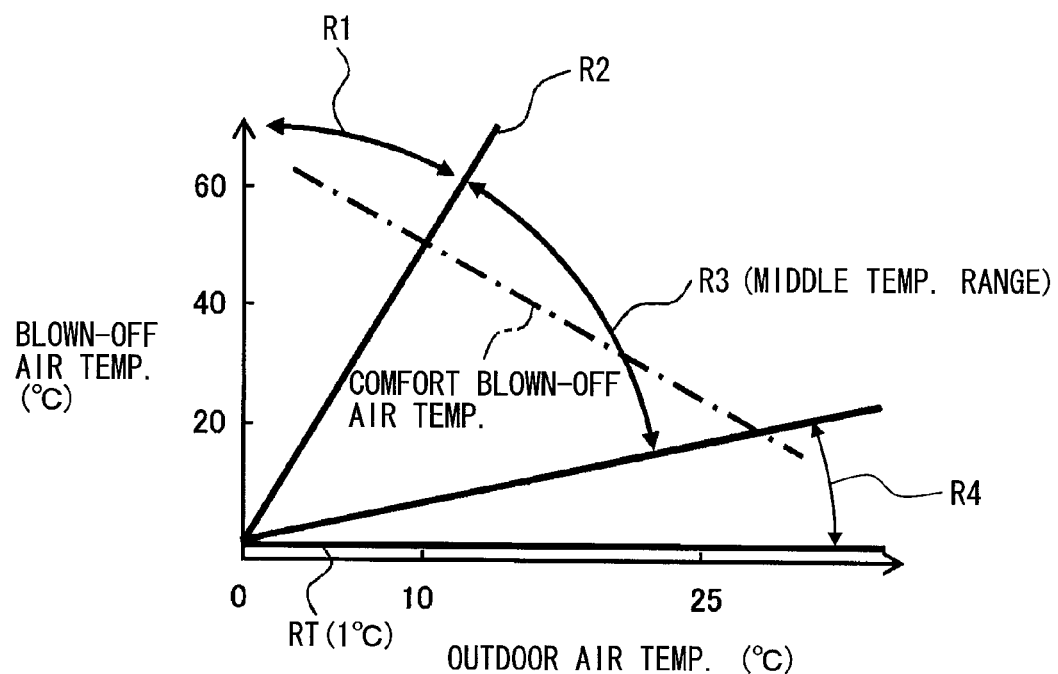
FIG. 25 is an illustrative graph to illustrate a temperature adjustable range of air blown off into a chamber in a conventional air conditioner.

In this way, in the first dehumidifying and heating mode, by varying the throttle openings of the first expansion valve 14 and the second expansion valve 19 according to the target blowoff temperature TAO, the temperature of the air blown off into the vehicle compartment can be adjusted in a wide temperature range from a low temperature to a high temperature (for example, a range including an intermediate temperature rang shown in FIG. 25).

In other words, in the first dehumidifying and heating mode, by switching the outdoor heat exchanger 15 from a state in which the outdoor heat exchanger 15 is made to function as a refrigerant radiator for making the refrigerant heat to a state in which the outdoor heat exchanger 15 is made to function as the evaporator for making the refrigerant absorb heat, the amount of heat radiated by the refrigerant and the amount of heat absorbed by the refrigerant in the outdoor heat exchanger 15 can be adjusted.

Thus, as compared with a cycle construction in which the outdoor heat exchanger 15 is made to function as either the refrigerant radiator or the evaporator, the amount of heat radiated by the refrigerant in the indoor heat exchange 12 can be adjusted within a wide range. Thus, a temperature adjustment range of the air blown off into the space to be air-conditioned at the time of the dehumidifying operation can be expanded.

(D) Second Dehumidifying and Heating Mode

In the second dehumidifying and heating mode, the control device opens the second refrigerant passage 16 by the first opening/closing valve 17 and opens the bypass passage 22 by the second opening/closing valve 23. Further, the control device puts the first and second expansion valves 14, 19 into a throttle state, respectively. Thus, the refrigerant passage of the refrigerant cycle device 10 is switched to a second refrigerant passage in which the refrigerant flows in the manner shown by white arrows with oblique lines in FIG. 1. Here, in the second dehumidifying and heating mode (second refrigerant passage), the indoor heat exchanger 15 and the indoor evaporator 20 are coupled in parallel with respect to the flow of the refrigerant.

In this construction of the refrigerant passage, the control device determines the operating states of the respective control units (control signals to be outputted to the respective control units) coupled to the control device on the basis of the target blowoff temperature TAO and the detection signals of the set of sensors.

For example, the control signal to be outputted to the electric motor 11b of the compressor 11 is determined in the same way as in the cooling mode. Further, a control signal to be outputted to the servomotor of the air mixing door 36 is determined in such a way that the air mixing door 36 blocks the cooling air bypass passage 35 to make the total flow of the air after passing through the indoor evaporator 20 pass through the air passage of the heater core 34 and the indoor condenser 12.

Further, control signals to be outputted to the first expansion valve 14 and the second expansion valve 19 are determined in such a way that the openings of the first expansion valve 14 and the second expansion valve 19 become specified openings determined in advance for the second dehumidifying and heating mode.

Figure 7:
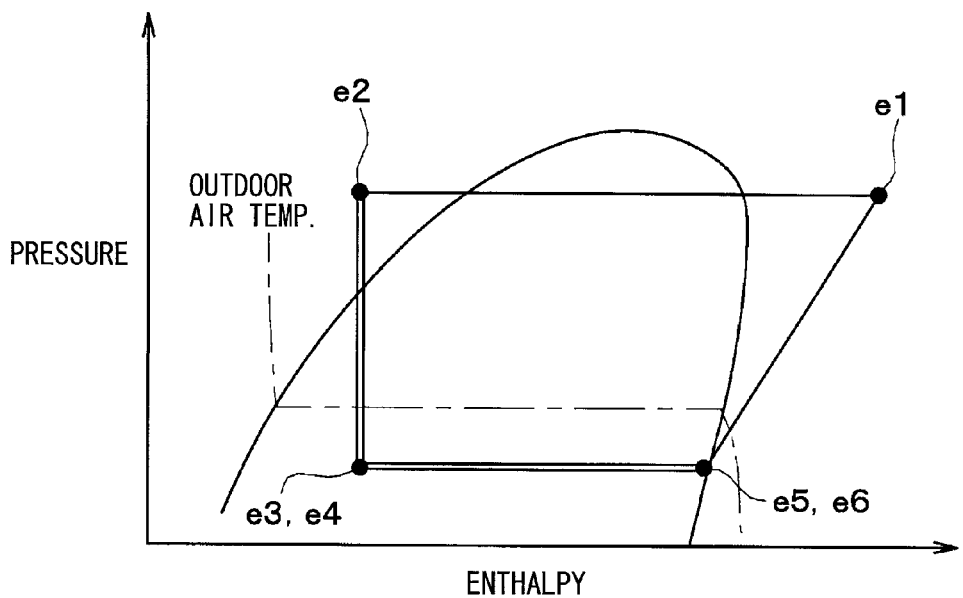
FIG. 7 is a Mollier diagram to show a state of the refrigerant at the time of a second dehumidifying and heating mode in the refrigerant cycle device according to the first embodiment.

Thus, in the refrigerant cycle device 10 at the time of the second dehumidifying and heating mode, as shown by a Mollier diagram in FIG. 7, the high-pressure refrigerant (point e1) discharged from the compressor 11 flows into the indoor condenser 12 and exchanges heat with the vehicle compartment feed air cooled and dehumidified by the indoor evaporator 20, thereby radiating heat to the vehicle compartment feed air (point e1→point e2 in FIG. 7). In this way, the vehicle compartment feed air is heated.

The refrigerant flowing out of the indoor condenser 12 flows into the first expansion valve 14 via the first refrigerant passage 13 and flows into the second expansion valve 19 via the bypass passage 22. The high-pressure refrigerant flowing into the first expansion valve 14 is reduced in pressure and becomes a low-pressure refrigerant (point e2→point e3 in FIG. 7). The low-pressure refrigerant reduced in pressure by the first expansion valve 14 flows into the outdoor heat exchanger 15 and absorbs heat from the outdoor air blown from the blower fan (point e3→point e5 in FIG. 7).

On the other hand, the high-pressure refrigerant flowing into the second expansion valve 19 is reduced in pressure and becomes a low-pressure refrigerant (point e2→point e4 in FIG. 7). The low-pressure refrigerant reduced in pressure by the second expansion valve 19 flows into the indoor evaporator 20 and absorbs heat from the vehicle compartment feed air blown from the blower 32 (point e4 point e6 in FIG. 7). In this way, the vehicle compartment feed air is cooled.

The refrigerant flowing out of the outdoor heat exchanger 15 and the refrigerant flowing out of the indoor evaporator 20 flow to the accumulator 21 and then flow to the suction side of the compressor 11 and are again compressed by the compressor 11. Here, in the present embodiment, the pressure of the refrigerant flowing out of the outdoor heat exchanger 15 becomes nearly equal to the pressure of the refrigerant flowing out of the indoor evaporator 20. Further, the third refrigerant passage 18 has the check valve 24, so that the refrigerant does not flow back from the bypass passage 22 to the outlet side of the outdoor heat exchanger 15.

As described above, at the time of the second dehumidifying and heating mode, unlike the first dehumidifying and heating mode, there is provided the refrigerant passage in which the outdoor heat exchange 15 and the indoor evaporator 20 are coupled in parallel to the flow of the refrigerant, so that the flow of the refrigerant flowing into the indoor evaporator 20 can be decreased. Thus, the amount of heat absorbed by the refrigerant in the indoor evaporator 20 can be decreased and hence the temperature of the air dehumidified by the indoor evaporator 20 can be adjusted by the indoor condenser 12 in a higher temperature range than in the first dehumidifying and heating mode. Here, when the amount of the refrigerant flowing into the indoor evaporator 20 is decreased, it is preferable to decrease the amount of the refrigerant within a range in which the vehicle compartment feed air can be sufficiently dehumidified.

In the vehicular air conditioner 1 of the present embodiment described above, as described above, by changing the refrigerant passage of the refrigerant cycle device 10, the adequate cooling, heating, and dehumidifying and heating of the interior of the vehicle compartment can be performed and hence the comfortable air-conditioning of the interior of the vehicle compartment can be realized.

In particular, in the vehicular air conditioner 1 of the present embodiment, the dehumidifying and heating mode can be switched between the first dehumidifying and heating mode and the second dehumidifying and heating mode. In the first dehumidifying and heating mode, by adjusting a heat exchanging capacity (heat radiating capacity and heat absorbing capacity) in the outdoor heat exchanger 15, the temperature of the air blown off into the vehicle compartment can be adjusted within a wide range from a low temperature to a high temperature. On the other hand, in the second dehumidifying and heating mode, the temperature of the air blown off into the vehicle compartment can be adjusted within a higher range than in the first dehumidifying and heating mode.

Thus, the temperature adjustable range of the air blown off into the vehicle compartment of the space to be air-conditioned can be expanded.

Further, the first dehumidifying and heating mode and the second dehumidifying and heating mode can be switched each other by the simple construction of the first opening/closing valve 17 and the second opening/closing valve 23, so that the construction of expanding the range of adjusting the temperature of the air blown off into the vehicle compartment can be realized in the concrete and with ease.

Second Embodiment

Figure 8:
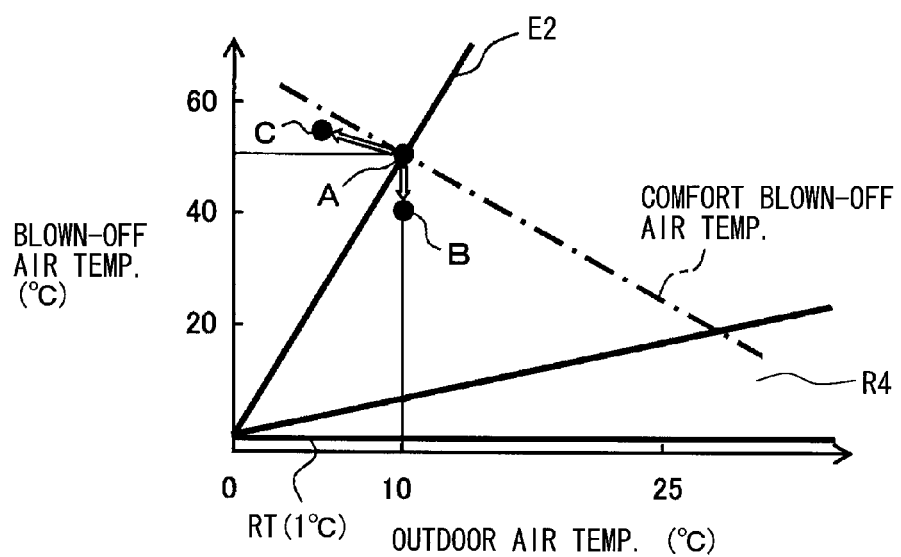
FIG. 8 is a graph to illustrate a temperature adjustable range of air blown off into a vehicle compartment in the vehicular air conditioner at the time of the second dehumidifying and heating mode.

A second embodiment of the present disclosure will be described on the basis of FIG. 8 to FIG. 10. FIG. 8 is an illustrative graph to illustrate the temperature adjustable range of the air blowoff into the vehicle compartment in the vehicular air conditioner 1 at the time of the second dehumidifying and heating mode.

In the refrigerant passage at the time of the second dehumidifying and heating mode in the first embodiment described above, the outlet side of the outdoor heat exchanger 15 meets the outlet side of the indoor evaporator 20, so that the pressure of the refrigerant in the outdoor heat exchanger 15 becomes nearly equal to the pressure of the refrigerant in the indoor evaporator 20. Thus, it is difficult that the evaporation temperature of the refrigerant in the outdoor heat exchanger 15 is made different from the evaporation temperature of the refrigerant in the indoor evaporator 20 to thereby adequately change the amount of heat absorbed by the refrigerant in the respective heat exchangers.

For this reason, it is difficult that, for example, an operating condition A (point A in FIG. 8) in which when the outdoor air temperature is 10° C., the temperature of the air blown off into the vehicle compartment is adjusted to 50° C. with the evaporation temperature of the refrigerant in the indoor evaporator 20 being adjusted to 1° C. is adequately shifted to an operating condition B (point B in FIG. 8) in which when the outdoor air temperature is 10° C., the temperature of the air blown off into the vehicle compartment is adjusted to 40° C. with the evaporation temperature of the refrigerant in the indoor evaporator 20 being adjusted to 1° C.

In other words, under the operating condition A of the present embodiment, by setting the evaporation pressure of the refrigerant in the indoor evaporator 20 and the evaporation pressure of the refrigerant in the outdoor heat exchanger 15 at about 0.3 MPa, the temperature of the air blown off into the vehicle compartment can be adjusted to 50° C. However, under the operating condition B, in order to decrease the temperature of the air blown off into the vehicle compartment to 40° C., the amount of heat absorbed by the refrigerant in the outdoor heat exchanger 15 needs to be decreased to thereby decrease the amount of heat absorbed by refrigerant in the indoor condenser 12.

However, when the evaporation pressure of the refrigerant in the outdoor heat exchanger 15 is increased to about 0.35 MPa in order to decrease the temperature of the air blown off into the vehicle compartment to 40° C., the evaporation pressure of the refrigerant in the indoor evaporator 20 is also increased to about 0.35 MPa. As a result, the temperature of feed air cannot be cooled to a desired temperature (for example, 1° C.) in the indoor evaporator 20 and hence the feed air cannot be sufficiently dehumidified.

In contrast to this, in the present embodiment will be described an example in which at the time of the second dehumidifying and heating mode, the degree of superheat of the refrigerant on the outlet side of the outdoor heat exchange 15 is controlled to be a target degree of superheat to thereby realize a change from the operating condition A to the operating condition B.

First, the construction of the refrigerant cycle device 10 of the present embodiment will be described on the basis of FIG. 9. FIG. 9 is a schematic configuration diagram of a vehicular air conditioner 1 according to the present embodiment. Here, in FIG. 9, the parts equal to or equivalent to those in the first embodiment are denoted by the same reference symbols. This applies in the following drawings. Further, in the present embodiment, the descriptions of the same contents as in the first embodiment will be omitted or simplified.

Figure 9:
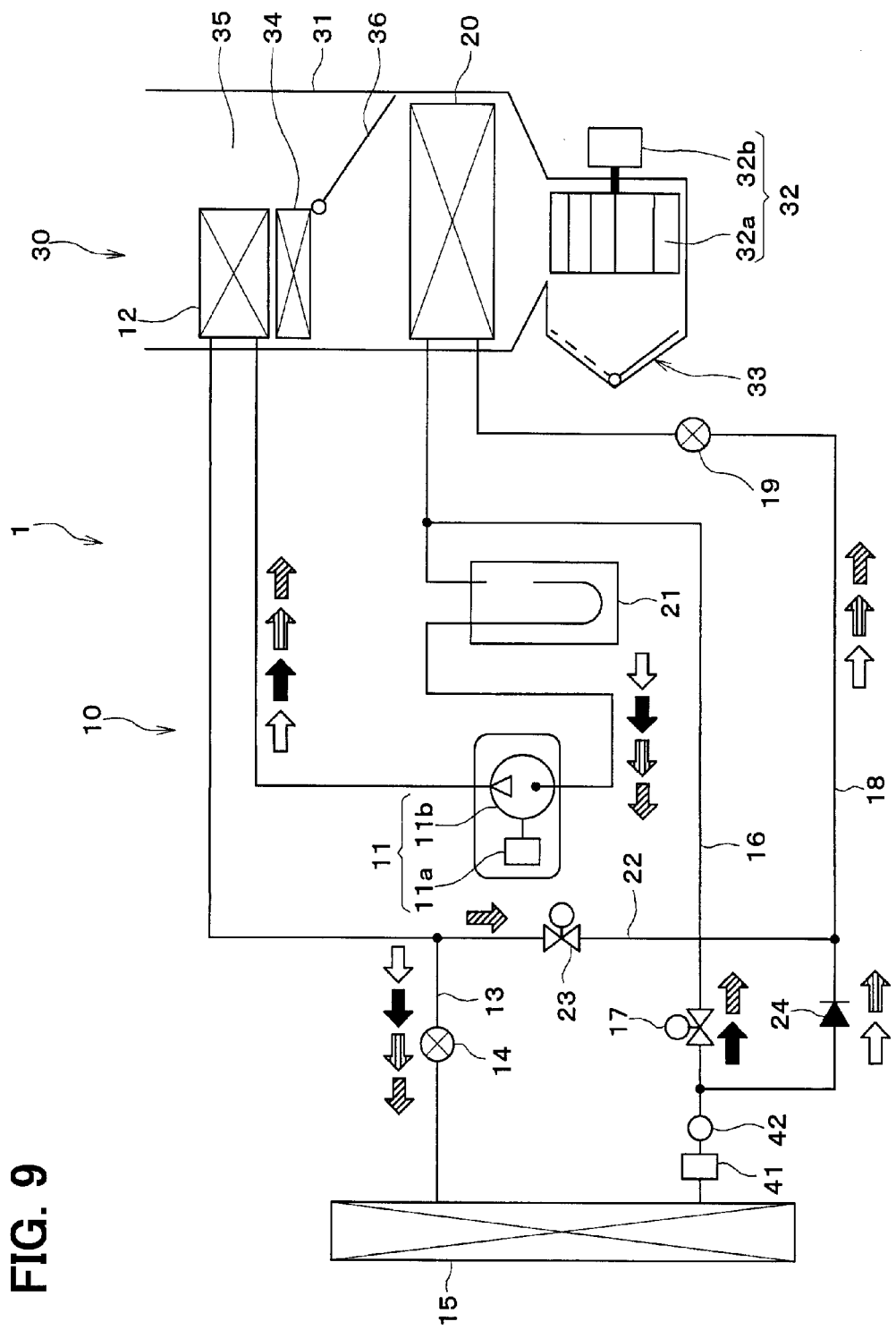
FIG. 9 is a schematic configuration diagram of a vehicular air conditioner according to a second embodiment.

As shown in FIG. 9, the refrigerant cycle device 10 of the present embodiment has an outdoor heat exchanger outlet side pressure sensor 41 and an outdoor heat exchanger outlet side temperature sensor 42 arranged on the outlet side of the outdoor heat exchanger 15, the outdoor heat exchanger outlet side pressure sensor 41 detecting the pressure of the refrigerant on the outlet side of the outdoor heat exchanger 15, the outdoor heat exchanger outlet side temperature sensor 42 detecting the temperature of the refrigerant on the outlet side of the outdoor heat exchanger 15. Here, the respective sensors 41, 42 are coupled to the input side of the control device and the detection signals of the respective sensors 41, 42 are inputted to the control device.

Further, in the present embodiment, the control device executes a control flow for controlling the action of the first expansion valve 14 as a subroutine of the main routine of the air-conditioning control in such a way as to bring the degree of superheat of the refrigerant on the outlet side of the outdoor heat exchanger 15 close to a target degree of superheat on the outlet side of the outdoor heat exchanger at the time of the second dehumidifying and heating mode.

Figure 10:
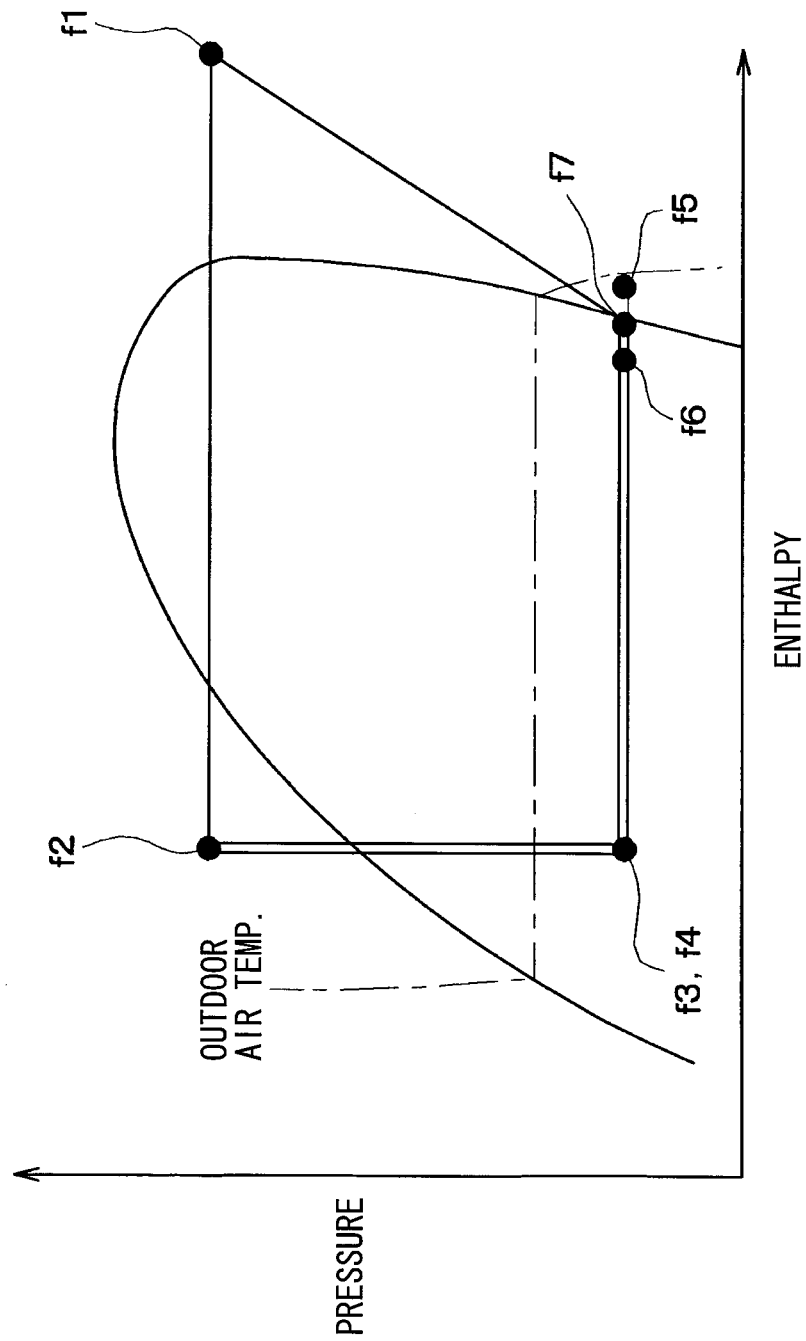
FIG. 10 is a Mollier diagram to show a state of a refrigerant at the time of a second dehumidifying and heating mode in a refrigerant cycle device according to the second embodiment.

In this way, in the second dehumidifying and heating mode of the present embodiment, the state of the refrigerant circulated in the cycle changes as shown by a Mollier diagram in FIG. 10. That is, as shown in FIG. 10, the high-pressure refrigerant (point f1) discharged from the compressor 11 flows into the indoor condenser 12 and exchanges heat with the vehicle compartment feed air cooled and dehumidified by the indoor evaporator 20, thereby radiating heat to the vehicle compartment feed air (point f1→f2 in FIG. 10). In this way, the vehicle compartment feed air is heated.

The refrigerant flowing out of the indoor condenser 12 flows into the first expansion valve 14 via the first refrigerant passage 13 and flows into the second expansion valve 19 via the bypass passage 22. The high-pressure refrigerant flowing into the first expansion valve 14 is reduced in pressure to a low-pressure refrigerant in such a way that the degree of superheat of the refrigerant on the outlet side of the outdoor heat exchanger 15 is brought close to a target degree of superheat on the outlet side of the outdoor heat exchanger (point f2→point f3 in FIG. 10). The low-pressure refrigerant reduced in pressure by the first expansion valve 14 flows into the outdoor heat exchanger 15 and absorbs heat from the outdoor air blown from the blower fan (point f3→point f5 in FIG. 10).

On the other hand, the high-pressure refrigerant flowing into the second expansion valve 19 is reduced in pressure reduced to a low-pressure refrigerant (point f2→point f4 in FIG. 10). The low-pressure refrigerant reduced in pressure by the second expansion valve 19 flows into the indoor evaporator 20 and absorbs heat from the vehicle compartment feed air blown from the blower 32, thereby being evaporated (point f4→point f6 in FIG. 10). In this way, the vehicle compartment feed air is cooled.

The refrigerant flowing out of the outdoor heat exchanger 15 meets the refrigerant flowing out of the indoor evaporator 20 at the inlet side of the accumulator 21 (point f5→point f7, point f6→point f7 in FIG. 10) and flows into the accumulator 21 and then flows to the suction side of the compressor 11 and is again compressed by the compressor 11. Here, in the present embodiment, the pressure of the low-pressure refrigerant flowing out of the outdoor heat exchanger 15 becomes nearly equal to the pressure of the low-pressure refrigerant flowing out of the indoor evaporator 20. The action in the other operation mode is the same as in the first embodiment.

As described above, at the time of the second dehumidifying and heating mode of the present embodiment, the throttle opening of the first expansion valve 14 is adjusted in such a way that the degree of superheat of the refrigerant on the outlet side of the outdoor heat exchanger 15 becomes the target degree of superheat on the outlet side of the outdoor heat exchanger. For this reason, even if the pressure of the refrigerant of the outdoor heat exchanger 15 is nearly equal to the pressure of the refrigerant of the indoor evaporator 20, a region through which the vapor-phase refrigerant passes is produced in a portion of the outdoor heat exchanger 15, so that the amount of heat absorbed by the refrigerant in the outdoor heat exchanger 15 can be decreased as compared with a case where only a liquid-phase refrigerant passes through the entire region of the heat exchanger 15. That is, in a heat exchange portion of the outdoor heat exchanger 15, the refrigerant causes a phase change to decrease the area of a portion in which latent heat is absorbed, whereby the amount of heat absorbed by the refrigerant in the outdoor heat exchanger 15 can be decreased.

Thus, at the time of the second dehumidifying and heating mode in which the outdoor heat exchanger 15 and the indoor evaporator 20 are coupled in parallel with respect to the flow of the refrigerant, the amount of heat radiated by the refrigerant in the indoor condenser 12 can be adjusted by adequately changing the amount of heat absorbed by the refrigerant in the outdoor heat exchanger 15 and the amount of heat absorbed by the refrigerant in the indoor evaporator 20.

In other words, the amount of heat radiated by the refrigerant in the indoor condenser 12 can be adjusted by decreasing the amount of heat absorbed by the refrigerant in the outdoor heat exchanger 15 without changing the evaporation temperature of the refrigerant in the indoor evaporator 20. As a result, at the time of the second dehumidifying and heating mode, the temperature adjustment range can be expanded to a side in which the temperature of the air blown off into the vehicle compartment is decreased.

Third Embodiment

Next, a third embodiment of the present disclosure will be described on the basis of FIG. 8 and FIG. 11 to FIG. 13. In the second embodiment has been described an example in which the amount of heat absorbed by the refrigerant in the outdoor heat exchanger 15 is decreased at the time of the second dehumidifying and heating mode. However, in order to more increase the temperature adjustment range of the air blown off into the vehicle compartment at the time of the second dehumidifying and heating mode, the amount of heat absorbed by the refrigerant in the outdoor heat exchanger 15 also needs to be increased.

For this reason, an operating condition A (point A in FIG. 8) in which when the outdoor air temperature is 10° C., the temperature of the air blown off into the vehicle compartment is adjusted to 50° C. with the evaporation temperature of the refrigerant in the indoor evaporator 20 being adjusted to 1° C. also needs to be shifted to an operating condition C (point C in FIG. 8) in which when the outdoor air temperature is decreased to 5° C., the temperature of the air blown off into the vehicle compartment is adjusted to 55° C. with the evaporation temperature RT of the refrigerant in the indoor evaporator 20 being adjusted to 1° C. A reference symbol E2 in FIG. 8 shows a portion in which the evaporation pressure of the refrigerant in the indoor evaporator 20 is equal to the evaporation pressure of the refrigerant in the outdoor heat exchanger 15 in the second dehumidifying and heating mode Here, under the operating condition A of the present embodiment, by setting the evaporation pressure of the refrigerant in the indoor evaporator 20 and the evaporation pressure of the refrigerant in the outdoor heat exchanger 15 at about 0.3 MPa, the temperature of the air blown off into the vehicle compartment can be adjusted to 50° C. However, under the operating condition C, in order to increase the temperature of the air blown off into the vehicle compartment to 55° C., the amount of heat absorbed by the refrigerant in the outdoor heat exchanger 15 needs to be increased to thereby increase the amount of heat radiated by refrigerant in the indoor condenser 12.

However, when the evaporation pressure of the refrigerant in the outdoor heat exchanger 15 is decreased to about 0.24 MPa in order to increase the temperature of the air blown off into the vehicle compartment to 55° C., the evaporation pressure of the refrigerant in the indoor evaporator 20 is also decreased to about 0.24 MPa. As a result, the evaporation temperature of the refrigerant in the indoor evaporator 20 is decreased to equal to or less than a freezing point (in the present embodiment, −5° C.), whereby the indoor evaporator 20 is frosted.

Figure 11:
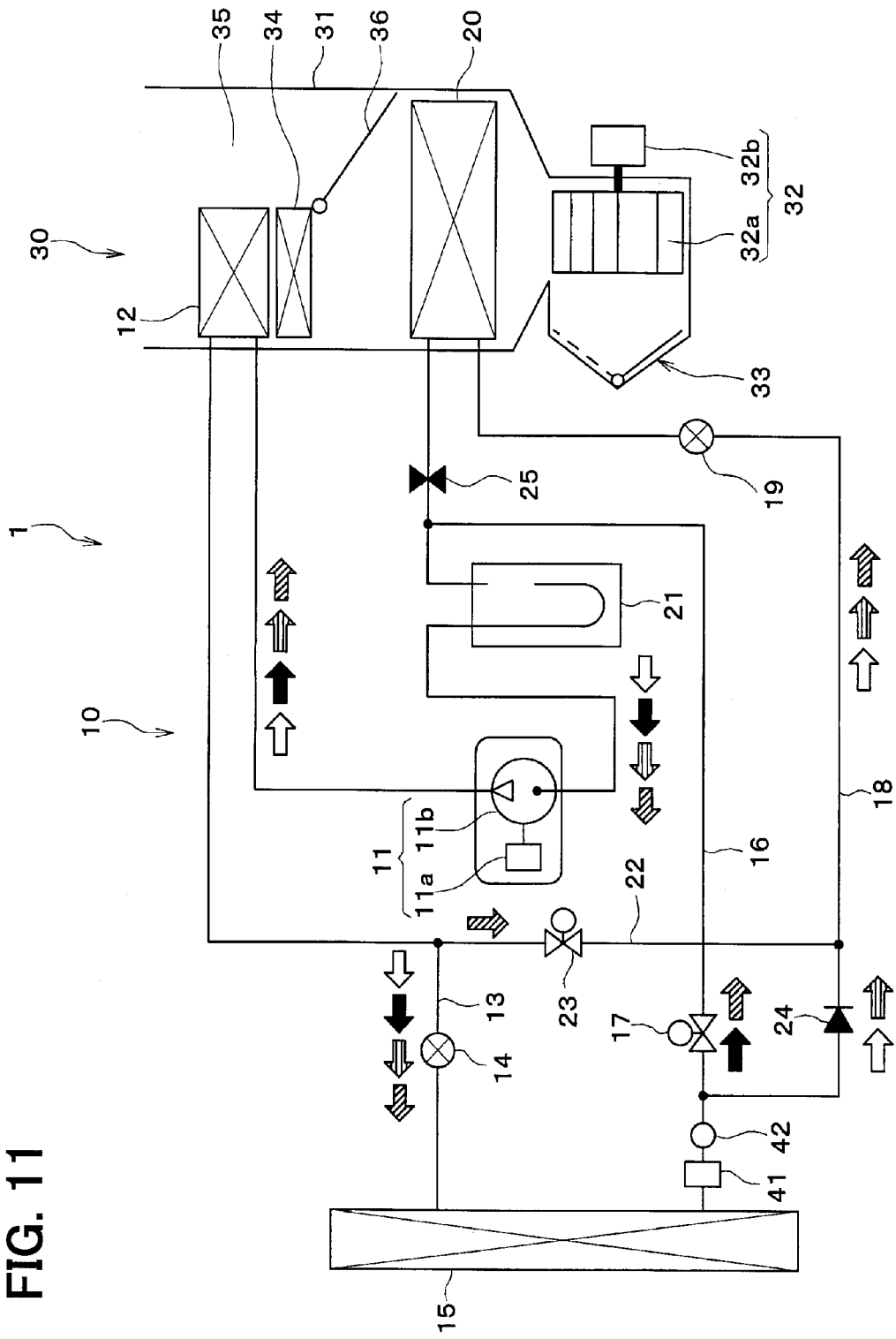
FIG. 11 is a schematic configuration diagram of a vehicular air conditioner according to a third embodiment.

In contrast to this, in the present embodiment, as shown by a schematic configuration diagram in FIG. 11, a constant pressure valve 25 is arranged on the outlet side of the indoor evaporator 20 as compared with the second embodiment. The constant pressure valve 25 is a constant pressure adjusting part that is arranged on the outlet side of the indoor evaporator 20 in the third refrigerant passage 18 and that keeps the pressure of the refrigerant on the outlet side of the indoor evaporator 20 at a specified value (in the present embodiment, 0.3 MPa).

Figure 12:
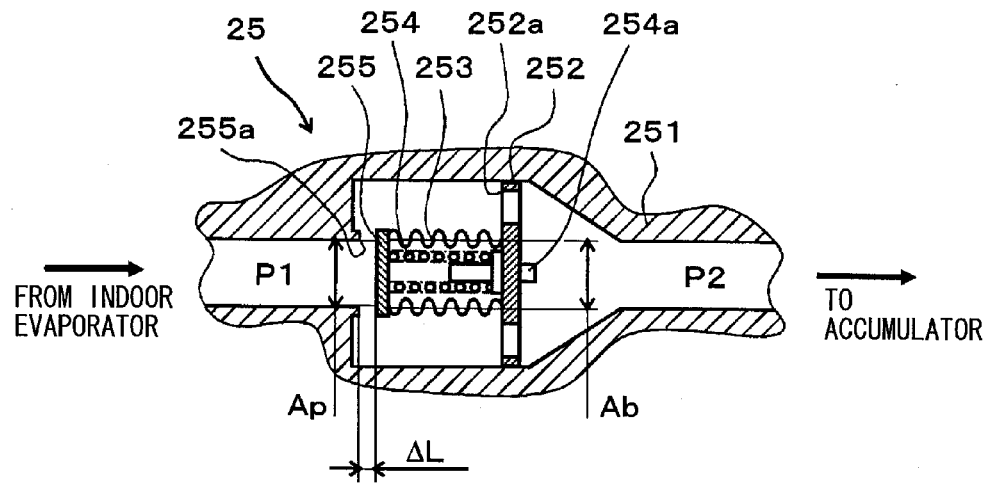
FIG. 12 is a section view in an axial direction of a constant-pressure valve according to the third embodiment.

The detailed construction of the constant pressure valve 25 will be described by the use of a section view shown in FIG. 12. First, the constant pressure valve 25 has a cylindrical body 251 formed of a combination of a plurality of members. The cylindrical body 251 is constructed of a plate member 252, a bellows 253, a spring 254, and a valve body 255 which are arranged in a refrigerant passage formed in the body 251.

The refrigerant passage formed in the body 251 is a passage for guiding the refrigerant flowing out of the indoor evaporator 20 to the inlet side of the accumulator 21 and is formed in a nearly cylindrical space. The plate member 252 is a disk-shaped member expanding in a direction perpendicular to an axial direction of the refrigerant passage and has its outermost peripheral side fixed to the refrigerant passage. Further, the plate member 252 has a through hole 252a formed therein, the through hole 252a passing the refrigerant flowing in the refrigerant passage.

The bellows 253 is a hollow cylindrical member formed in such a way as to elongate and contract in the axial direction of the refrigerant passage. The bellows 253 has one end side in the axial direction fixed to the inner peripheral side of the plate member 252 and has the other end side in the axial direction fixed to the valve body 255. Further, the bellows 253 has the spring 254 arranged in the internal space thereof.

The spring 254 is constructed of a cylindrical coil spring elongated in the axial direction of the refrigerant passage and applies a load of biasing the valve body 255 to the valve body 255 together with the bellows 253 in a direction in which the valve body 255 is pressed onto a seat 255a (that is, in a valve closing direction). The load applied to the valve body 255 by the spring 254 can be adjusted by an adjusting screw 254a.

Thus, in the constant pressure valve 25, the amount of lift $\Delta L$ of the valve body 255 is determined in such a way as to satisfy the following equation F2.

$$P1 \times Ap = P2 \times (Ap - Ab) + F0 + K \times \Delta L \tag{F2}$$

Here, P1 is a refrigerant pressure on the inlet side of the refrigerant passage of the constant pressure valve 25 (that is, a refrigerant pressure on the outlet side of the indoor evaporator 20), P2 is a refrigerant pressure on the outlet side of the refrigerant passage of the constant pressure valve 25 (that is, a refrigerant pressure on the inlet side of the accumulator 21), Ap is a pressure receiving area of the valve body 255, Ab is a sectional area of the bellows 253, F0 is an initial load that the bellows 253 and the spring 254 apply to the valve body 255, and K is a total spring constant of the bellows 253 and the spring 254.

As is clear from the equation F2, by setting a difference between Ap and Ab, the refrigerant pressure P1 on the inlet side of the refrigerant passage is proportional to the amount of lift $\Delta L$. For example, when P1 is decreased, $\Delta L$ is decreased and hence P1 is prevented from being decreased. This can prevent P1 from becoming smaller than a specified value determined in advance.

In other words, the constant pressure valve 25 of the present embodiment is constructed of a mechanical variable throttle mechanism that decreases the passage area of the refrigerant passage (decreases a throttle opening) when the pressure of the refrigerant on the outlet side of the indoor evaporator 20 becomes lower than a specified value and that increases the passage area of the refrigerant passage (increases the throttle opening) when the pressure of the refrigerant on the outlet side of the indoor evaporator 20 becomes higher than a specified value.

Figure 13:
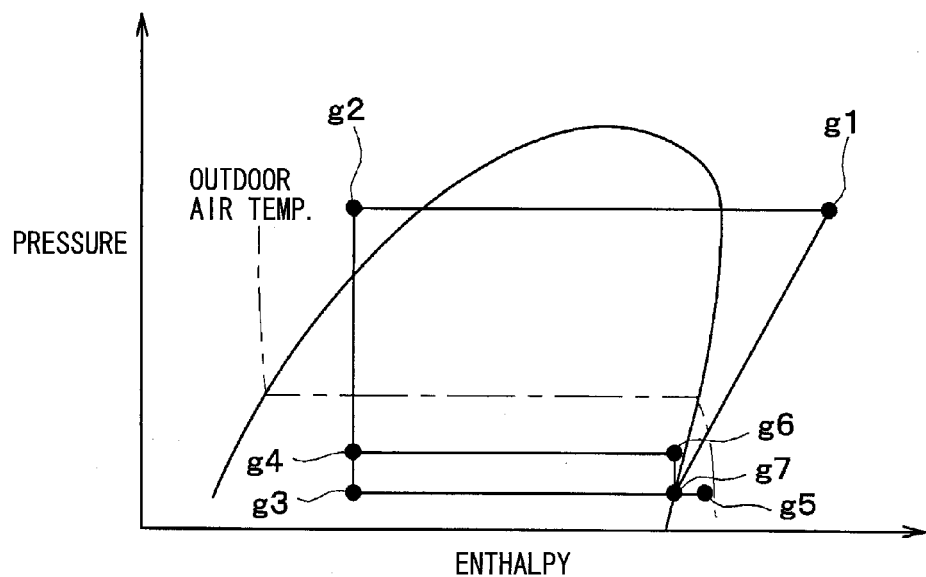
FIG. 13 is a Mollier diagram to show a state of a refrigerant at the time of a second dehumidifying and heating mode in a refrigerant cycle device according to the third embodiment.

Next, the state of the refrigerant circulated in the cycle at the time of the second dehumidifying and heating mode of the present embodiment will be described on the basis of a Mollier diagram shown in FIG. 13. As shown in FIG. 13, the high-pressure refrigerant (point g1) discharged from the compressor 11 flows into the indoor condenser 12 and exchanges heat with the vehicle compartment feed air cooled and dehumidified by the indoor evaporator 20, thereby radiating heat to the vehicle compartment feed air (point g1→point g2 in FIG. 13). In this way, the vehicle compartment feed air is heated.

The refrigerant flowing out of the indoor condenser 12 flows into the first expansion valve 14 via the first refrigerant passage 13 and flows into the second expansion valve 19 via the bypass passage 22. The high-pressure refrigerant flowing into the first expansion valve 14 is reduced in pressure to a low-pressure refrigerant in such a way that the degree of superheat of the refrigerant on the outlet side of the outdoor heat exchanger 15 is brought close to a target degree of superheat (point g2→point g3 in FIG. 13). The low-pressure refrigerant reduced in pressure by the first expansion valve 14 flows into the outdoor heat exchanger 15 and absorbs heat from the outdoor air blown from the blower fan (point g3→point g5 in FIG. 13).

On the other hand, the high-pressure refrigerant flowing into the second expansion valve 19 is reduced in pressure to a low-pressure refrigerant (point g2→point g4 in FIG. 13). The low-pressure refrigerant reduced in pressure by the second expansion valve 19 flows into the indoor evaporator 20 and absorbs heat from the vehicle compartment feed air blown from the blower 32, thereby being evaporated (point g4→point g6 in FIG. 13). In this way, the vehicle compartment feed air is cooled. Here, the pressure of the refrigerant in the indoor evaporator 20 is adjusted to a constant pressure by the constant pressure valve 25.

The refrigerant flowing out of the outdoor heat exchanger 15 meets the refrigerant flowing out of the indoor evaporator 20 at the inlet side of the accumulator 21 (point g5→point g7, point g6→point g7 in FIG. 13) and flows into the accumulator 21 and then flows to the suction side of the compressor 11 and is again compressed by the compressor 11. The action in the other operation mode is the same as in the first embodiment.

As described above, in the refrigerant cycle device 10 of the present embodiment, the constant pressure valve 25 is arranged on the outlet side of the indoor evaporator 20, so that even in the case where the refrigerant passage of the refrigerant cycle device 10 is made a refrigerant passage in which the outdoor heat exchanger 15 and the indoor evaporator 20 are coupled in parallel to the flow of the refrigerant as in the case of the second dehumidifying and heating mode, as shown in FIG. 13, the evaporation pressure of the refrigerant in the outdoor heat exchanger 15 can be made lower than the evaporation pressure of the refrigerant in the indoor evaporator 20.

Figure 14:
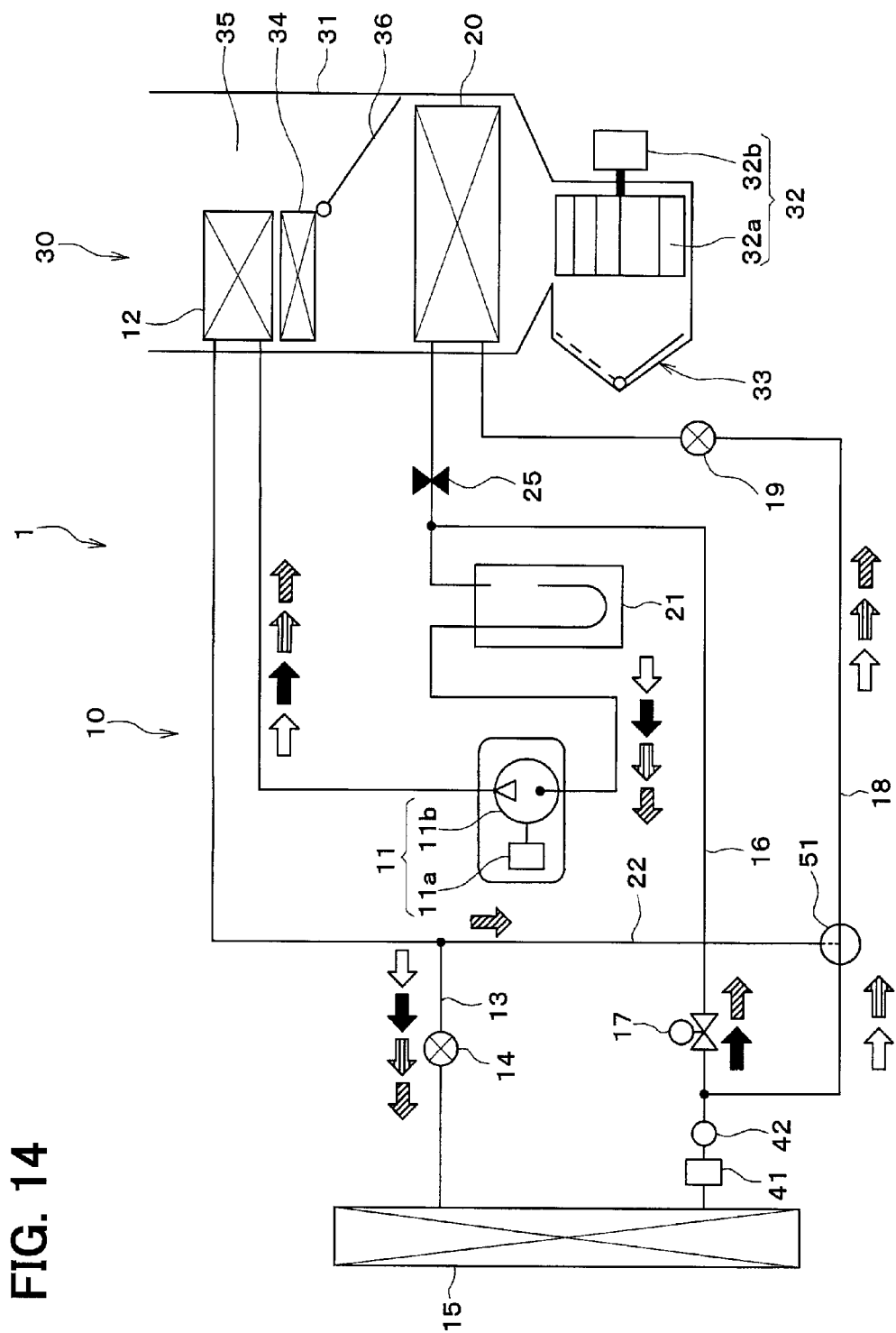
FIG. 14 is a schematic configuration diagram of a vehicular air conditioner according to a fourth embodiment.

Thus, while the evaporation pressure of the refrigerant in the indoor evaporator 20 is held higher than a specified value determined in advance to prevent the indoor evaporator 20 from being frosted, the amount of heat absorbed by the refrigerant in the outdoor heat exchanger 15 can be increased to increase the amount of heat radiated by the refrigerant in the indoor condenser 12. As a result, the temperature adjustment range can be expanded to a side in which the temperature of the air blown off into the vehicle compartment is increased at the time of the second dehumidifying and heating mode Fourth Embodiment In the third embodiment has been described an example in which the refrigerant passage switching part is constructed of two opening/closing valves (two-way valves) of the first opening/closing valve 17 and the second opening/closing valve 23. However, in the present embodiment, as shown in a schematic configuration diagram in FIG. 14, the second opening/closing valve 23 and the check valve 24 are removed and a three-way valve 51 is additionally provided. The refrigerant passage switching part is constructed of the three-way valve 51 and the first opening/closing valve 17.

The three-way valve 51 is an electric three-way valve having its action controlled by a control voltage outputted from the control device. Further, the three-way valve 51 fulfill a function of switching a refrigerant passage, which couples the outlet side of the outdoor heat exchanger 15 to the inlet side of the second expansion valve 19, and a refrigerant passage, which couples the outlet side of the bypass passage 22 to the inlet side of the second expansion valve 19. The other construction is the same as in the third embodiment.

Next, the action of a vehicular air conditioner 1 of the present embodiment will be described. Also in the vehicular air conditioner 1 of the present embodiment, as described in FIG. 2 of the first embodiment, the operations of the heating mode, the cooling mode, the first and second dehumidifying and heating modes can be switched.

Specifically, in the heating mode, the control device opens the second refrigerant passage 16 by the first opening/closing valve 17 and activates the three-way valve 51 in such a way as to couple the outlet side of the outdoor heat exchanger 15 to the inlet side of the second expansion valve 19 and puts the first expansion valve 14 into a throttle state and puts the second expansion valve 19 into a fully closed state. In this way, in the heating mode, the refrigerant passage of the refrigerant cycle device 10 can be switched to a refrigerant passage in which the refrigerant flows as shown by black arrows in FIG. 14 and hence the heating of the interior of the vehicle compartment can be realized.

Further, in the cooling mode, the control device closes the second refrigerant passage 16 by the first opening/closing valve 17 and activates the three-way valve 51 in such a way as to couple the outlet side of the outdoor heat exchanger 15 to the inlet side of the second expansion valve 19 and puts the first expansion valve 14 into a fully opened state and puts the second expansion valve 19 into a throttle state. In this way, in the cooling mode, the refrigerant passage of the refrigerant cycle device 10 can be switched to a first refrigerant passage in which the refrigerant flows as shown by white arrows in FIG. 14 and hence the cooling of the interior of the vehicle compartment can be realized.

Still further, in the first dehumidifying and heating mode, the control device closes the second refrigerant passage 16 by the first opening/closing valve 17 and activates the three-way valve 51 in such a way as to couple the outlet side of the outdoor heat exchanger 15 to the inlet side of the second expansion valve 19 and puts the first and second expansion valves 14, 19 into a throttle state or a fully opened state. In this way, in the first dehumidifying and heating mode, as in the case of the cooling mode, the refrigerant passage of the refrigerant cycle device 10 can be switched to the first refrigerant passage in which the refrigerant flows as shown by white arrows with lateral lines in FIG. 14. In this way, the dehumidifying and heating of the interior of the vehicle compartment can be realized and the vehicle compartment blowoff air temperature TAV can be adjusted within a wide temperature range.

Still further, in the second dehumidifying and heating mode, the control device opens the second refrigerant passage 16 by the first opening/closing valve 17 and activates the three-way valve 51 in such a way as to couple the outlet side of the bypass passage 22 to the inlet side of the second expansion valve 19 and puts the first and second expansion valves 14, 19 into a throttle state. In this way, in the second dehumidifying and heating mode, the refrigerant passage of the refrigerant cycle device 10 can be switched to a second refrigerant passage in which the refrigerant flows as shown by white arrows with oblique lines in FIG. 14. Thus, as in the case of the third embodiment, the dehumidifying and heating of the interior of the vehicle compartment can be realized and the vehicle compartment blowoff air temperature TAV can be adjusted within a wide temperature range.

As described above, even if the refrigerant passage switching part is constructed of the first opening/closing valve 17 and the three-way valve 51, the same advantage as in the third embodiment can be produced.

Fifth Embodiment

Figure 15:
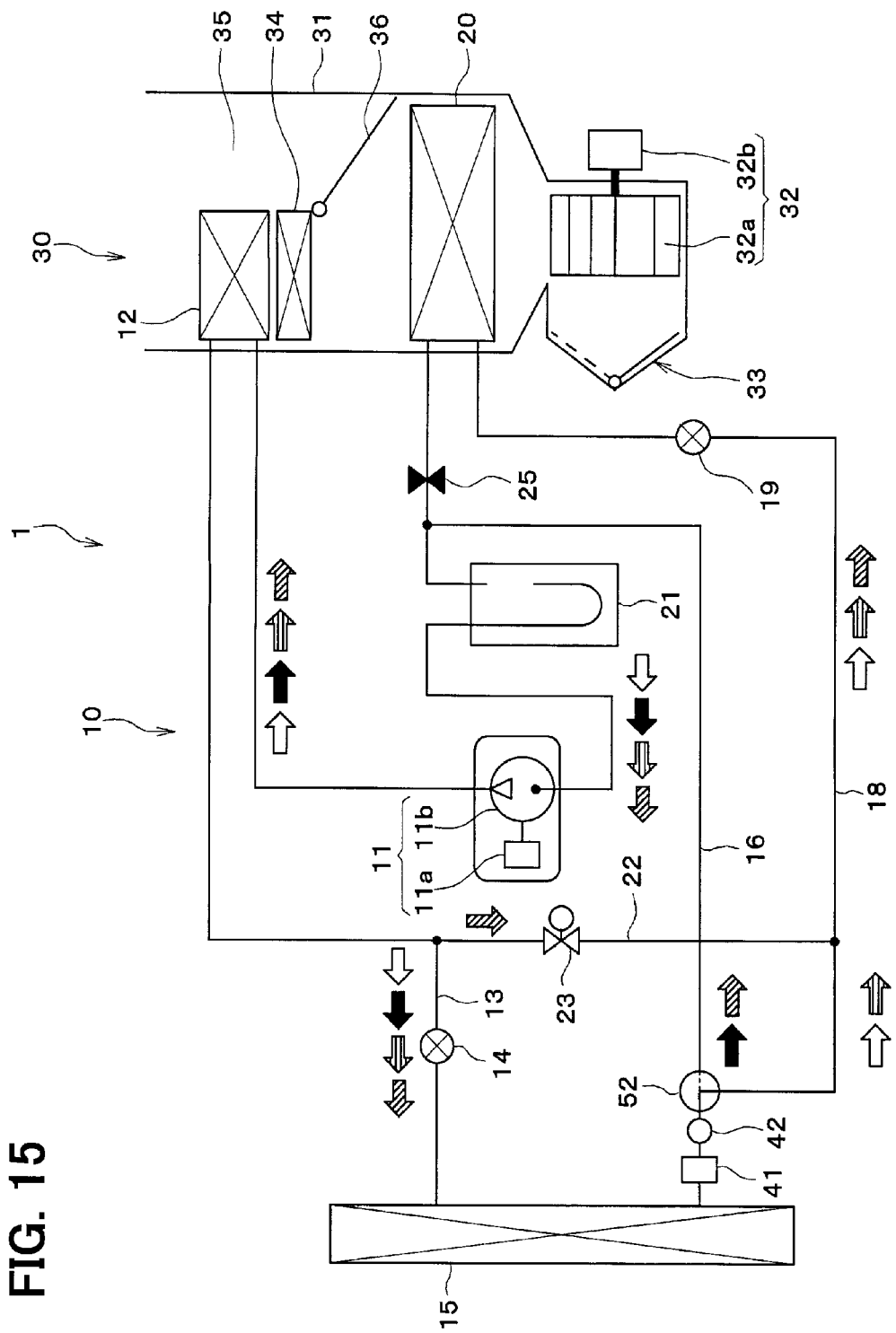
FIG. 15 is a schematic configuration diagram of a vehicular air conditioner according to a fifth embodiment.

In the present embodiment, as shown by a schematic configuration diagram in FIG. 15, as compared with the third embodiment, the first opening/closing valve 17 and the check valve 24 are removed and a three-way valve 52 is additionally provided. The refrigerant passage switching part is constructed of the three-way valve 52 and the second opening/closing valve 23.

The basic construction of the three-way valve 52 is the same as the three-way valve 51 in the fourth embodiment and fulfils a function of switching a refrigerant passage, which couples the outlet side of the outdoor heat exchanger 15 to the inlet side of the accumulator 21, and a refrigerant passage, which couples the outlet side of the outdoor heat exchanger 15 to the inlet side of the second expansion valve 19. The other construction is the same as in the third embodiment.

Next, the action of a vehicular air conditioner 1 of the present embodiment will be described. Also in the vehicular air conditioner 1 of the present embodiment, as described in FIG. 2 of the first embodiment, the operations of the heating mode, the cooling mode, the first and second dehumidifying and heating modes can be switched.

Specifically, in the heating mode, the control device closes the bypass passage 22 by the second opening/closing valve 23 and activates the three-way valve 52 in such a way as to couple the outlet side of the outdoor heat exchanger 15 to the inlet side of the accumulator 21 and puts the first expansion valve 14 into a throttle state and puts the second expansion valve 19 into a fully closed state. In this way, in the heating mode, the refrigerant passage of the refrigerant cycle device 10 can be switched to a refrigerant passage in which the refrigerant flows as shown by black arrows in FIG. 15 and hence the heating of the interior of the vehicle compartment can be realized.

Further, in the cooling mode, the control device closes the bypass passage 22 by the second opening/closing valve 23 and activates the three-way valve 52 in such a way as to couple the outlet side of the outdoor heat exchanger 15 to the inlet side of the second expansion valve 19 and puts the first expansion valve 14 into a fully opened state and puts the second expansion valve 19 into a throttle state. In this way, in the cooling mode, the refrigerant passage of the refrigerant cycle device 10 can be switched to a first refrigerant passage in which the refrigerant flows as shown by white arrows in FIG. 15 and hence the cooling of the interior of the vehicle compartment can be realized.

Still further, in the first dehumidifying and heating mode, the control device closes the bypass passage 22 by the second opening/closing valve 23 and activates the three-way valve 52 in such a way as to couple the outlet side of the outdoor heat exchanger 15 to the inlet side of the second expansion valve 19 and puts the first and second expansion valves 14, 19 into a throttle state or a fully opened state. In this way, in the first dehumidifying and heating mode, as in the case of the cooling mode, the refrigerant passage of the refrigerant cycle device 10 can be switched to the first refrigerant passage in which the refrigerant flows as shown by white arrows with lateral lines in FIG. 15. In this way, the dehumidifying and heating of the interior of the vehicle compartment can be realized and the vehicle compartment blowoff air temperature TAV can be adjusted within a wide temperature range.

Still further, in the second dehumidifying and heating mode, the control device opens the bypass passage 22 by the second opening/closing valve 23 and activates the three-way valve 52 in such a way as to couple the outlet side of the indoor heat exchanger 15 to the inlet side of the accumulator 21 and puts the first and second expansion valves 14, 19 into a throttle state. In this way, in the second dehumidifying and heating mode, the refrigerant passage of the refrigerant cycle device 10 can be switched to a second refrigerant passage in which the refrigerant flows as shown by white arrows with oblique lines in FIG. 15. Thus, as in the case of the third embodiment, the dehumidifying and heating of the interior of the vehicle compartment can be realized and the vehicle compartment blowoff air temperature TAV can be adjusted within a wide temperature range.

As described above, even if the refrigerant passage switching part is constructed of the second opening/closing valve 23 and the three-way valve 52, the same advantage as in the third embodiment can be produced.

Sixth Embodiment

Figure 16:
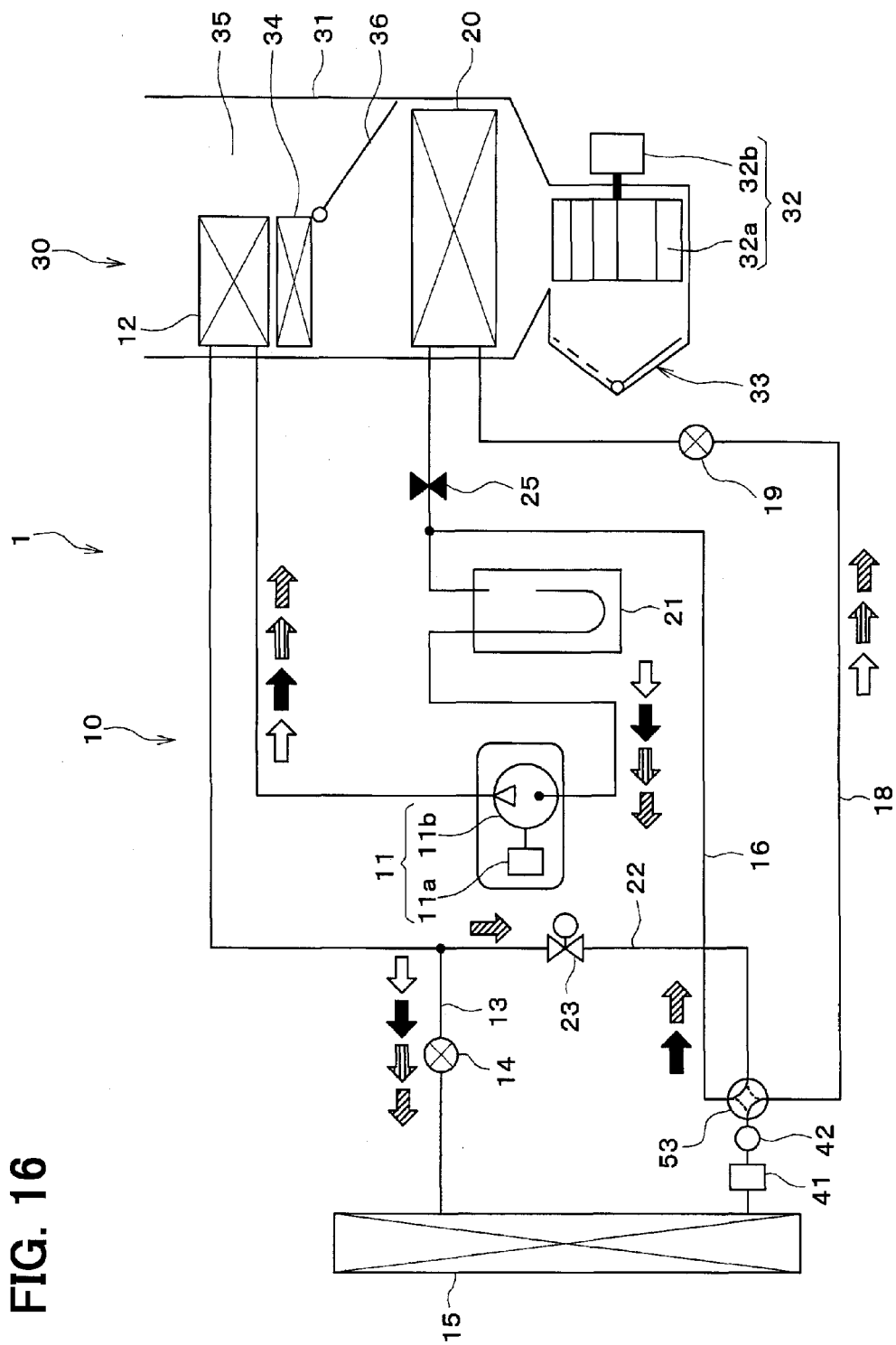
FIG. 16 is a schematic configuration diagram of a vehicular air conditioner according to a sixth embodiment.

In the present embodiment, as shown in a schematic configuration diagram in FIG. 16, as compared with the third embodiment, the first opening/closing valve 17 and the check valve 24 are removed and a four-way valve 53 is additionally provided. The refrigerant passage switching part is constructed of the four-way valve 53 and the second opening/closing valve 23.

The four-way valve 53 is an electric four-way valve having its action controlled by a control voltage outputted from the control device. The three-way valve 53 fulfill a function of switching a refrigerant passage, which couples the outlet side of the outdoor heat exchanger 15 to the inlet side of the second expansion valve 19 and at the same time couples the outlet side of the bypass passage 22 to the inlet side of the accumulator 21, and a refrigerant passage, which couples the outlet side of the outdoor heat exchanger 15 to the inlet side of the accumulator 21 and at the same time couples the outlet side of the bypass passage 22 to the inlet side of the second expansion valve 19. The other construction is the same as in the third embodiment.

Next, the action of a vehicular air conditioner 1 of the present embodiment will be described. Also in the vehicular air conditioner 1 of the present embodiment, as described in FIG. 2 of the first embodiment, the operations of the heating mode, the cooling mode, the first and second dehumidifying and heating modes can be switched.

Specifically, in the heating mode, the control device closes the bypass passage 22 by the second opening/closing valve 23 and activates the fourth-way valve 53 in such a way as to couple the outlet side of the outdoor heat exchanger 15 to the inlet side of the accumulator 21 and at the same time to couple the outlet side of the bypass passage 22 to the inlet side of the second expansion valve 19 and puts the first expansion valve 14 into a throttle state and puts the second expansion valve 19 into a fully closed state. In this way, in the heating mode, the refrigerant passage of the refrigerant cycle device 10 can be switched to a refrigerant passage in which the refrigerant flows as shown by black arrows in FIG. 16 and hence the heating of the interior of the vehicle compartment can be realized.

Further, in the cooling mode, the control device closes the bypass passage 22 by the second opening/closing valve 23 and activates the four-way valve 53 in such a way as to couple the outlet side of the outdoor heat exchanger 15 to the inlet side of the second expansion valve 19 and at the same time to couple the outlet side of the bypass passage 22 to the inlet side of the accumulator 21 and puts the first expansion valve 14 into a fully opened state and puts the second expansion valve 19 into a throttle state. In this way, in the cooling mode, the refrigerant passage of the refrigerant cycle device 10 can be switched to a first refrigerant passage in which the refrigerant flows as shown by white arrows in FIG. 16 and hence the cooling of the interior of the vehicle compartment can be realized.

Still further, in the first dehumidifying and heating mode, the control device closes the bypass passage 22 by the second opening/closing valve 23 and activates the four-way valve 53 in such a way as to couple the outlet side of the outdoor heat exchanger 15 to the inlet side of the second expansion valve 19 and at the same time to couple the outlet side of the bypass passage 22 to the inlet side of the accumulator 21 and puts the first and second expansion valves 14, 19 into a throttle state or a fully opened state. In this way, in the first dehumidifying and heating mode, as in the case of the cooling mode, the refrigerant passage of the refrigerant cycle device 10 can be switched to the first refrigerant passage in which the refrigerant flows as shown by white arrows with lateral lines in FIG. 16 and hence the dehumidifying and heating of the interior of the vehicle compartment can be realized and the vehicle compartment blowoff air temperature TAV can be adjusted within a wide temperature range.

Still further, in the second dehumidifying and heating mode, the control device opens the bypass passage 22 by the second opening/closing valve 23 and activates the four-way valve 53 in such a way as to couple the outlet side of the outdoor heat exchanger 15 to the inlet side of the accumulator 21 and at the same time to couple the outlet side of the bypass passage 22 to the inlet side of the second expansion valve 19 and puts the first and second expansion valves 14, 19 into a throttle state. In this way, in the second dehumidifying and heating mode, the refrigerant passage of the refrigerant cycle device 10 can be switched to a second refrigerant passage in which the refrigerant flows as shown by white arrows with oblique lines in FIG. 16. Thus, as in the case of the third embodiment, the dehumidifying and heating of the interior of the vehicle compartment can be realized and the vehicle compartment blowoff air temperature TAV can be adjusted within a wide temperature range.

As described above, even if the refrigerant passage switching part is constructed of the second opening/closing valve 23 and the four-way valve 53, the same advantage as in the third embodiment can be produced.

Seventh Embodiment

Figure 17:
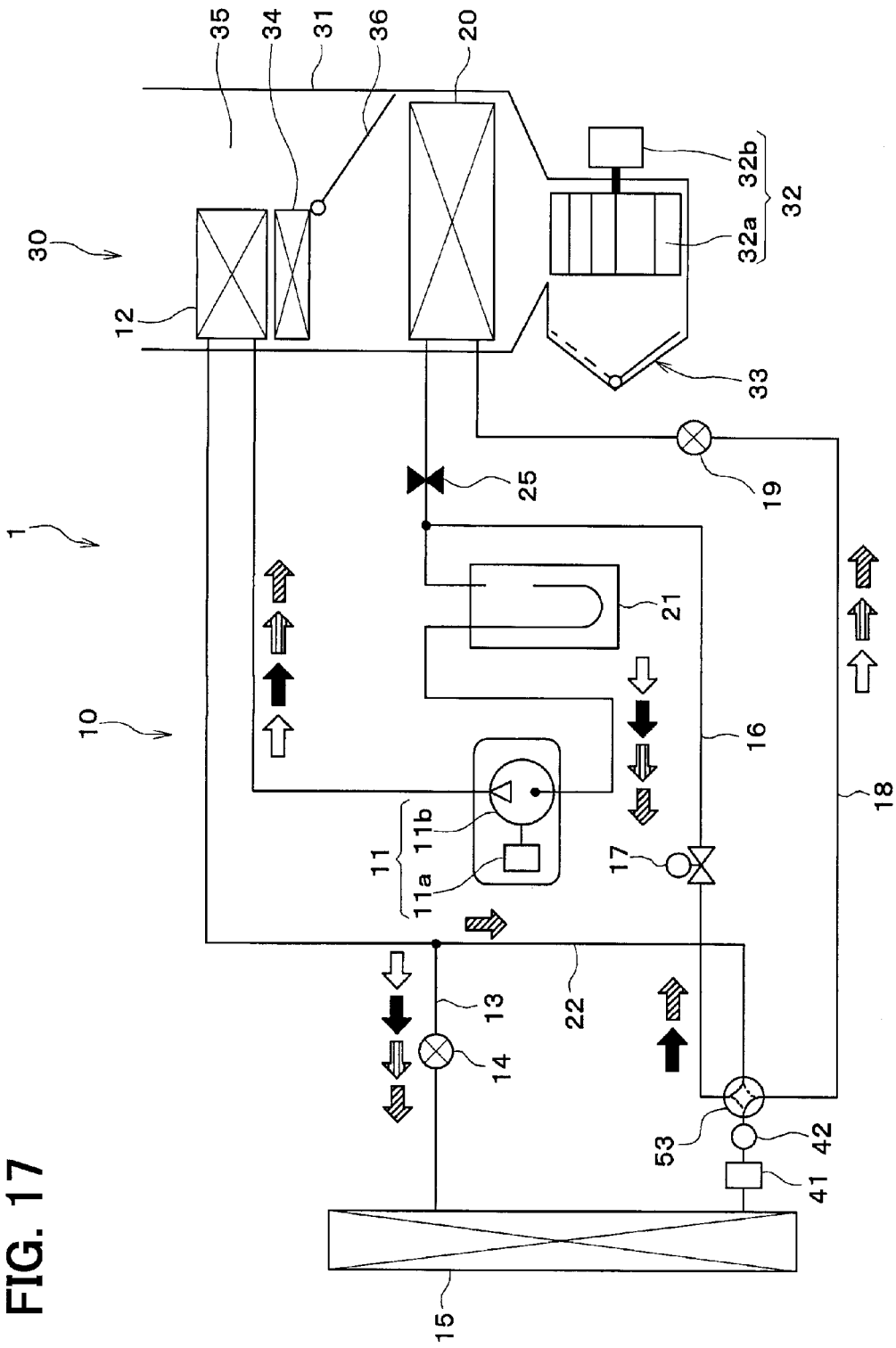
FIG. 17 is a schematic configuration diagram of a vehicular air conditioner according to a seventh embodiment.

In the present embodiment, as shown in a schematic configuration diagram in FIG. 17, as compared with the third embodiment, the second opening/closing valve 23 and the check valve 24 are removed and the four-way valve 53 is additionally provided. The refrigerant passage switching part is constructed of the four-way valve 53 and the first opening/closing valve 17.

The four-way valve 53 is constructed in the same way as in the sixth embodiment and fulfills a function of switching a refrigerant passage, which couples the outlet side of the outdoor heat exchanger 15 to the inlet side of the second expansion valve 19 and at the same time couples the outlet side of the bypass passage 22 to the inlet side of the first opening/closing valve 17 (that is, the inlet side of the accumulator 21), and a refrigerant passage, which couples the outlet side of the outdoor heat exchanger 15 to the inlet side of the first opening/closing valve 17 and at the same time couples the outlet side of the bypass passage 22 to the inlet side of the second expansion valve 19. The other construction is the same as in the third embodiment.

Next, the action of a vehicular air conditioner 1 of the present embodiment will be described. Also in the vehicular air conditioner 1 of the present embodiment, as described in FIG. 2 of the first embodiment, the operations of the heating mode, the cooling mode, the first and the second dehumidifying and heating mode can be switched.

Specifically, in the heating mode, the control device opens the second refrigerant passage 16 by the first opening/closing valve 17 and activates the fourth-way valve 53 in such a way as to couple the outlet side of the outdoor heat exchanger 15 to the inlet side of the first opening/closing valve 17 and at the same time to couple the outlet side of the bypass passage 22 to the inlet side of the second expansion valve 19 and puts the first expansion valve 14 into a throttle state and puts the second expansion valve 19 into a fully closed state. In this way, in the heating mode, the refrigerant passage of the refrigerant cycle device 10 can be switched to a refrigerant passage in which the refrigerant flows as shown by black arrows in FIG. 17 and hence the heating of the interior of the vehicle compartment can be realized.

Further, in the cooling mode, the control device closes the second refrigerant passage 16 by the first opening/closing valve 17 and activates the four-way valve 53 in such a way as to couple the outlet side of the outdoor heat exchanger 15 to the inlet side of the second expansion valve 19 and at the same time to couple the outlet side of the bypass passage 22 to the inlet side of the first opening/closing valve 17 and puts the first expansion valve 14 into a fully opened state and puts the second expansion valve 19 into a throttle state. In this way, in the cooling mode, the refrigerant passage of the refrigerant cycle device 10 can be switched to a first refrigerant passage in which the refrigerant flows as shown by white arrows in FIG. 17 and hence the cooling of the interior of the vehicle compartment can be realized.

Still further, in the first dehumidifying and heating mode, the control device closes the second refrigerant passage 16 by the first opening/closing valve 17 and activates the four-way valve 53 in such a way as to couple the outlet side of the outdoor heat exchanger 15 to the inlet side of the second expansion valve 19 and at the same time to couple the outlet side of the bypass passage 22 to the inlet side of the first opening/closing valve 17 and puts the first and second expansion valves 14, 19 into a throttle state or a fully opened state. In this way, in the first dehumidifying and heating mode, as in the case of the cooling mode, the refrigerant passage of the refrigerant cycle device 10 can be switched to the first refrigerant passage in which the refrigerant flows as shown by white arrows with lateral lines in FIG. 17. Thus, the dehumidifying and heating of the interior of the vehicle compartment can be realized and the vehicle compartment blowoff air temperature TAV can be adjusted within a wide temperature range.

Still further, in the second dehumidifying and heating mode, the control device opens the second refrigerant passage 16 by the first opening/closing valve 17 and activates the four-way valve 53 in such a way as to couple the outlet side of the outdoor heat exchanger 15 to the inlet side of the first opening/closing valve 17 and at the same time to couple the outlet side of the bypass passage 22 to the inlet side of the second expansion valve 19 and puts the first and second expansion valves 14, 19 into a throttle state. In this way, in the second dehumidifying and heating mode, the refrigerant passage of the refrigerant cycle device 10 can be switched to a second refrigerant passage in which the refrigerant flows as shown by white arrows with oblique lines in FIG. 17. Thus, as in the case of the third embodiment, the dehumidifying and heating of the interior of the vehicle compartment can be realized and the vehicle compartment blowoff air temperature TAV can be adjusted within a wide temperature range.

As described above, even if the refrigerant passage switching part is constructed of the first opening/closing valve 17 and the four-way valve 53, the same advantage as in the third embodiment can be produced.

Eighth Embodiment

Figure 18:
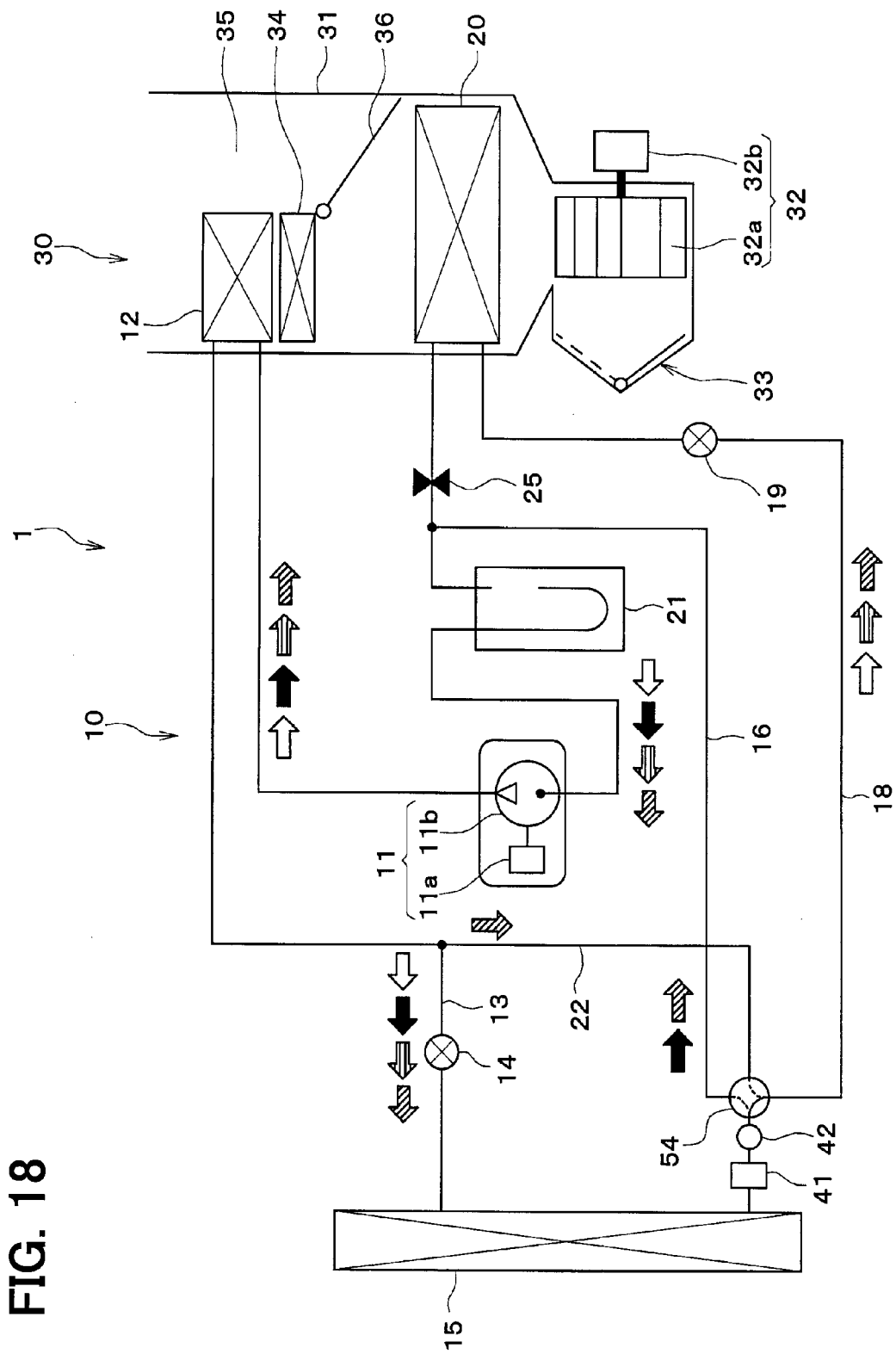
FIG. 18 is a schematic configuration diagram of a vehicular air conditioner according to an eighth embodiment.

In the present embodiment, as shown in a schematic configuration diagram in FIG. 18, will be described an example in which, as compared with the third embodiment, the first and second opening/closing valves 17, 23, and the check valve 24 are removed and in which the refrigerant passage switching part is constructed of a four-way valve 54.

The four-way valve 54 is an electric four-way valve having its action controlled by a control voltage outputted from the control device. The three-way valve 54 fulfills a function of switching a refrigerant passage, which couples the outlet side of the outdoor heat exchanger 15 to the inlet side of the second expansion valve 19 and a refrigerant passage, which couples the outlet side of the outdoor heat exchanger 15 to the inlet side of the accumulator 21 and at the same time couples the outlet side of the indoor condenser 12 (that is, the outlet side of the bypass passage 22) to the inlet side of the second expansion valve 19.

The specific construction of the four-way valve 54 realizing the switching of the refrigerant passages in this way will be described with reference to FIG. 19 and FIG. 20. The four-way valve 54 is constructed of a main part 540 and a pressure introduction part 550. First, the main part 540 has a cylindrical body 541 formed of a combination of a plurality of members, and has a sliding valve 542 arranged in the cylindrical space formed in the body 541.

In the side wall face of the body 541 are formed four through holes of a first through hole 541a to a fourth through hole 541d which pass through the side wall of the body 541 from inside to outside. Specifically, the first through hole 541a is coupled to the outlet side of the indoor condenser 12, the second through hole 541b is coupled to the outlet side of the outdoor heat exchanger 15, the third through hole 541c is coupled to the inlet side of the second expansion valve 19 (that is, the inlet side of the indoor evaporator 20), and the fourth through hole 541d is coupled to the inlet side of the accumulator 21.

Further, the third through hole 541c and the fourth through hole 541d are arranged at equal intervals in the axial direction of the body 541 across the second through hole 541b. In other words, the third through hole 541c, the second through hole 541b, and the fourth through hole 541d are arranged in this order at equal intervals in the axial direction of the body 541. Further, all of the first through hole 541a to the fourth through hole 541d are opened in a central pressure chamber S3 which will be described later.

The sliding valve 542 is constructed of a shaft 543 extended in the axial direction of the body 541, first and second partition plates 544, 545 for partitioning the interior space of the body 541, and a valve body plate 546 for changing the communication states of the second through hole 541b to the fourth through hole 541d formed in the body 541. The first and second partition plates 544, 545 are plate-shaped members expanding perpendicular to the axial direction of the shaft 543 and are coupled to both ends in the axial direction of the shaft 543, respectively.

The interior space of the body 541 is partitioned into a first pressure chamber S1, a second pressure chamber S2, and a third pressure chamber S3 by the first and second partition plates 544, 545. The first pressure chamber S1 is formed on the outside in the axial direction of the first partition plate 544. The second pressure chamber S2 is formed on the outside in the axial direction of the second partition plate 545. The third pressure chamber S3 is formed between the first partition plate 544 and the second partition plate 545. Here, between the outer peripheral faces of the first and second partition plates 544, 545 and the inner wall face of the body 541 is formed a space in which the sliding valve 542 can be shifted in position in the body 541.

The valve body plate 546 is coupled to a middle portion in the axial direction of the shaft 543 and has a curved portion 546a, which is curved inside the body 541 and has a refrigerant passage formed therein, and a flat portion 546b, which opens and closes the fourth through hole 541d.

Next, the pressure introduction valve 550 is constructed of: an electromagnetic mechanism (electromagnet) 551 which has electric power supplied thereto, thereby being shifted in position; a spool valve 552 which is shifted in position by the electromagnetic mechanism 551; and a cylinder 553 which receives the spool valve 552. In the wall face of the cylinder 553 are formed three through holes of a first through hole 553a to a third through hole 553c which pass through the wall from inside to outside.

Specifically, the first through hole 553a, the second through hole 553b, and the third through hole 553c are arranged in this order at equal intervals in a direction in which the spool valve 552 is shifted in position. Further, the first through hole 553s is coupled to the first pressure chamber S1 of the main body 540, the second through hole 553b is coupled to the second pressure chamber S2 of the main body 540, and the third through hole 553c is coupled to the outlet side of the outdoor heat exchanger 15.

Figure 19:
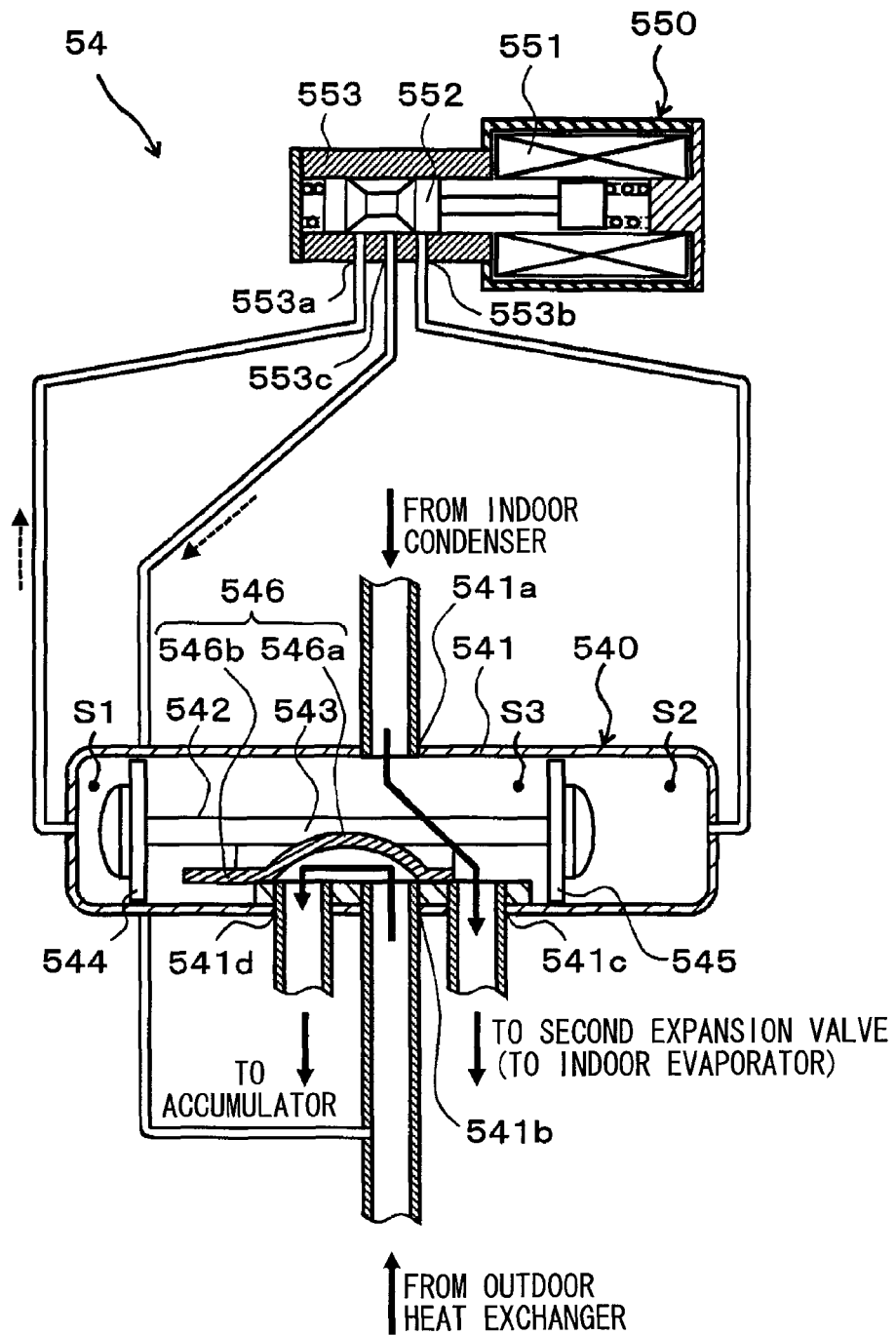
FIG. 19 is an illustrative drawing to illustrate an action state of a four-way valve according to the eighth embodiment.

Further, in the pressure introduction valve 550 of the present embodiment, in the case where the electromagnetic mechanism 551 is not supplied with electric power, as shown in FIG. 19, the spool valve 552 is shifted by the load of the spring 554 to a position in which the first through hole 553a is made to communicate with the third through hole 553c. Thus, in the case where the electromagnetic mechanism 551 is not supplied with electric power, the pressure of the refrigerant in the first pressure chamber S1 of the main body 540 becomes the pressure of the refrigerant on the outlet side of the outdoor heat exchanger 15 which is lower than the pressure of the refrigerant on the outlet side of the indoor condenser 12.

As a result, as shown in FIG. 19, the sliding valve 542 of the main body 540 is shifted in position to the first partition plate 544, whereby the outlet side of the outdoor heat exchanger 15 is coupled to the inlet side of the accumulator 21 via the refrigerant passage formed by the curved portion 546a of the valve body plate 546 and at the same time the outlet side of the indoor condenser 12 is coupled to the inlet side of the second expansion valve 19 via the central pressure chamber S3.

Figure 20:
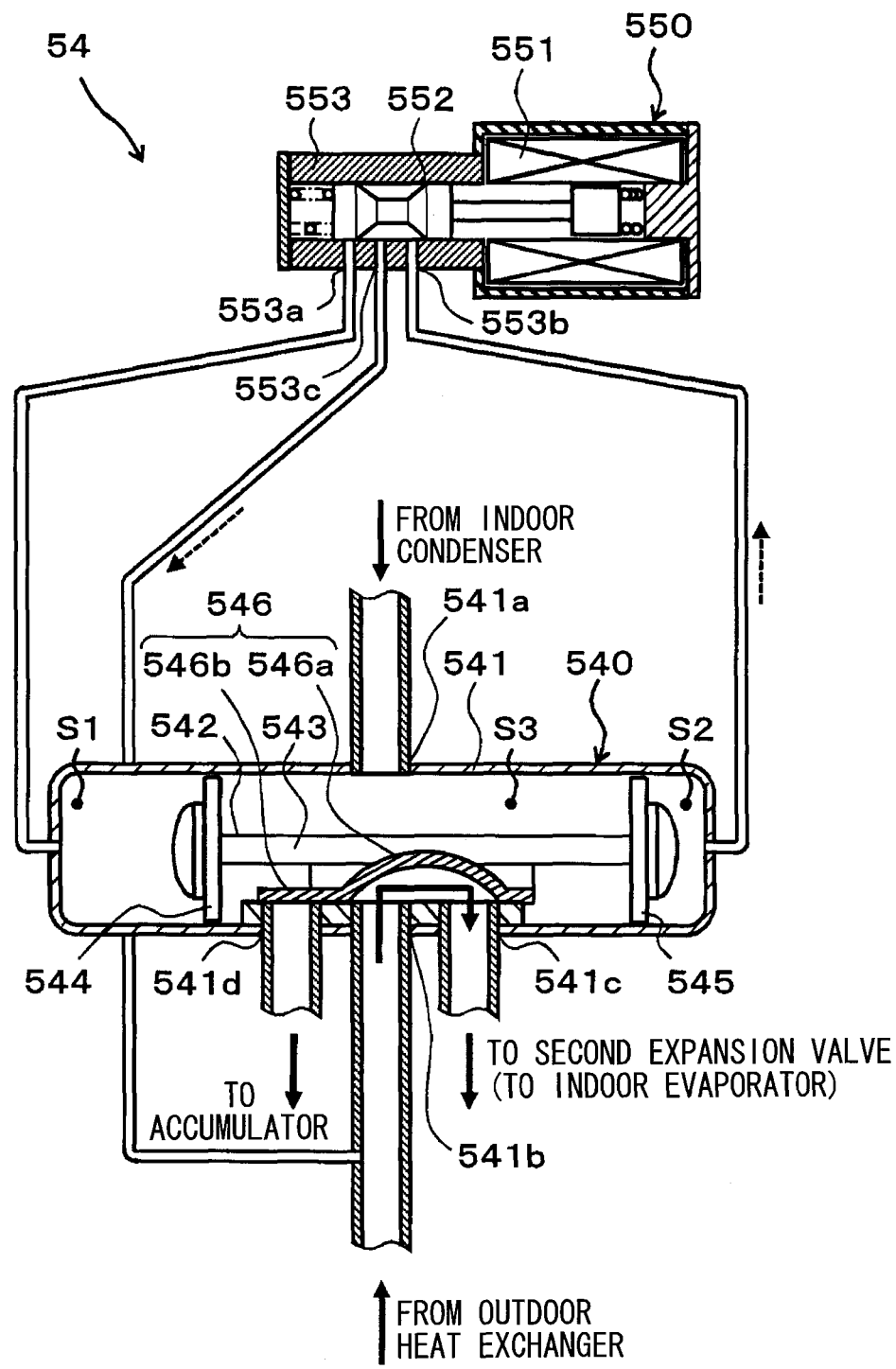
FIG. 20 is an illustrative drawing to illustrate another action state of the four-way valve according to the eighth embodiment.

On the other hand, in the case where the electromagnetic mechanism 551 of the pressure introduction valve 550 is supplied with the electric power, as shown in FIG. 20, the spool valve 552 is shifted by the operation of an electromagnetic force to a position in which the second through hole 553b is made to communicate with the third through hole 553c. Thus, in the case where the electromagnetic mechanism 551 is supplied with the electric power, the pressure of the refrigerant in the second pressure chamber S2 of the main body 540 becomes the pressure of the refrigerant on the outlet side of the outdoor heat exchanger 15 which is lower than the pressure of the refrigerant on the outlet side of the indoor condenser 12.

As a result, as shown in FIG. 20, the sliding valve 542 of the main body 540 is shifted in position to the second partition plate 545, whereby the outlet side of the outdoor heat exchanger 15 is coupled to the inlet side of the accumulator 21 via the refrigerant passage formed by the curved portion 546a of the valve body plate 546. Further, the fourth through hole 541d is blocked by the flat portion 546b of the valve body plate 546.

Next, the action of a vehicular air conditioner 1 of the present embodiment will be described. Also in the vehicular air conditioner 1 of the present embodiment, as described in FIG. 2 of the first embodiment, the operation of the heating mode, the cooling mode, the first and second dehumidifying and heating modes can be switched.

Specifically, in the heating mode of the present embodiment, the control device does not supply the electric power to the four-way valve 54 and puts the first expansion valve 14 into a throttle state and puts the second expansion valve 19 into a fully closed state. In this way, in the heating mode, the refrigerant passage of the refrigerant cycle device 10 can be switched to a refrigerant passage in which the refrigerant flows as shown by black arrows in FIG. 18 and hence the heating of the interior of the vehicle compartment can be realized.

Further, in the cooling mode, the control device supplies the electric power to the four-way valve 54 and puts the first expansion valve 14 into a fully opened state and puts the second expansion valve 19 into a throttle state. In this way, in the cooling mode, the refrigerant passage of the refrigerant cycle device 10 can be switched to a first refrigerant passage in which the refrigerant flows as shown by white arrows in FIG. 18 and hence the cooling of the interior of the vehicle compartment can be realized.

Further, in the first dehumidifying and heating mode, the control device supplies the electric power to the four-way valve 54 and puts the first and second expansion valves 14, 19 into a throttle state or in fully opened state. In this way, in the dehumidifying and heating mode, as in the case of the cooling mode, the refrigerant passage of the refrigerant cycle device 10 can be switched to the first refrigerant passage in which the refrigerant flows as shown by white arrows with lateral lines in FIG. 18. Thus, the dehumidifying and heating of the interior of the vehicle compartment can be realized and the vehicle compartment blowoff air temperature TAV can be adjusted within a wide temperature range.

Still further, in the second dehumidifying and heating mode, the control device does not supply the electric power to the four-way valve 54 and puts the first and second expansion valves 14, 19 into a throttle state. In this way, in the second dehumidifying and heating mode, the refrigerant passage of the refrigerant cycle device 10 can be switched to a second refrigerant passage in which the refrigerant flows as shown by white arrows with oblique lines in FIG. 18. Thus, as in the case of the third embodiment, the dehumidifying and heating of the interior of the vehicle compartment can be realized and the vehicle compartment blowoff air temperature TAV can be adjusted within a wide temperature range.

As described above, even if the refrigerant passage switching part is constructed of the four-way valve 54, the same advantages as in the third embodiment can be produced. Here, in the present embodiment, the second expansion valve 19 closes the third refrigerant passage 18 to thereby switch the heating mode and the second dehumidifying and heating mode. Thus, the second expansion valve 19 of the present embodiment serves also a function as a refrigerant passage switching part.

Ninth Embodiment

In the first dehumidifying and heating mode of the first embodiment has been described an example in which the first to the fourth modes are switched stepwise as the target blowoff temperature TAO is increased. However, in the present embodiment will be described an example in which the first to the fourth modes of the first dehumidifying and heating mode are switched continuously.

First, in the first dehumidifying and heating mode of the present embodiment, the control device controls the number of revolutions (refrigerant discharging capacity) of the compressor 11 in such a way that the blowoff air temperature Te from the indoor evaporator 20 is brought close to the target evaporator blowoff temperature TEO. Specifically, when the blowoff air temperature Te is decreased, the number of revolutions (refrigerant discharging capacity) of the compressor 11 is increased, whereas when the blowoff air temperature Te is increased, the number of revolutions (refrigerant discharging capacity) of the compressor 11 is decreased.

Figure 21:
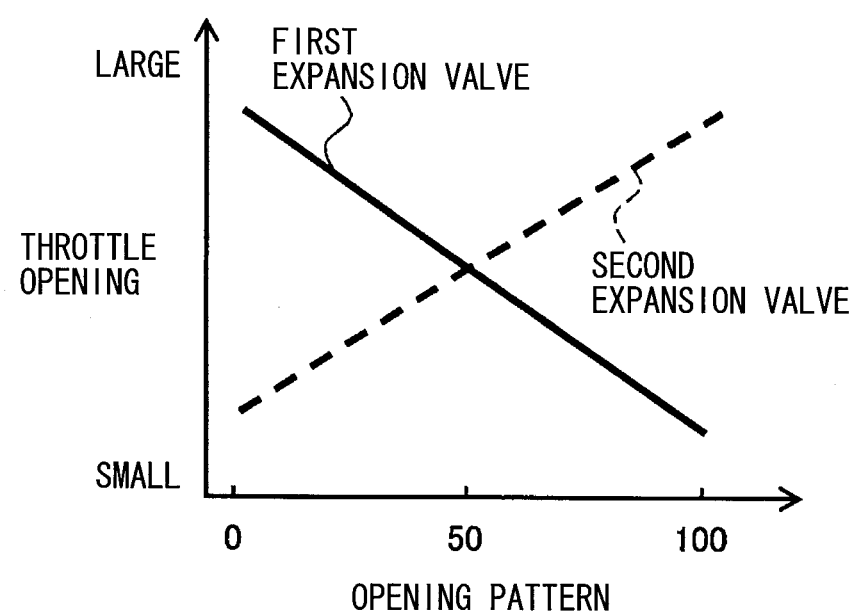
FIG. 21 is a control characteristic diagram of a first expansion valve and a second expansion valve according to a ninth embodiment.

Further, the control device controls the throttle openings of the first and second expansion valves 14, 19 in such a way that the vehicle compartment blowoff air temperature TAV is brought close to the target blowoff temperature TAO. Here, the throttle openings of the first and second expansion valves 14, 19 are determined as shown by a control characteristic diagram in FIG. 21. Specifically, when the vehicle compartment blowoff air temperature TAV is increased, the value of an opening pattern is increased (that is, the throttle opening of the first expansion valve 14 is decreased and the throttle opening of the second expansion valve 19 is increased). On the other hand, when the vehicle compartment blowoff air temperature TAV is decreased, the value of the opening pattern is decreased (that is, the throttle opening of the first expansion valve 14 is increased and the throttle opening of the second expansion valve 19 is decreased).

In this way, by continuously changing the throttle openings of the first and second expansion valves 14, 19, the pressure (temperature) of the refrigerant in the outdoor heat exchanger 15 can be continuously adjusted. Thus, when the temperature of the refrigerant in the outdoor heat exchanger 15 is higher than the temperature of the outdoor air, the amount of heat radiated by the refrigerant can be adjusted, and when the temperature of the refrigerant in the outdoor heat exchanger 15 is higher than the temperature of the outdoor air, the amount of heat absorbed by the refrigerant can be adjusted.

Thus, according to the present embodiment, the cooling capacity (dehumidifying capacity) of the air fed to the indoor evaporator 20 can be surely secured by controlling the action of the compressor 11. Further, the amount of heat radiated by the refrigerant or the amount of heat absorbed by the refrigerant in the outdoor heat exchanger 15 can be continuously adjusted by controlling the actions of the first and second expansion valves 14, 19. Thus, the temperature adjustment range of the air blown off into the space to be air-conditioned can be expanded in the first dehumidifying and heating mode.

Moreover, contrary to the present embodiment, the control device may determine the throttle openings of the first and second expansion valves 14, 19 in such a way that the blowoff air temperature Te from the indoor evaporator 20 is brought close to the target evaporator blowoff temperature TEO. Further, the control device may determine the number of revolutions (refrigerant discharging capacity) of the compressor 11 in such a way that the vehicle compartment blowoff air temperature TAV is brought close to the target blowoff temperature TAO.

10th Embodiment

Figure 22:
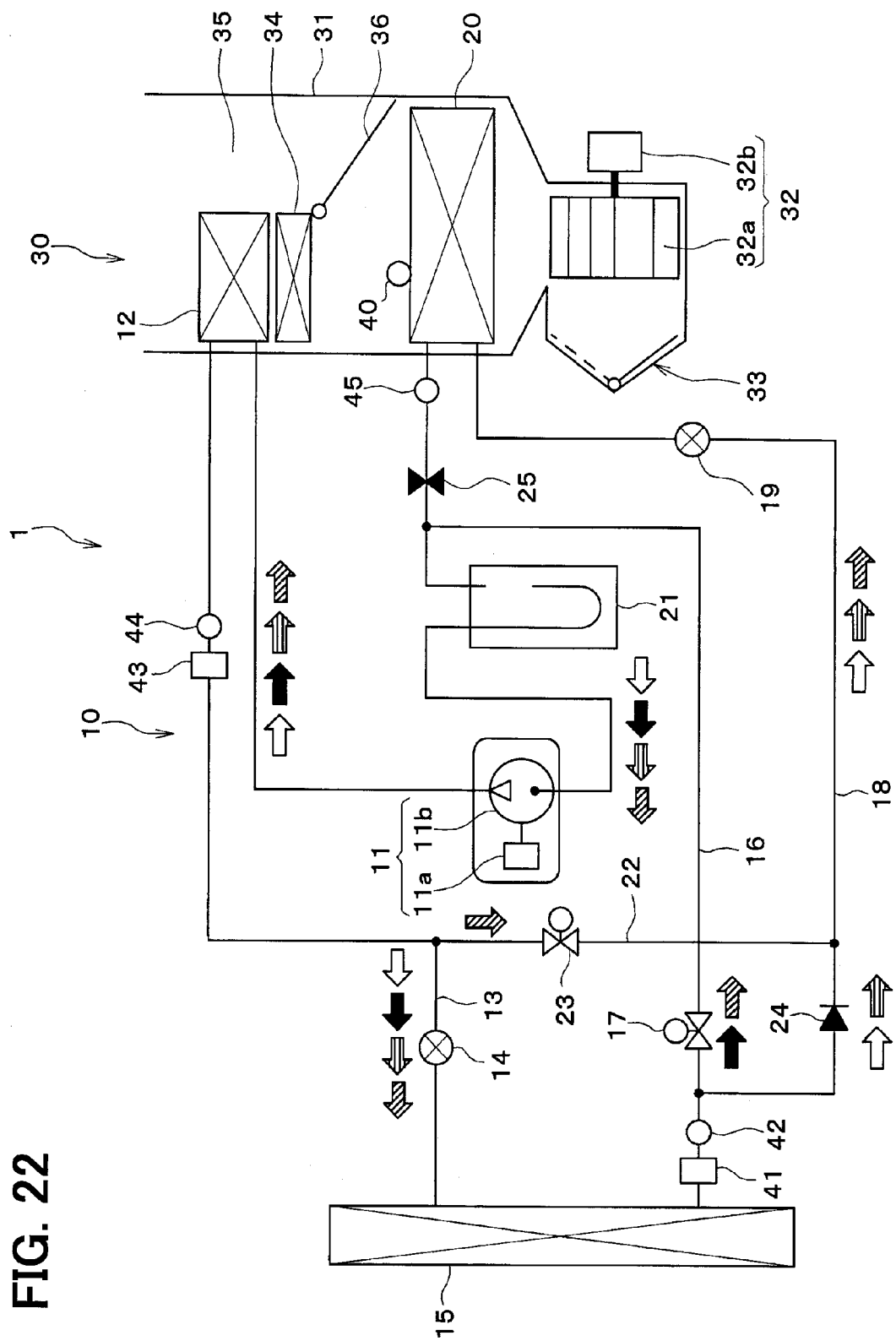
FIG. 22 is a schematic configuration diagram of a vehicular air conditioner according to a 10th embodiment.

In the present embodiment, as compared with the third embodiment, as shown by a schematic configuration diagram in FIG. 22, on the outlet side of the indoor condenser 12 are arranged an indoor condense outlet-side pressure sensor 43 for detecting the pressure PH of the refrigerant on the outlet side of the indoor condenser 12, an indoor condense outlet-side temperature sensor 44 for detecting the temperature TH of the refrigerant on the outlet side of the indoor condenser 12, and an indoor evaporator outlet-side temperature sensor 45 for detecting the temperature Teout of the refrigerant on the outlet side of the indoor evaporator 20.

Here, the respective sensors 43 to 45 are coupled to the input side of the control device and the detection signals of the respective sensors 43 to 45 are inputted to the control device. Further, in FIG. 22, the evaporator temperature sensor described in the first embodiment is denoted by a reference symbol 40.

Further, in the present embodiment, the control device executes a control flow as a sub-routine of the main routine of an air-conditioning control at the time of the second humidifying and heating mode. According to the control flow, the control device controls the action of the compressor 11 in such a way that the vehicle compartment blowoff air temperature TAV is brought close to the target blowoff temperature TAO and controls the action of the first expansion valve 14 in such a way that the degree of super-cooling SC of the refrigerant on the outlet side of the indoor condenser 12 is brought close to a target degree of super-cooling SCO and controls the action of the second expansion valve 19 in such a way that the degree of superheating SH of the refrigerant on the outlet side of the indoor evaporator 20 is brought close to a target degree of superheating SHO.

More specifically, in this control flow, when the vehicle compartment blowoff air temperature TAV is increased, the number of revolutions (refrigerant discharging capacity) of the compressor 11 is increased, whereas when the vehicle compartment blowoff air temperature TAV is decreased, the number of revolutions of the compressor 11 is decreased.

Further, when the degree of super-cooling SC of the refrigerant on the outlet side of the indoor condenser 12 is increased, the throttle opening of the first expansion valve 14 is decreased, whereas when the degree of super-cooling SC of the refrigerant on the outlet side of the indoor condenser 12 is decreased, the throttle opening of the first expansion valve 14 is increased.

Here, the degree of super-cooling SC of the refrigerant on the outlet side of the indoor condenser 12 is calculated from the detection value PH of the indoor condenser outlet-side pressure sensor 43 and the detection value TH of the indoor condenser outlet-side temperature sensor 44. Thus, the indoor condenser outlet-side pressure sensor 43 and the indoor condenser outlet-side temperature sensor 44 of the present embodiment construct a degree-of-super-cooling detection part.

Further, the target degree of super-cooling SCO is determined at a value determined in advance (for example, 5° C.). Of course, the target degree of super-cooling SCO may be determined on the basis of the target blowoff temperature TAO with reference to a control map stored previously in the control device. Thus, of the control routine executed by the control device, a control step of determining the target degree of super-cooling SCO constructs a target degree-of-super-cooling determination part.

Still further, when the degree of superheating SH of the refrigerant on the outlet side of the indoor evaporator 20 is increased, the throttle opening of the second expansion valve 19 is decreased, whereas when the degree of superheating SH of the refrigerant on the outlet side of the indoor evaporator 20 is decreased, the throttle opening of the second expansion valve 19 is increased.

Here, the degree of superheating SH of the refrigerant on the outlet side of the indoor evaporator 20 is calculated from the detection value Teout of the indoor evaporator outlet-side temperature sensor 45 and the detection value Te of the evaporator temperature sensor 40. Thus, the indoor evaporator outlet-side temperature sensor 45 and the evaporator temperature sensor 40 of the present embodiment construct a degree-of-superheating detection part.

Further, the target degree of superheating SHO is determined at a value determined in advance (for example, 5° C.). Of course, the target degree of superheating SHO may be determined on the basis of the target blowoff temperature TAO with reference to the control map stored previously in the control device. Thus, of the control routine executed by the control device, a control step of determining the target degree of superheating SHO constructs a target degree-of-superheating determination part.

Next, the state of the refrigerant circulated in the cycle at the time of the second dehumidifying and heating mode of the present embodiment will be described by the use of a Mollier diagram shown in FIG. 23.

Figure 23:
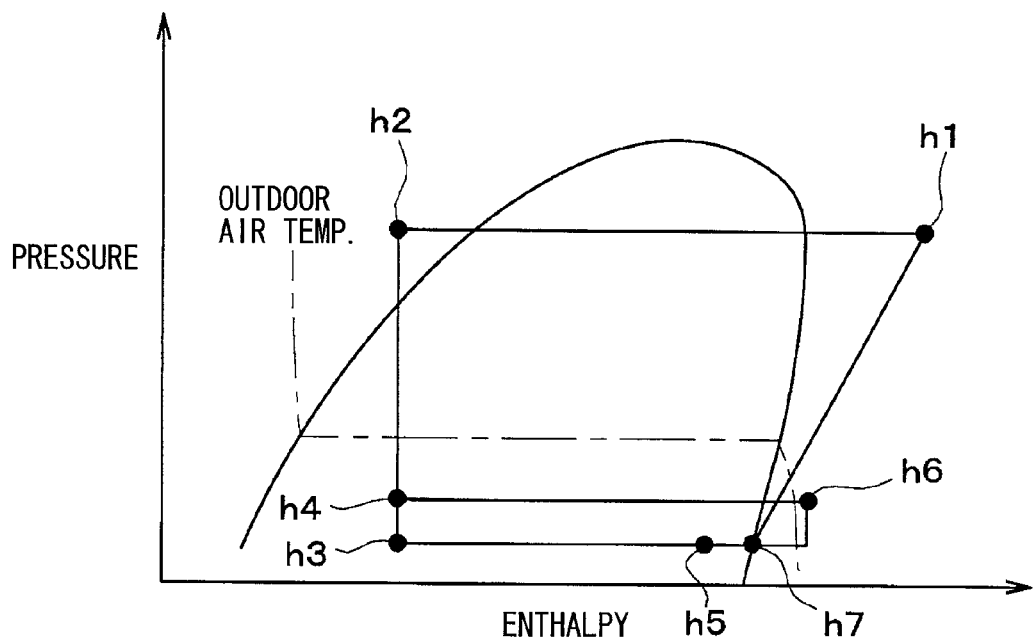
FIG. 23 is a Mollier diagram to show a state of a refrigerant at the time of a second dehumidifying and heating mode in a refrigerant cycle device according to the 10th embodiment.

As shown in FIG. 23, the high-pressure refrigerant (point h1 in FIG. 23) discharged from the compressor 11 flows into the indoor condenser 12 and exchanges heat with the air cooled and dehumidified by the indoor evaporator 20, thereby radiating heat to the air to be blown into the vehicle compartment (point h1→point h2 in FIG. 23). In this way, air blown into the vehicle compartment is heated. The flow of the refrigerant flowing out of the indoor condenser 12 is branched into a flow flowing into the first expansion valve 14 and a flow flowing into the second expansion valve 19 because the second opening/closing valve 23 is opened.

The refrigerant flowing into the first expansion valve 14 has is reduced in pressure to a low-pressure refrigerant (point h2→point h3 in FIG. 23). At this time, the throttle opening of the first expansion valve 14 is controlled in such a way that the degree of super-cooling SC (point h2 in FIG. 23) of the refrigerant on the outlet side of the indoor condenser 12 is brought close to the target degree of super-cooling SCO. The refrigerant flowing into the outdoor heat exchanger 15 absorbs heat from the outdoor air blown from the blower fan (point h3→point h5 in FIG. 23).

On the other hand, the refrigerant flowing into the second expansion valve 19 has its pressure reduced, thereby becoming a low-pressure refrigerant (point h2→point h4 in FIG. 23) and flowing into the indoor evaporator 20. At this time, the throttle opening of the second expansion valve 19 is controlled in such a way that the degree of superheating SH (point h6 in FIG. 23) of the refrigerant on the outlet side of the indoor evaporator 20 is brought close to the target degree of superheating SHO. The refrigerant flowing into the indoor evaporator 20 absorbs heat from air blown by the blower 32 into the vehicle compartment, thereby being evaporated (point h4→point h6 in FIG. 23). In this way, air blown into the vehicle compartment is cooled.

Here, the pressure of the refrigerant in the indoor evaporator 20 is adjusted to a constant pressure by the constant pressure valve 25. The refrigerant flowing out of the outdoor heat exchanger 15 and the refrigerant flowing out of the indoor evaporator 20 meet on the inlet side of the accumulator 21 (point h5→point h7, point h6→point h7 in FIG. 23) and then flow into the accumulator 21 and flow to the inlet side of the compressor 11 and are again compressed by the compressor 11. Actions in the other operation modes are the same as in the first embodiment.

Thus, also in the present embodiment, as shown in FIG. 23, the pressure of the refrigerant in the outdoor heat exchanger 15 can be made lower than the pressure of the refrigerant in the outdoor evaporator 20. Hence, as in the case of the third embodiment, at the time of the second dehumidifying and heating mode, the temperature adjustment range can be expanded to a side in which the temperature of the air blown off into the vehicle compartment is increased.

Further, in the present embodiment, at the time of the second dehumidifying and heating mode, the throttle opening of the first expansion valve 14 is controlled in such a way that the degree of superheating SH of the refrigerant on the outlet side of the indoor evaporator 20 is brought close to the target degree of superheating SHO, so that the refrigerant on the outlet side (point h5 in FIG. 23) of the outdoor heat exchange 15 coupled in parallel to the indoor evaporator 20 is brought into a vapor-liquid two-phase state, whereby the refrigerant cycle can be balanced.

By balancing the refrigerant cycle in this way, it is possible to make the refrigerant exert an heat absorbing operation within the entire heat exchange range of the outdoor heat exchanger 15 and hence to certainly increase the amount of heat absorbed by the refrigerant in the outdoor heat exchanger 15. As a result, at the time of the second dehumidifying and heating mode, the temperature adjustment range can be expanded to a side in which the temperature of the air blown off into the space to be air-conditioned is increased.

11th Embodiment

In the tenth embodiment has been described an example in which the temperature adjustment range is expanded to a side in which the temperature of the air blown off into the space to be air-conditioned is increased at the time of the second dehumidifying and heating mode. However, in the present embodiment will be described an example which has the construction shown in FIG. 22 of the tenth embodiment and which expands the temperature adjustment range to a side in which the temperature of the air blown off into the space to be air-conditioned is decreased at the time of the second dehumidifying and heating mode.

In the present embodiment, the control device executes a control flow as a subroutine of the main routine of the air-conditioning control at the time of the second humidifying and heating mode. According to the control flow, the control device controls the action of the compressor 11 in such a way that the vehicle compartment blowoff air temperature TAV is brought close to the target blowoff temperature TAO and controls the action of the first expansion valve 14 in such a way that the degree of super-cooling SC of the refrigerant on the outlet side of the indoor condenser 12 is brought close to the target degree of super-cooling SCO and controls the action of the second expansion valve 19 in such a way that the blowoff air temperature Te from the indoor evaporator 20, which is detected by the evaporator temperature sensor 40, is brought close to the target evaporator blowoff temperature TEO.

More specifically, in this control flow, as in the case of the tenth embodiment, the number of revolutions (refrigerant discharging capacity) of the compressor 11 and the throttle opening of the first expansion valve 14 are controlled. Further, when the blowoff air temperature Te from the indoor evaporator 20 is decreased, the throttle opening of the second expansion valve 19 is increased, whereas when the blowoff air temperature Te from the indoor evaporator 20 is increased, the throttle opening of the second expansion valve 19 is decreased. In this way, in the second dehumidifying and heating mode of the present embodiment, the state of the refrigerant is changed like the Mollier diagram shown in FIG. 10 of the second embodiment.

Here, like the present embodiment, in the cycle construction in which the constant pressure valve 25 is arranged on the outlet side of the indoor evaporator 20, the evaporation pressure of the refrigerant is held at a specified value by the operation of the constant pressure valve 25. Thus, in order to decrease the blowoff air temperature Te from the indoor evaporator 20, it is only necessary to make the refrigerant exert a heat absorbing operation within an entire heat exchange range of the indoor evaporator 20 by increasing the throttle opening of the second expansion valve 19 to thereby increase the amount of flow of the refrigerant flowing into the indoor evaporator 20.

Further, by increasing the throttle opening of the second expansion valve 19 to thereby increase the amount of flow of the refrigerant flowing into the indoor evaporator 20, the refrigerant on the outlet side of the indoor evaporator 20 can be brought into a vapor-liquid two-phase state and hence the refrigerant on the outlet side of the outdoor heat exchanger 15 coupled in parallel to the indoor evaporator 20 is brought into a vapor state having a degree of superheating, whereby the refrigerant cycle can be balanced.

By balancing the refrigerant cycle in this way, a region through which a vapor-phase refrigerant is passed is produced in a portion of the outdoor heat exchanger 15, so that as compared with a case where a liquid-phase refrigerant is passed through the entire region of the outdoor the exchanger 15, the amount of heat absorbed by the refrigerant in the outdoor heat exchanger 15 can be decreased. As a result, at the time of the dehumidifying and heating operation, the temperature adjustment range can be expanded to a side in which the temperature of the air blown off into the space to be air-conditioned is decreased.

Moreover, contrary to the present embodiment, the control device may control the action of the second expansion valve 19 in such a way that the degree of super-cooling SC of the refrigerant on the outlet side of the indoor condenser 12 is brought to the target degree of super-cooling SCO. Further, the control device may control the action of the first expansion valve 14 in such a way that the blowoff air temperature Te from the indoor evaporator 20, which is detected by the evaporator temperature sensor 40, is brought close to the target evaporator blowoff temperature TEO.

Modified Examples of First to 11th Embodiments (1) In the respective embodiments described above have been described examples in which the heating mode, the cooling mode, and the dehumidifying and heating mode are switched by the operation signal of the A/C switch. However, the present disclosure is not limited to these embodiments. For example, it is also recommendable to provide the operation panel with an operation mode setting switch for setting respective operation modes and to switch among the heating mode, the cooling mode, and the dehumidifying and heating mode according to the operation signal of the operation mode setting switch.

(2) In the respective embodiments described above have been described examples in which the air mixing door 36 is activated in such a way as to block either the air passage of the indoor condenser 12 and the heater core 34 or the cooling air bypass passage 35 at the time of the respective operation modes of the heating mode, the cooling mode, and the dehumidifying and heating mode. However, the action of the air mixing door 36 is not limited to these examples.

For example, the air mixing door 36 may open both of the air passage of the indoor condenser 12 and the heater core 34 and the cooling air bypass passage 35. The temperature of the air blown off into the vehicle compartment may be adjusted by adjusting the ratio between the amount of air passing through the air passage of the indoor condenser 12 and the heater core 34 and the amount of air passing through the cooling air bypass passage 35. This temperature adjustment is effective in that the fine adjustment of the temperature of the air blown off into the vehicle compartment can be easily performed.

(3) The respective embodiments described above employ a construction in which the heater core 34 is arranged in the indoor air-conditioning unit 30. However, in the case where an external heat source such as an engine is insufficient, the heater core 34 may be removed or may be replaced by an electric heater or the like.

(4) In the second embodiment described above, the pressure 41 and the temperature sensor 42 are arranged on the outlet side of the outdoor heat exchanger 15 and the degree of superheat on the outlet side of the outdoor heat exchanger 15 at the time of the second dehumidifying and heating mode is adjusted on the basis of the detection values of the respective sensors 41, 42. However, the present disclosure is not limited to this embodiment. For example, the temperature sensors may be arranged on the inlet side and the outlet side of the outdoor heat exchanger 15, and the degree of superheat on the outlet side of the outdoor heat exchanger 15 at the time of the second dehumidifying and heating mode may be adjusted on the basis of the detection values of the respective sensors.

(5) In the third embodiment described above has been described an example in which the constant pressure valve 25 constructed of a mechanical control valve is employed. However, the present invention is not limited to this embodiment. For example, an electric control valve (electromagnetic valve) may be employed as the constant pressure adjusting part. In this case, it is only necessary that the target evaporator blowoff temperature TEO of the indoor evaporator 20 is determined on the basis of the target blowoff temperature TAO with reference to a control map stored previously in the control device and that the electric control valve is controlled in such a way as to realize the target blowoff temperature TAO.

(6) It is desired that as in the case of the third embodiment described above, the constant pressure valve 25 is arranged and that the degree of superheat on the outlet side of the outdoor heat exchanger 15 at the time of the second dehumidifying and heating mode is adjusted. However, it is also recommended that the constant pressure valve 25 is arranged and that the degree of superheat on the outlet side of the outdoor heat exchanger 15 is not adjusted at the time of the second dehumidifying and heating mode.

(7) In the respective embodiments described above has been described an example in which the refrigerant cycle device 10 of the present disclosure is applied to the vehicular air conditioner 1. However, the present invention is not limited to these embodiments. For example, the refrigerant cycle device 10 of the present disclosure may be applied to a stationary air conditioner or the like.

Figure 24:
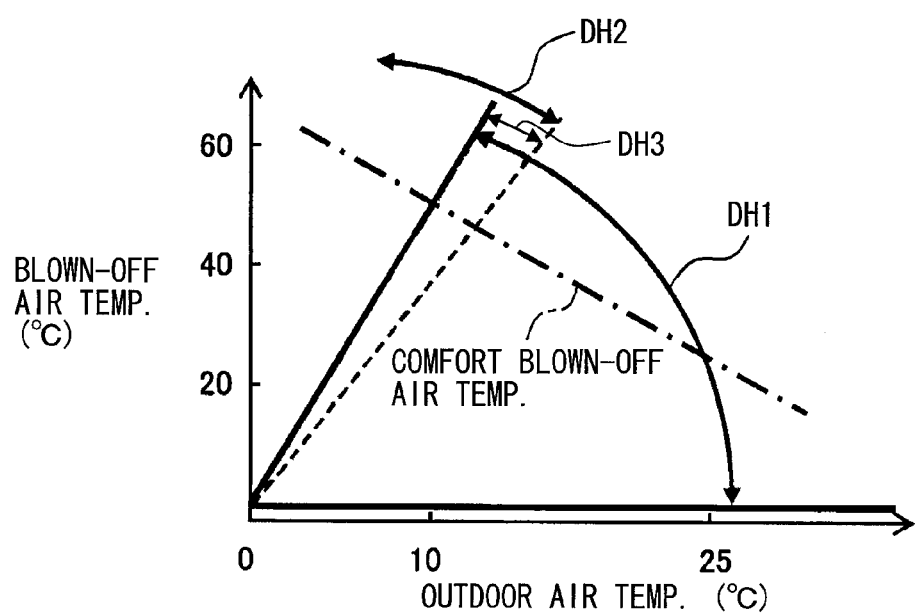
FIG. 24 is an illustrative graph to illustrate a temperature adjustable range of air blown off into a chamber at the time of first and second dehumidifying and heating modes.

(8) According to a control mode at the time of the first dehumidifying and heating mode and a control mode at the time of the second dehumidifying and heating mode, which have been described in the respective embodiments described above, as shown by a reference symbol DH3 in FIG. 24, a temperature adjustable range at the time of the first dehumidifying and heating mode and a temperature adjustable range at the time of the second dehumidifying and heating mode can be made to overlap each other. In FIG. 24, a reference symbol DH1 denotes the temperature adjustable range at the time of the first dehumidifying and heating mode and a reference symbol DH2 denotes the temperature adjustable range at the time of the second dehumidifying and heating mode. By using the overlapping portion DH3 as a hysteresis, it is possible to prevent the occurrence of control hunting at the time of switching between the first dehumidifying and heating mode and the second dehumidifying and heating mode.

In other words, in the refrigerant cycle device 10 described in the respective embodiments, the temperature range within which the air after passing through the refrigerant radiator 12 can change when the refrigerant passage switching part switches the first refrigerant passage may overlap at least a portion of the temperature range within which the air after passing through the refrigerant radiator 12 can change when the refrigerant passage switching part switches the second refrigerant passage.

(9) The control of the compressor 11, the first expansion valve 14 and the second expansion valve 19, which has been described in the ninth to the eleventh embodiments described above, may be applied to the respective refrigerant cycle devices 10 described in the fourth to the eighth embodiments.

12th Embodiment

Figure 26:
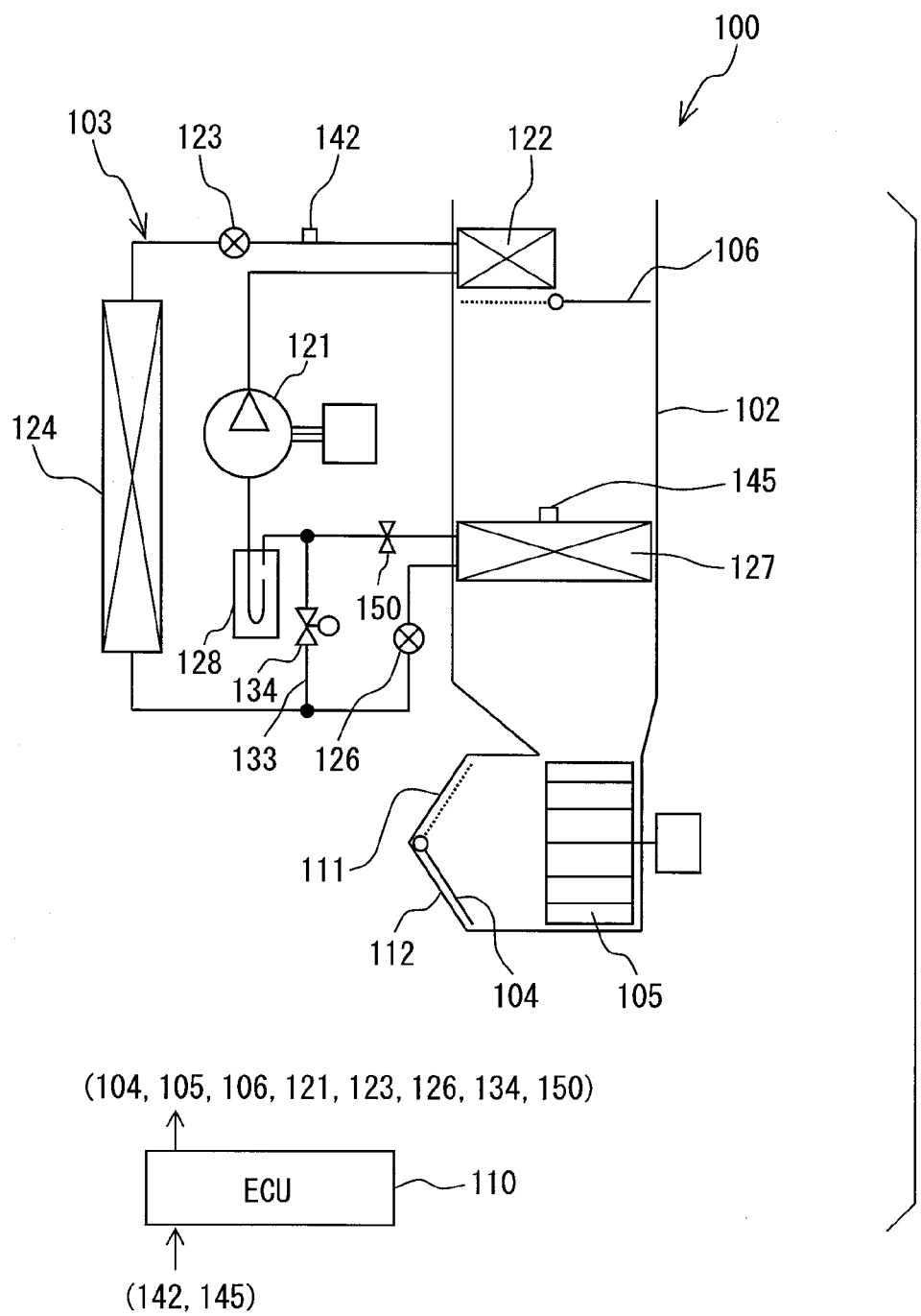
FIG. 26 is a schematic diagram to show a general configuration of a vehicular air conditioner using a refrigerant cycle device according to a 12th embodiment.

FIG. 26 is a schematic diagram to show a general construction of a vehicular air conditioner using a refrigerant cycle device in a 12th embodiment to which the present disclosure is applied.

The vehicular air conditioner of the present embodiment illustrated in FIG. 26 is an automobile air conditioner constructed in such a way that respective air-conditioning parts (actuators) in an air-conditioning unit 100 for air-conditioning the interior of a vehicle compartment of an automobile or the like are controlled by an air-conditioning control device (corresponding to an air conditioner control device, a control part: hereinafter referred to as "ECU" in some cases) 110. The air-conditioning unit 100 includes: an air duct 102 (corresponding to a duct) that forms an air passage for introducing air-conditioned wind into the vehicle compartment of an automobile; a centrifugal blower 105 for generating an air flow toward the interior of the vehicle compartment in the air duct 102; an evaporator 127 for cooling air flowing in the air duct 102; and a refrigerant cycle 103 (corresponding to a refrigerant cycle device)

having a condenser 122 (corresponding to a refrigerant radiator) for reheating the air after passing through the evaporator 127.

The air duct 102 is arranged on the front side of the vehicle compartment of the automobile. On the upstream side in the direction of the flow of air in the air duct 102 are formed an indoor air suction port 111, which takes in air inside the vehicle compartment (hereinafter referred to as "indoor air" in some cases), and an outdoor air suction port 112, which takes in air outside the vehicle compartment (hereinafter referred to as "outdoor air" in some cases). An indoor/outdoor air switching door 104 is rotatably supported on the air passage side of the indoor air suction port 111 and the outdoor air suction port 112. The indoor/outdoor air switching door 104 is driven by an actuator such as a servomotor and switches a suction port mode between an outdoor air introduction (FRS) mode and an indoor air introduction (RES) mode.

Further, on the downstream side in the direction of the flow of air in the air duct 102 are formed a plurality of blowoff ports (not shown). The plurality of blowoff ports include at least a defroster (DEF) blowoff port for blowing off hot air mainly toward the inner face of a window glass of the automobile, a face (FACE) blowoff port for blowing off cold air mainly toward the upper body (head and breast portions) of an occupant, and a foot (FOOT) blowoff port for blowing off hot air mainly toward the lower body (foot portion) of the occupant. The plurality of blowoff ports are selectively opened or closed by a plurality of mode switching doors (not shown). The plurality of mode switching doors are driven by actuators such as servomotors, respectively, and switch a blowoff port mode (MODE) to a face (FACE) mode, a bi-level (B/L) mode, a foot (FOOT) mode, a foot defroster (F/D) mode, and a defroster (DEF) mode.

The centrifugal blower 105 has a centrifugal fan, which is rotatably received in a scroll casing integrally formed on the upstream side in the direction of the flow of air in the air duct 102, and a blower motor, which rotates and drives the centrifugal fan. The rotation speed of the blower motor is varied on the basis of a blower motor terminal voltage (blower control voltage, blower level) applied via a blower drive circuit (not shown), whereby the amount of air-conditioned air blown into the vehicle compartment is controlled.

The refrigerant cycle 103 is constructed of a compressor 121 (corresponding to a compression machine, hereinafter referred to as a compression machine), a condenser 122, a first pressure reducing part, an outdoor heat exchanger 124, a second pressure reducing part, an evaporator 127, an accumulator 128, and a refrigerant piping for coupling these parts in the form of a ring. The compressor 121 is an electric refrigerant compression machine that is rotated and driven by a drive motor (not shown) built therein and that compresses and discharges a refrigerant gas sucked from the evaporator 127. When electric current is passed through the compressor 121 (ON), the compressor 121 is activated, whereas when the passage of electric current through the compressor 121 is stopped (OFF), the compressor 121 is stopped. The compressor 121 has its rotation speed controlled by an inverter in such a way as to reach a target rotation speed calculated by the ECU 110.

The condenser 122 is a heating heat exchanger that is arranged on the more downstream side in the direction of the flow of air than the evaporator 127 in the air duct 102 and that exchanges heat with the refrigerant gas flowing into itself from the compressor 121 to thereby heat the air passing through itself. An air mixing (A/M) door 106, which adjusts the amount of air passing through the condenser 122 and the amount of air bypassing the condenser 122 to thereby adjust the blowoff temperature of air blown off into the vehicle compartment, is rotatably supported on an air inlet portion of the condenser 122. The A/M door 106 is driven by an actuator such as a servomotor.

The first pressure reducing part is constructed of a heating variable throttle valve 123 (corresponding to the first pressure reducing part) into which refrigerant condensed by the condenser 122 flows. The heating variable throttle valve 123 is a pressure reducing part for reducing the pressure of the refrigerant flowing out of the condenser 122 according to its valve opening, and an electric expansion valve for heating (EVH) whose valve opening is electrically controlled by the ECU 110 is used for the heating variable throttle valve 123. Further, the heating variable throttle valve 123 can be set to a fully open mode of fully opening the valve opening by the control of the ECU 110.

The refrigerant piping for coupling a refrigerant outlet of the condenser 122 to a refrigerant inlet of the heating variable throttle valve 123 is provided with a refrigerant pressure sensor 142 of a pressure detection part for detecting a refrigerant pressure in the refrigerant piping (a refrigerant pressure in the condenser 122, a high-pressure side refrigerant pressure). The refrigerant pressure sensor 142 outputs the information of a detected pressure to the ECU 110.

The outdoor heat exchanger 124 is set outside the air duct 102, for example, at a place easily receiving a running wind developed when the automobile runs (specifically, a front portion of an engine room) and makes the refrigerant flowing through its interior exchange heat with the outdoor air blown from an electric fan (not shown). Here, at the time of the heating mode or the dehumidifying mode, the outdoor heat exchanger 124 is operated as a heat absorbing device for absorbing heat from the outdoor air, whereas at the time of the cooling mode or the dehumidifying mode, the outdoor heat exchanger 124 is operated as a refrigerant radiator for radiating heat to the outdoor air.

The second pressure reducing part is constructed of: a cooling variable throttle valve 126 into which the refrigerant flows from the outdoor heat exchanger 124; and a bypass piping 133 for making the refrigerant flowing out of the outdoor heat exchanger 124 bypass the cooling variable throttle valve 126 and the evaporator 127 to thereby feed the refrigerant to the accumulator 128. The cooling variable throttle valve 126 is a pressure reducing part for reducing the pressure of the refrigerant flowing out of the outdoor heat exchanger 124 according to its valve opening, and an electric expansion valve for cooling (EVC) whose valve opening is electrically controlled by the ECU 110 is used for the cooling variable throttle valve 126. Further, the cooling variable throttle valve 126 can be set to a fully closed mode of fully closing the valve opening by the control of the ECU 110.

Further, the bypass piping 133 is provided with an electromagnetic opening/closing valve 134 (VH: hereinafter referred to as "an electromagnetic valve for heating" in some cases) which is opened when electric current is passed through itself (ON) and which is closed when the passage of electric current through itself is stopped (OFF).

The evaporator 127 is an air-refrigerant heat exchanger (heat absorbing device) that makes refrigerant reduced in pressure by the cooling variable throttle valve 126 exchange heat with air as an external liquid, which is blown by the centrifugal fan 5 and from which heat is absorbed, to evaporate or vaporize the refrigerant to thereby generate a refrigerant gas. The generated refrigerant gas is supplied to the compressor 121 via the accumulator 128. The evaporator 127 (specifically, an outer fin thermally coupled to a refrigerant pipe of the evaporator 127) is provided with an evaporator outside surface temperature sensor (an evaporator fin temperature sensor, hereinafter referred to as "evaporator temperature sensor" in some cases) 145 of a temperature detection part for detecting the temperature of an outside surface of the evaporator 127. The evaporator temperature sensor 145 outputs the information of a detected temperature to the ECU 110.

Further, the accumulator 128 is a vapor-liquid separator having an accumulation chamber for temporarily accumulating the refrigerant flowing into from the evaporator 127.

The refrigerant cycle 103 of the present embodiment is provided with a suction refrigerant throttle valve 150 (corresponding to the second pressure reducing part) for reducing the pressure of the refrigerant which is evaporated in the evaporator 127 and which is to be sucked into the compressor 121 via the accumulator 128. The suction refrigerant throttle valve 150 is a pressure reducing part for reducing the pressure of the refrigerant flowing out of the evaporator 127 according to a valve opening, and an electric expansion valve whose valve opening is electrically controlled by the ECU 110 is used as the suction refrigerant throttle valve 150. Further, the suction refrigerant throttle valve 150 can be set to a fully open mode of fully opening the valve opening by the control of the ECU 110. Specifically, the suction refrigerant throttle valve 150 is provided at a portion on the more upstream side than a downstream side connection point of the bypass piping 133 of the refrigerant piping for coupling the refrigerant outlet of the evaporator 127 to the refrigerant inlet of the accumulator 128.

Here, a circulation circuit switching part of the refrigerant cycle 103 is a part for switching an operation mode of the refrigerant cycle 103, that is, a circulation passage of the refrigerant in the refrigerant cycle 103 to either of a circulation circuit for a cooling mode (cooling cycle), a circulation circuit for a heating mode (heating cycle), or a circulation circuit for a dehumidifying mode (dehumidifying and heating mode) (dehumidifying cycle). In the present embodiment, the heating variable throttle valve 123 capable of setting a fully open mode, the cooling variable throttle valve 126, and the heating electromagnetic valve 134 correspond to the circulation circuit switching part described above.

Figure 29:
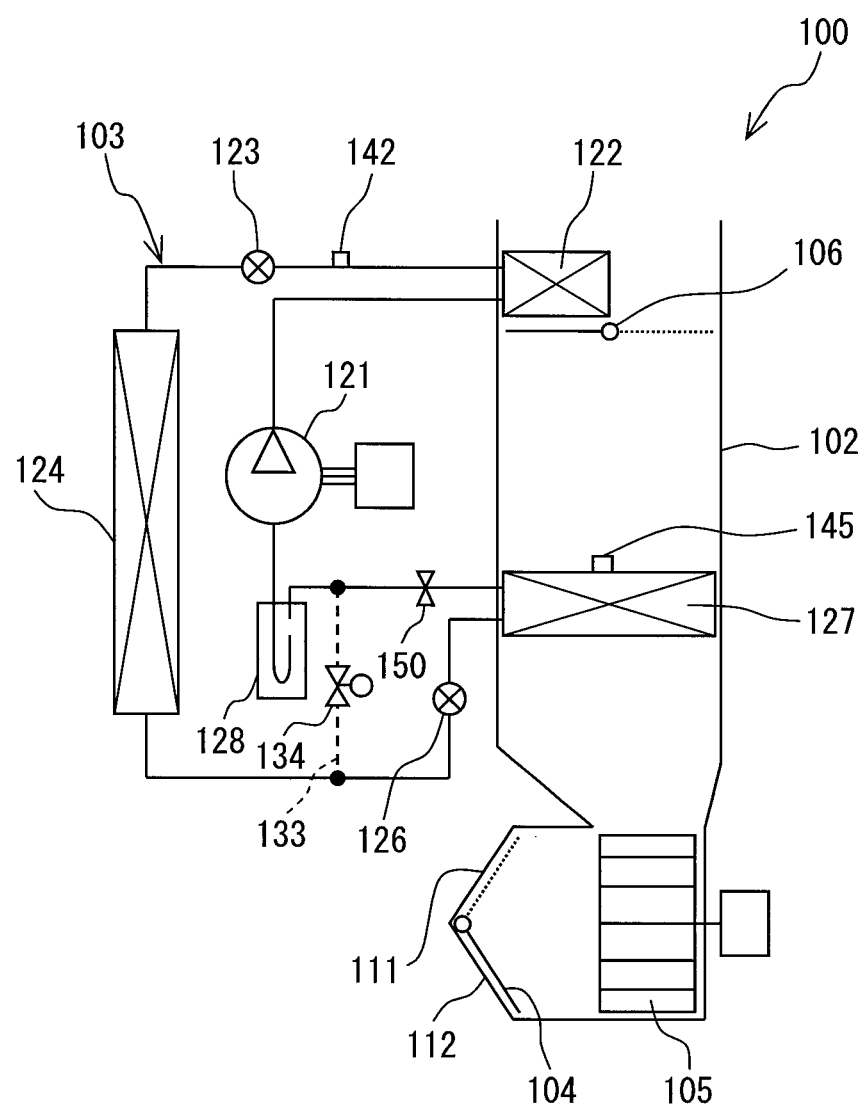
FIG. 29 is a schematic diagram to show the vehicular air conditioner at the time of a cooling operation in the 12th embodiment.

Specifically, when the heating variable throttle valve 123 is put into a fully open mode and the heating electromagnetic valve 134 is closed and the cooling variable throttle valve 126 is put into a flow control opening of reducing the pressure of refrigerant to expand the refrigerant (put into a pressure-reducing and expanding mode), the refrigerant is circulated as shown by solid lines in FIG. 29, whereby the operation mode of the refrigerant cycle 103 is put into the cooling cycle (the circulation circuit for a cooling mode). Here, at the time of the cooling operation mode, the suction refrigerant throttle valve 150 is put into a fully open mode. Further, the air mixing door 106 closes an air inlet part of the condenser 122 and the condensation of the refrigerant in the condenser 122 is inhibited When the heating variable throttle valve 123 is put into a flow control opening of reducing the pressure of refrigerant to expand the refrigerant (put into a pressure-reducing and expanding mode) and the heating electromagnetic valve 134 is opened and the cooling variable throttle valve 126 is put into a fully closed mode, the refrigerant is circulated as shown by solid line in FIG. 30, whereby the operation mode of the refrigerant cycle 103 is put into the heating cycle (the circulation circuit for a heating mode). Here, at the time of the heating operation mode, the air mixing door 106 opens the air inlet part of the condenser 122 and the air of an external fluid is heated by the condensation of the refrigerant in the condenser 122.

Figure 31:
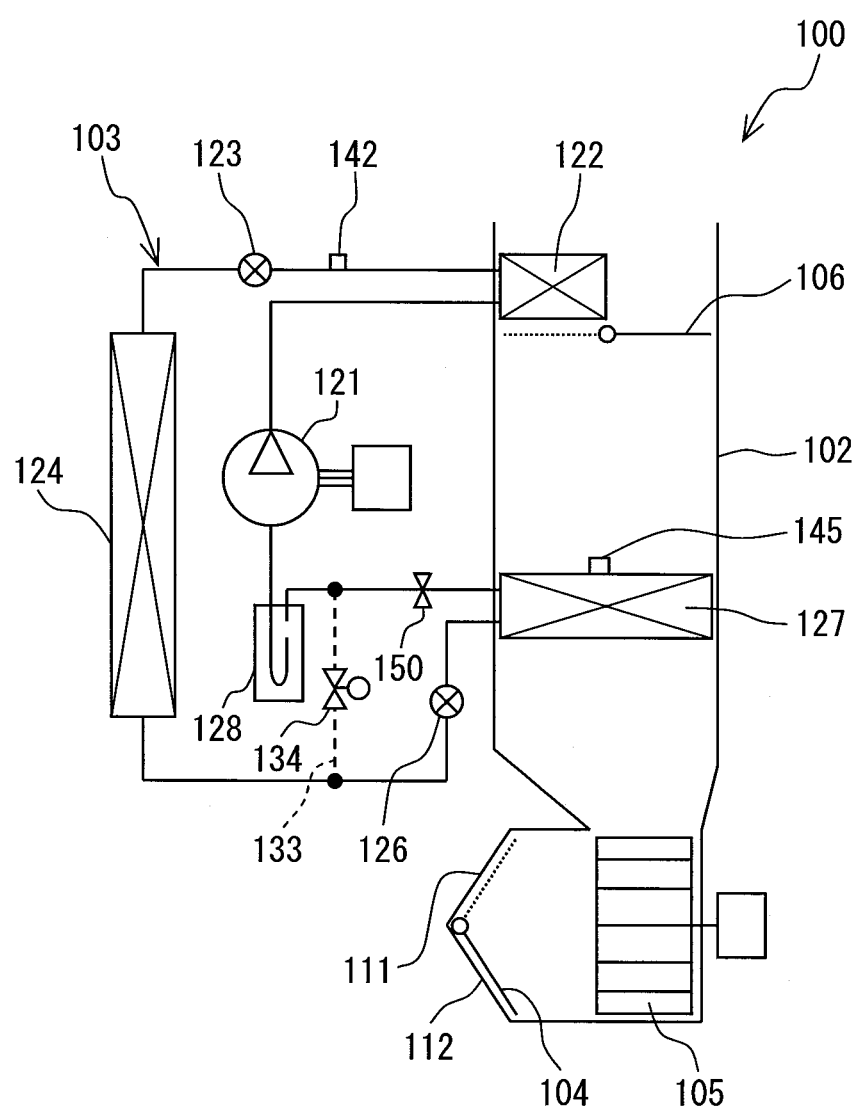
FIG. 31 is a schematic diagram to show the vehicular air conditioner at the time of a dehumidifying and heating operation in the 12th embodiment.

When the heating variable throttle valve 123 is put into a flow control opening of reducing the pressure of refrigerant to expand the refrigerant (put into a pressure-reducing and expanding mode) and the heating electromagnetic valve 134 is closed, the refrigerant is circulated as shown by solid line in FIG. 31, whereby the operation mode of the refrigerant cycle 103 is put into the dehumidifying and heating cycle (the circulation circuit for a dehumidifying and heating mode). Here, at the time of the dehumidifying and heating operation mode, in the case where an air heating capacity in the condenser 122 may be small, the cooling variable throttle valve 126 is put into a flow control opening of reducing the pressure of refrigerant to expand the refrigerant (put into a pressure-reducing and expanding mode) and the suction refrigerant throttle valve 150 is put into a fully open mode.

In contrast to this, in the case where the air heating capacity in the condenser 122 is increased, the cooling variable throttle valve 126 is put into a fully open mode and the suction refrigerant throttle valve 150 is put into a flow control opening of reducing the pressure of refrigerant to expand the refrigerant (put into a pressure-reducing and expanding mode). Further, in both cases, the air mixing door 106 opens the air inlet part of the condenser 122. In this way, the air, which is cooled by the evaporator 127 and is dehumidified because water vapor included is condensed and removed, is reheated by the condensation of the refrigerant in the condenser 122. The control of the suction refrigerant throttle valve 150 in the dehumidifying and heating operation mode will be described below in detail.

The ECU 110 is constructed of a CPU for performing a control processing and an operation processing, a memory (ROM, RAM) for storing various programs and data, an I/O port, and a function of a timer. The ECU 110 itself has a microcomputer of a well-known structure built therein.

When an ignition switch is turned on (a start switch for putting a vehicle into a state in which the vehicle can run is turned on), the ECU 110 is supplied with electric power and electrically controls various actuators (servomotors of the respective doors, the blower motor of the blower 105, the respective variable throttle valves 123, 126, 150, the electromagnetic valve 134, and an inverter of the compressor 121) of the air-conditioning unit 100 on the basis of an operation signal from an air-conditioning operation panel (not shown) and the like, a sensor signal from various sensors including the refrigerant pressure sensor 142 and the temperature sensor 145, and control programs stored in the memory.

Next, the action of the vehicular air-conditioning device using the refrigerant cycle 103 of the present embodiment will be described on the basis of the construction described above.

Figure 27:
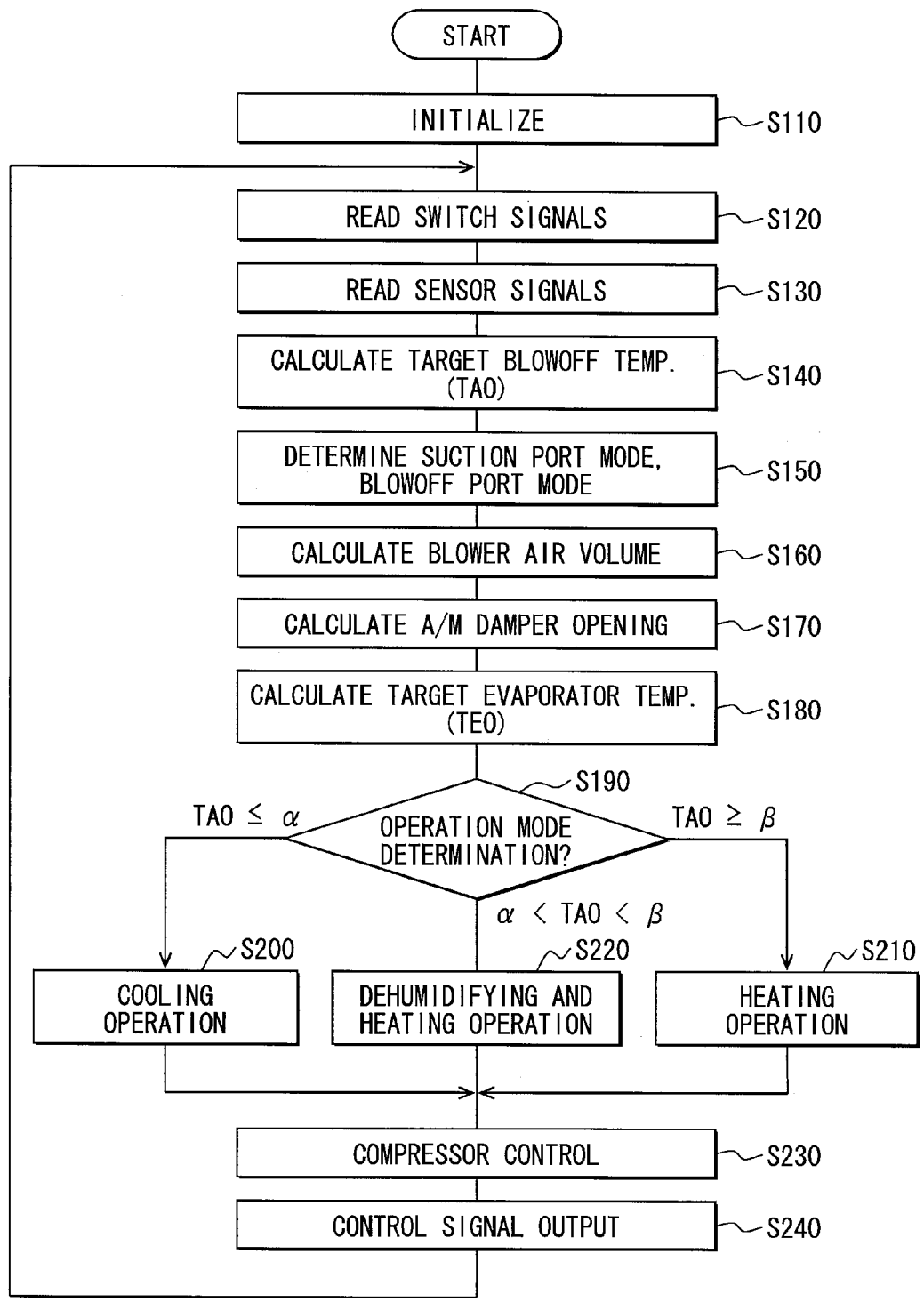
FIG. 27 is a flow chart to show a basic control processing according to an air-conditioning control device of the 12th embodiment.

Here, FIG. 27 is a flow chart to show a basic control processing executed by the ECU 110.

First, when the start switch is turned on and the ECU 110 is supplied with DC power source, a routine shown in FIG. 27 is invoked and initializing and initial setting are executed in step S110. Next, in step S120, switch signals are read from the respective switches such as a temperature setting switch of the air-conditioning operation panel. Next, in step S130, sensor signals are read from an indoor air temperature sensor, an outdoor air temperature sensor, an isolation sensor, the refrigerant pressure sensor 142, the evaporator temperature sensor 145, and the like.

Next, in step S140, a target blowoff temperature TAO of the air blown off into the vehicle compartment is calculated on the basis of the following mathematical equation F3 stored previously in the ROM.

$$TAO=KSET \times TSET-KR \times TR-KAM \times TAM-KS \times TS+C \quad \text{(Mathematical Equation F3)}$$

Here, TSET is a set temperature set by a temperature setting switch, TR is an indoor air temperature detected by the indoor air temperature sensor, TAM is an outdoor air temperature detected by the outdoor air temperature sensor, and TS is the amount of insolation detected by the insolation sensor. Further, KSET, KR, KAM, and KS are gains and C is a constant for correction.

After a target blowoff temperature TAO is calculated in step S140, in step S150, a suction port mode and a blowoff port mode corresponding to the target blowoff temperature TAO are determined from a characteristic diagram (map) stored previously in the ROM. Here, in the case where the suction port mode and the blowoff port mode are set by a manual operation on the air-conditioning operation panel, the suction port mode and the blowoff port mode are determined to be the set modes.

Next, in step S160, a blower air volume (virtually, voltage to be applied to the blower motor of the blower 105) corresponding to the target blowoff temperature TAO is determined from the characteristic diagram (map) stored previously in the ROM. In the case where the blower air volume is fixed by a manual operation on the air-conditioning operation panel, the blower air volume is determined to be the fixed air volume.

After the blower air volume is determined in step S160, next, in step S170, a target door opening SW of the air mixing door 106 is calculated on the basis of the following mathematical equation F4 stored previously in the ROM.

$$SW=\{(TAO-TE)/(TAV-TE)\} \times 100 (\%) \quad \text{(Mathematical Equation F4)}$$

Here, TE is an evaporator temperature (hereinafter referred to as "an evaporator surface temperature" in some cases) detected by the evaporator temperature sensor 145, and TAV is a condenser temperature acquired (calculated) on the basis of the refrigerant pressure detected by the refrigerant pressure sensor 142.

When it is calculated that SW≤0(%), the air mixing door 106 is controlled to a position (MAXCOOL position) for making all of cool air from the evaporator 127 bypass the condenser 122. Further, when it is calculated that SW≥100 (%), the air mixing door 106 is controlled to a position (MAXHOT position) for passing all of cool air from the evaporator 127 through the condenser 122. Still further, when it is calculated that 0<SW<100(%), the air mixing door 106 is controlled to a middle position for passing a part of cool air from the evaporator 127 through the condenser 122 and for making a remaining part of the cool air bypass the condenser 122.

Next, the control processing proceeds to step S180 and a target evaporator temperature (hereinafter referred to as a "target evaporator surface temperature" in some cases) TEO for driving and controlling the compressor 121 is calculated. In step S180, the target evaporator temperature TEO that is an outer surface temperature of the evaporator 127 is calculated from the characteristic diagram (map) stored previously in the ROM, the outer surface temperature of the evaporator 127 being required at the time of performing respective controls of a temperature adjusting control, a comfortable humidity control, and a defrosting control at the time of air-conditioning the interior of the vehicle compartment.

Figure 28:
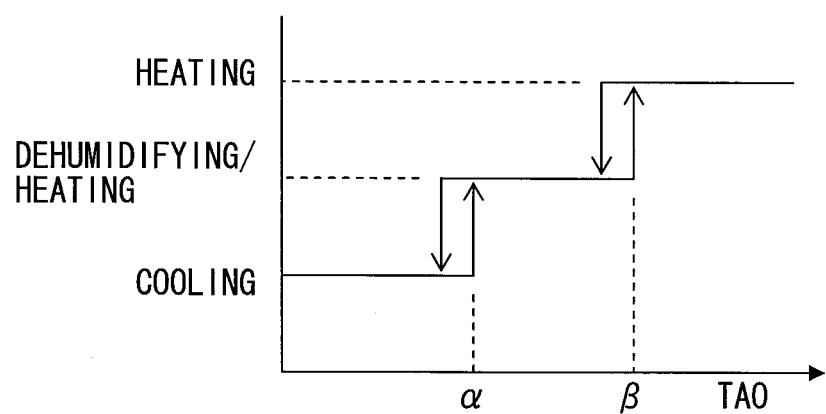
FIG. 28 is a graph to illustrate an operation mode determination of the vehicular air conditioner of the 12th embodiment.

After the target evaporator temperature TEO is calculated in step S180, in step S190, the operation mode of the refrigerant cycle 103 is determined according to the target blowoff temperature TAO. In step S190, for example, as shown in FIG. 28, the target blowoff temperature TAO calculated in step S140 is compared with the first specified temperature α and the second specified temperature β which is higher than the first specified temperature α and it is determined whether the target blowoff temperature TAO is equal to or lower than α, or is equal to or higher than β, or is between α and β.

In the case where it is determined in step S190 that the target blowoff temperature TAO is equal to or lower than the first specified temperature α, the control processing proceeds to step S200 and the setting of putting the refrigerant cycle 103 into a cooling operation is made. As described above, the setting of the cooling cycle is made: that is, the heating variable throttle valve 123 is fully opened; the heating electromagnetic valve 134 is closed; the cooling variable throttle valve 126 is set to the refrigerant flow control opening; and the suction refrigerant throttle valve 150 is fully opened.

Further, in the case where it is determined in step S190 that the target blowoff temperature TAO is equal to or higher than the second specified temperature β, the control processing proceeds to step S210 and the setting of putting the refrigerant cycle 103 into a heating operation is made. As described above, the setting of the heating cycle is made: that is, the heating variable throttle valve 123 is set to the refrigerant flow control opening; the heating electromagnetic valve 134 is opened (fully opened); and the cooling variable throttle valve 126 is fully closed.

Still further, in the case where it is determined in step S190 that the target blowoff temperature TAO is higher than the first specified temperature α and is lower than the second specified temperature β, the control processing proceeds to step S220 and the setting of putting the refrigerant cycle 103 into a dehumidifying and heating operation. Here, FIG. 32 is a flow chart to show the flow of the control in step S220 in FIG. 27.

Figure 32:
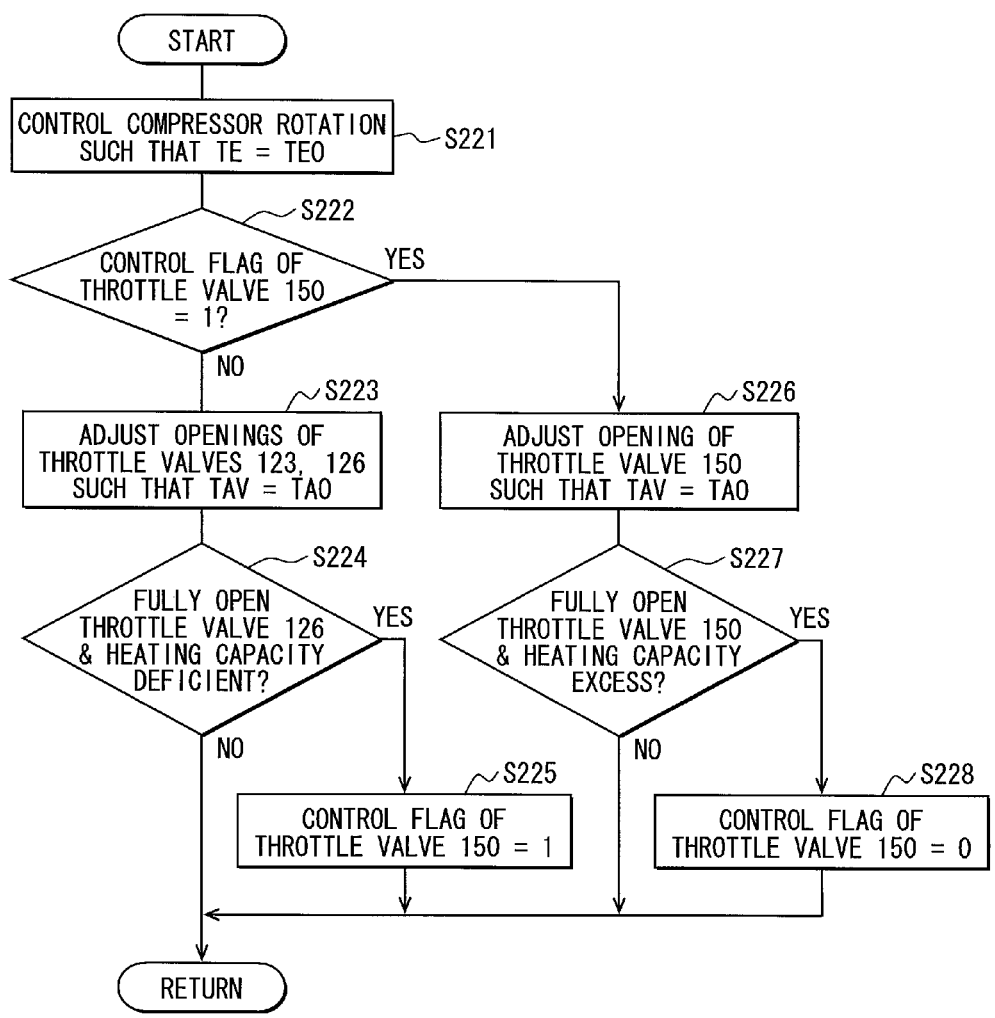
FIG. 32 is a flow chart to show a flow of control of step S220 of FIG. 27 in the 12th embodiment.

When step S220 is executed, as shown in FIG. 32, first, the rotation control of the compressor 121 (that is, the control of the amount of discharge of the refrigerant) is performed in such a way that the evaporator temperature TE detected by the evaporator temperature sensor 145 becomes equal (as close as possible) to the target evaporator temperature TEO calculated in step S180 (step S221).

After step S221 is executed, next, it is determined whether or not a control flag of the suction refrigerant throttle valve 150 is set at 1 (step S222). That the control flag of the suction refrigerant throttle valve 150 is set at 1 means that the opening of the suction refrigerant throttle valve 150 is controlled so as to throttle the amount of flow of the refrigerant flowing through the suction refrigerant throttle valve 150 in such a way that the condenser air temperature TAV obtained on the basis of the refrigerant pressure detected by the refrigerant pressure sensor 142 becomes equal (as close as possible) to the target blowoff temperature TAO. On the other hand, that the control flag of the suction refrigerant throttle valve 150 is set at 0 means that the opening of the suction refrigerant throttle valve 150 is fixedly set at a full opening to thereby prevent the suction refrigerant throttle valve 150 from throttling the amount of flow of the refrigerant flowing though the suction refrigerant throttle valve 150.

In the case where it is determined in step S222 that the control flag of the suction refrigerant throttle valve 150 is not set at 1, that is, the control flag is set at 0, the opening of the heating variable throttle valve 123 and the opening of the cooling variable throttle valve 126 are adjusted in such a way that the condenser temperature TAV obtained on the basis of the refrigerant pressure detected by the refrigerant pressure sensor 142 becomes equal (as close as possible) to the target blowoff temperature TAO (step S223).

Figure 33:
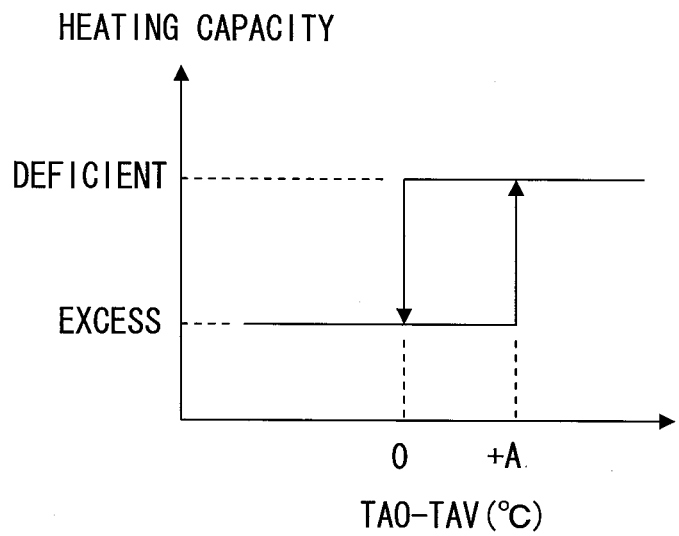
FIG. 33 is a graph to illustrate a heating capacity determination in a condenser.

As the result of the execution of step S223, the cooling variable throttle valve 126 is opened, thereby reaching a fully opened state. It is determined whether or not even if the cooling variable throttle valve 126 is put into the fully opened state to thereby maximize the heat absorbing capacity of the outdoor heat exchanger 124, a heating capacity in the condenser 122 is deficient (step S224). In step S224, it is determined whether or not even if step S223 is executed to control the opening of the heating variable throttle valve 123 and the opening of the cooling variable throttle valve 126 in such a way as to make the condenser temperature TAV equal to the target blowoff temperature TAO, the condenser temperature TAV cannot be increased to the target blowoff temperature TAO and the heating capacity is deficient as shown in FIG. 33.

In the case where it is determined in step S224 that even if the cooling variable throttle valve 126 is not put into the fully opened state, the heating capacity in the condenser 122 is not deficient, or that if the cooling variable throttle valve 126 is put into the fully opened state, the heating capacity in the condenser 122 is not deficient, the control flag of the suction refrigerant throttle valve 150 is held set at 0 and the control processing is returned (proceeds to step S230 shown in FIG. 27).

In the case where it is determined in step S224 that even if the cooling variable throttle valve 126 is put into the fully opened state, the heating capacity in the condenser 122 is deficient, that is, even if the outdoor heat exchanger 124 is made to function as an evaporator (heat absorbing device) that is nearly equal in refrigerant pressure to the evaporator 127, the heating capacity in the condenser 122 is deficient, the control flag of the suction refrigerant throttle valve 150 is set at 1 (step S225) and the control processing is returned (proceeds to step S230 shown in FIG. 27).

In the case where it is determined in step S222 that the control flag of the suction refrigerant throttle valve 150 is set at 1, the opening of the suction refrigerant throttle valve 150 is adjusted in such a way that the condenser temperature TAV becomes equal (as close as possible) to the target blowoff temperature TAO (step S226).

As the result of the execution of step S226, the suction refrigerant throttle valve 150 is opened, thereby reaching the fully open state. It is determined whether or not even if the suction refrigerant throttle valve 150 is put into the fully opened state, the heating capacity in the condenser 122 is excess (step S227). In step S227, it is determined whether or not even if step S226 is executed to control the opening of the suction refrigerant throttle valve 150 in such a way as to make the condenser temperature TAV equal to the target blowoff temperature TAO, the condenser temperature TAV cannot be decreased to the target blowoff temperature TAO and the heating capacity is excess as shown in FIG. 33.

In the case where it is determined in step S227 that even if the suction refrigerant throttle valve 150 is not put into the fully opened state, the heating capacity in the condenser 122 does not become excess or that if the suction refrigerant throttle valve 150 is put into the fully opened state, the heating capacity in the condenser 122 does not become excess, the control flag of the suction refrigerant throttle valve 150 is held set at 1 and the control processing is returned (proceeds to step S230 shown in FIG. 27).

In the case where it is determined in step S227 that even if the suction refrigerant throttle valve 150 is put into the fully opened state, the heating capacity in the condenser 122 is excess, the control flag of the suction refrigerant throttle valve 150 is set at 0 (step S228) and the control processing is returned (proceeds to step S230 shown in FIG. 27).

If any one of the setting of putting the refrigerant cycle 103 into the cooling operation in step S200 shown in FIG. 27, the setting of putting the refrigerant cycle 103 into the heating operation in step S210 shown in FIG. 27, and the setting of putting the refrigerant cycle 103 into the dehumidifying and heating operation in step 220 shown in FIG. 27 which has been described by the use of the control flow shown in FIG. 32 is executed, the control state of the compressor 121 is determined in such a way that the evaporator temperature TE detected by the evaporator temperature sensor 145 becomes the target evaporator temperature TEO (step S230). That is, in step 230 is set the state of the rotation control (the control of the amount of discharge of the refrigerant) of the compressor 121, which has been executed in step S221 shown in FIG. 32.

Next, the control signal is outputted in such a way that the respective control states calculated or determined in the respective steps S150, S160, S170, S220, S210, S220, and S230 can be obtained (step S240). Then, the control processing is returned to step S120.

According to the constructions and the actions described above, when the cooling operation in step S200 is set by the determination in step S190, as described above, the refrigerant is circulated through the passages shown by solid lines in FIG. 29, whereby the air passing through the air duct 102 is cooled by the evaporator 127 and is blown off into the vehicle compartment. The amount of heat absorbed by the evaporator 12 and the amount of heat of an increase in enthalpy produced by the adiabatic compression of the refrigerant by the compressor 121 are radiated to the outdoor air by the outdoor heat exchanger 124.

Figure 30:
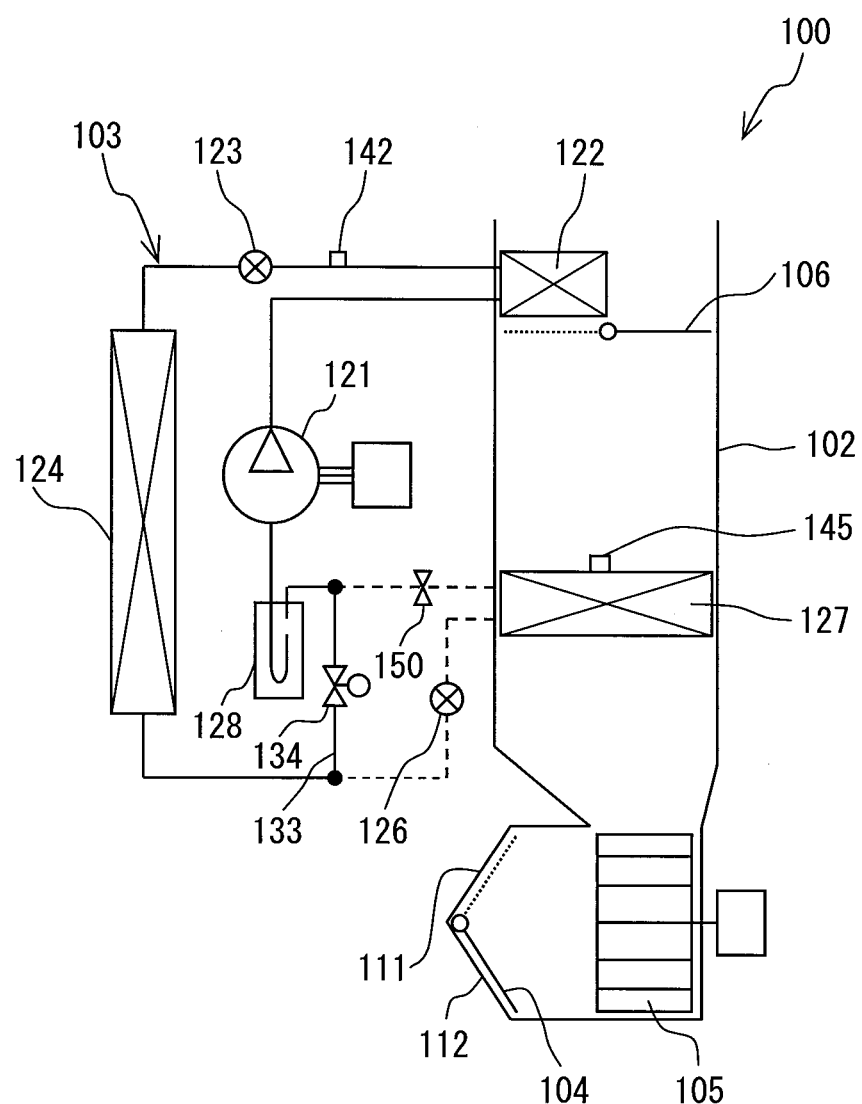
FIG. 30 is a schematic diagram to show the vehicular air conditioner at the time of a heating operation in the 12th embodiment.

When the heating operation in step S210 is set by the determination in step S190, as described above, the refrigerant is circulated through the passages shown by solid lines in FIG. 30, whereby the air passing through the air duct 102 is heated by the condenser 122 and is blown off into the vehicle compartment. The amount of heat radiated to the air by the condenser 122 is compensated by the amount of heat absorbed from the outdoor air by the outdoor heat exchanger 124 and the amount of heat of an increase in enthalpy produced by the adiabatic compression of the refrigerant by the compressor 121.

When the dehumidifying and heating operation in step S220 is set by the determination in step S190, as described above, the refrigerant is circulated through the passages shown by solid lines in FIG. 31, whereby the air passing through the air duct 102 is cooled and dehumidified by the evaporator 127 and then is reheated by the condenser 12 and then is blown off into the vehicle compartment. The amount of heat absorbed from the air passing through the air duct 102 in the evaporator 127 and the amount of heat of an increase in enthalpy produced by the adiabatic compression of the refrigerant by the compressor 121 (amount of heat increased by the compression power) are radiated to the air passing through the air duct 102 by the condenser 122. The difference between the total of the amount of heat absorbed in the evaporator 127 and the amount of heat of an increase in enthalpy produced by the compressor 121 and the amount of heat radiated in the condenser 122 is compensated by the amount of heat absorbed or radiated in the outdoor heat exchanger 124.

The refrigerant cycle 103 of the present embodiment is provided with the suction refrigerant throttle valve 150 of a variable pressure reduction type that can variably reduce the pressure of the refrigerant evaporated by the evaporator 127 and to be sucked by the compressor 121. In the case where the total sum of the amount of heat absorbed in the evaporator 127, the amount of heat absorbed in the outdoor heat exchanger 124, and the amount of heat of an increase in enthalpy by the compressor 121 is deficient for the amount of heat radiated in the condenser 122, the suction refrigerant throttle valve 150 reduces the pressure of the refrigerant and the compressor 121 increases the amount of work of adiabatically compressing the refrigerant reduced in pressure to thereby increase the amount of heat of an increase in enthalpy by the compressor 121. In this way, the amount of heat that is deficient for the amount of heat radiated in the condenser 122 can be ensured.

As described by the use of FIG. 32, the ECU 110 controls the amount of discharge of the refrigerant of the compressor 121 in such a way that the value of the evaporator temperature TE of a physical amount related to the heat absorbing capacity of the evaporator 127 becomes equal to the target evaporator temperature TEO that is a heat-absorption target value. Further, the ECU 110 controls the amount of pressure reduction of the refrigerant of the suction refrigerant throttle valve 150 in such a way that the value of the condenser temperature TAV of a physical amount related to the heating capacity of the condenser 122 becomes equal to the target blowoff temperature TAO that is a heating target value.

In this way, the amount of discharge of the refrigerant of the compressor 121 and the amount of pressure reduction of the refrigerant of the suction refrigerant throttle valve 150 can be controlled in such a way that even if the evaporator temperature TE is made equal to, for example, the target evaporator temperature TEO (for example, 1° C.) having a limitation for preventing the evaporator 127 from being frosted, the temperature TAV of the condenser 122 becomes equal to the target blowoff temperature TAO capable of sufficiently heating the air passing through the air duct 102.

Figure 34:
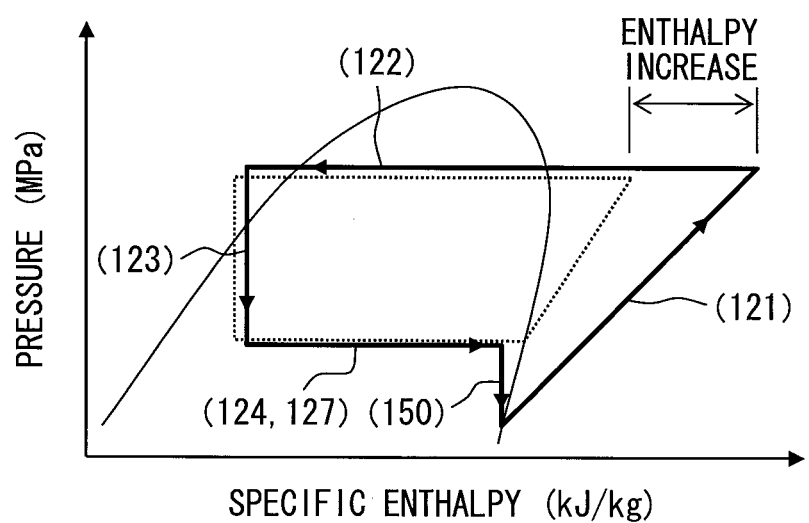
FIG. 34 is a Mollier diagram to illustrate an effect of enhancing a heating capacity in the condenser.

In other words, the amount of flow of refrigerant circulated in the refrigerant cycle is determined by a limitation of the heat absorbing capacity of the evaporator 127, and in the case where even if the cooling variable throttle valve 126 is fully opened and the heat absorbing capacity of the outdoor heat exchanger 124 is maximized, the heating capacity in the condenser 122 is deficient, a cycle state shown by solid lines in a pressure vs. enthalpy diagram in FIG. 34 can be formed.

Specifically, the refrigerant evaporated in the evaporator 127 is once reduced in pressure by the suction refrigerant throttle valve 150 and the refrigerant reduced in pressure by the suction refrigerant throttle valve 150 is isentropically compressed by the compressor 121, whereby the enthalpy of the refrigerant flowing into the condenser 122 can be increased.

A cycle shown by a broken line in the pressure vs. enthalpy diagram in FIG. 34 is a comparative example in which the suction refrigerant throttle valve 150 is not provided and in which the refrigerant evaporated in the evaporator 127 is compressed by the compressor 121 without being reduced in pressure.

According to the refrigerant cycle 103 of the present embodiment, even in the case where even if the heat absorbing capacity of the outdoor heat exchanger 124 is maximized, the heating capacity in the condenser 122 is deficient, by reducing the pressure of the refrigerant by the suction refrigerant throttle valve 150 and by increasing the amount of work of compressing and discharging the refrigerant, which has been reduced in pressure by the suction refrigerant throttle valve 150, by the compressor 121, the value of the condenser temperature TAV of the physical amount related to the heating capacity of the condenser 122 can be made equal to the target blowoff temperature TAO of a heating target value at which the air passing through the air duct 102 can be sufficiently heated. In this way, even if the heat absorbing capacity of the evaporator 127 has a limitation, a sufficient capacity of heating an external fluid can be acquired in the condenser 122.

To put the operation and effect of the present embodiment in another way, in the case where a large heating capacity is required in the condenser 122, the relationship of the amount of heat in the dehumidifying and heating cycle is expressed by the following equation:

the amount of heating of the condenser 122(heating capacity)=the amount of heat absorbed by the evaporator 127(dehumidifying capacity,heat absorbing capacity)+the compressing power of the compressor 121+the amount of heat absorbed by the outdoor heat exchanger 124.

Here, when it is taken into account that the evaporator 127 needs to be prevented from being frosted, there is a lower limit in the evaporation pressure of the refrigerant in the evaporator 127. Further, there is also a lower limit in the evaporation pressure of the outdoor heat exchanger 124. For this reason, in particular, in the case where the outdoor air temperature is low or where the load of the evaporator 127 is low, the amount of heat absorbed in the evaporator 127 and the amount of heat absorbed in the outdoor heat exchange 124 cannot be sufficient. Further, the compression power of the compressor 121 is univocally determined by controlling the dehumidifying capacity of the evaporator 127. From the factors described above, when the suction refrigerant throttle valve 150 is not used, the heating capacity cannot be enhanced under the condition that the heating capacity in the condenser 122 does not reach a specified value.

In contrast to this, the refrigerant cycle 103 of the present embodiment is provided with the suction refrigerant throttle valve 150 of a variable pressure reduction type that can variably reduce the pressure of the refrigerant evaporated by the evaporator 127 and to be sucked by the compressor 121. The providing of the suction refrigerant throttle valve 150 intends to keep the dehumidifying capacity of the evaporator 127 and at the same time to increase the compression power of the compressor 121 to enhance the heating capacity of the condenser 122.

In the present embodiment, in the case where even if the dehumidifying capacity required of the evaporator 127 is controlled by the rotation speed of the compressor 121, the condenser 122 does not reach a required heating capacity, when the opening of the suction refrigerant throttle valve 150 is throttled, the evaporation pressure of the refrigerant in the evaporator 127 is increased and the suction pressure of the compressor 121 is decreased. At this time, in order to keep the dehumidifying capacity, the rotation speed of the compressor 121 is increased to control the evaporation pressure, that is, the amount of flow of the refrigerant at a constant value. In this way, even if there is a limit to the heat absorbing capacity (dehumidifying capacity) of the evaporator 127, a sufficient capacity of heating the external fluid can be obtained in the condenser 122.

Further, both of the adjustment of the amount of discharge of the refrigerant of the compressor 121 such that the evaporator temperature TE is made equal to the target evaporator temperature TEO and the adjustment of the amount of pressure reduction of the refrigerant of the suction refrigerant throttle valve 150 such that the condenser temperature TAV is made equal to the target blowoff temperature TAO are performed by the ECU 110 of the control part. Thus, the adjustment accuracy of the amount of discharge of the refrigerant of the compressor 121 and the adjustment accuracy of the amount of pressure reduction of the refrigerant of the suction refrigerant throttle valve 150 can be easily ensured.

13th Embodiment

Next, a 13th embodiment will be described mainly on the basis of FIG. 35 and FIG. 36.

When the present 13th embodiment is compared with the 12th embodiment, the present 13th embodiment is different from the 12th embodiment in that the ECU 110 controls the amount of discharge of the refrigerant of the compressor 121 in such a way as to make the value of the condenser temperature TAV of a physical amount related to the heating capacity of the condenser 122 equal to the target blowoff temperature TAO of the heating target value and in that the ECU 110 controls the amount of pressure reduction of the refrigerant of the suction refrigerant throttle valve 150 in such a way as to make the value of the evaporator temperature TE of a physical amount related to the heat absorbing capacity of the evaporator 127 equal to the target evaporator temperature TEO. Here, the parts equivalent to the parts in the 12th embodiment are denoted by the same reference symbols and their descriptions will be omitted.

Figure 35:
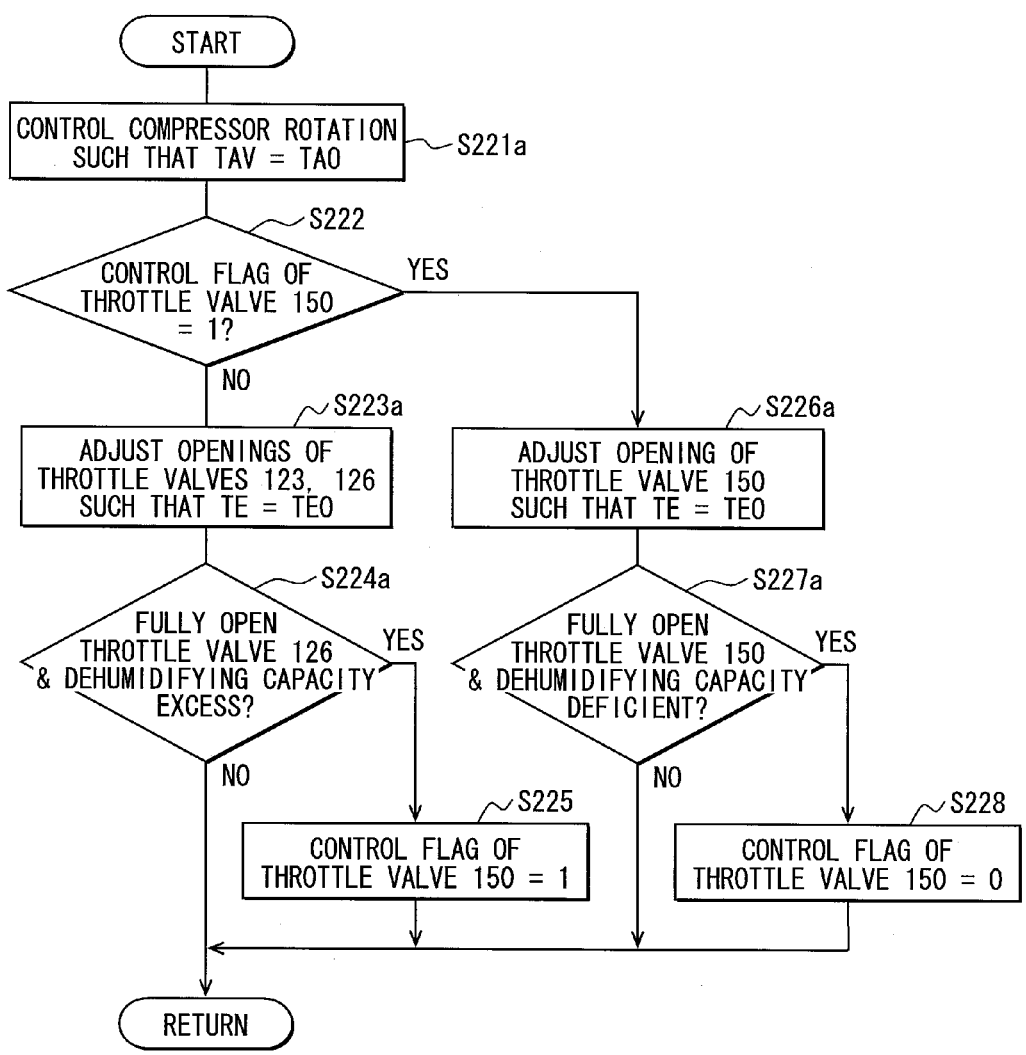
FIG. 35 is a flow chart to show a flow of control of step S220 of FIG. 27 in a 13th embodiment.
Figure 36:
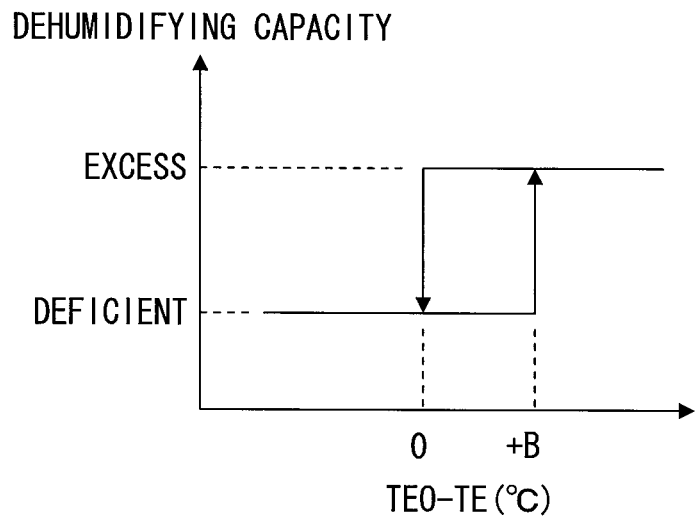
FIG. 36 is a graph to illustrate a dehumidifying capacity determination in an evaporator.

As shown in FIG. 35, in the present embodiment, when step S220 shown in FIG. 27 is executed, first, the rotation control of the compressor 121 (that is, the control of the amount of discharge of the refrigerant) is performed in such a way that the condenser temperature TAV obtained on the basis of the refrigerant pressure detected by the refrigerant pressure sensor 142 becomes equal (as close as possible) to the target blowoff temperature TAO (step S221a).

After step S221a is executed, next, it is determined whether or not the control flag of the suction refrigerant throttle valve 150 is set at 1 (step S222). That the control flag of the suction refrigerant throttle valve 150 is set at 1 means that the opening of the suction refrigerant throttle valve 150 is controlled so as to throttle the amount of flow of the refrigerant flowing though the suction refrigerant throttle valve 150 in such a way that the evaporator temperature TE detected by the evaporator temperature sensor 145 becomes equal (as close as possible) to the target evaporator temperature TEO. On the other hand, that the control flag of the suction refrigerant throttle valve 150 is set at 0 means that the opening of the suction refrigerant throttle valve 150 is fixedly set to a full opening to thereby prevent the suction refrigerant throttle valve 150 from throttling the amount of flow of the refrigerant flowing though the suction refrigerant throttle valve 150.

In the case where it is determined in step S222 that the control flag of the suction refrigerant throttle valve 150 is not set at 1, that is, the control flag is set at 0, the opening of the heating variable throttle valve 123 and the opening of the cooling variable throttle valve 126 are adjusted in such a way that the evaporator temperature TE detected by the evaporator temperature sensor 145 becomes equal (as close as possible) to the target evaporator temperature TEO calculated in step S180 (step S223a).

As the result of the execution of step S223a, the cooling variable throttle valve 126 is opened, thereby reaching a fully opened state. It is determined whether or not even if the cooling variable throttle valve 126 is put into the fully opened state, a dehumidifying capacity (heat absorbing capacity) in the evaporator 127 is excess (step S224a). In step S224, it is determined whether or not even if step S223a is executed to control the opening of the heating variable throttle valve 123 and the opening of the cooling variable throttle valve 126 in such a way as to make the evaporator temperature TE equal to the target evaporator temperature TEO, the evaporator temperature TE cannot be increased to the target evaporator temperature TEO and the dehumidifying capacity is excess as shown in FIG. 36.

In the case where it is determined in step S224a that even if the cooling variable throttle valve 126 is not put into the fully opened state, the dehumidifying capacity in the evaporator 127 is not excess, or that if the cooling variable throttle valve 126 is put into the fully opened state, the dehumidifying capacity in the evaporator 127 is not excess, the control flag of the suction refrigerant throttle valve 150 is held set at 0, and the control processing is returned (proceeds to step S230 shown in FIG. 27).

In the case where it is determined in step S224a that even if the cooling variable throttle valve 126 is put into the fully opened state, the dehumidifying capacity in the evaporator 127 is excess, that is, even if the outdoor heat exchanger 124 is made to function as an evaporator (heat absorbing device) that is nearly equal in the refrigerant pressure to the evaporator 127, the dehumidifying capacity in the evaporator 127 is excess, the control flag of the suction refrigerant throttle valve 150 is set at 1 (step S225), and the control processing is returned (proceeds to step S230 shown in FIG. 27).

In the case where it is determined in step S222 that the control flag of the suction refrigerant throttle valve 150 is set at 1, the opening of the suction refrigerant throttle valve 150 is adjusted in such a way that the evaporator temperature TE becomes equal (as close as possible) to the target evaporator temperature TEO (step S226a).

As the result of the execution of step S226a, the suction refrigerant throttle valve 150 is opened, thereby reaching the fully opened state. It is determined whether or not even if the suction refrigerant throttle valve 150 is put into the fully opened state, the dehumidifying capacity in the evaporator 127 is deficient (step S227a). In step S227a, it is determined whether or not even if step S226a is executed to control the opening of the suction refrigerant throttle valve 150 in such a way as to make the evaporator temperature TE equal to the target evaporator temperature TEO, the evaporator temperature TE cannot be decreased to the target evaporator temperature TEO and the dehumidifying capacity is deficient as shown in FIG. 36.

In the case where it is determined in step S227a that even if the suction refrigerant throttle valve 150 is not put into the fully opened state, the dehumidifying capacity in the evaporator 127 is not deficient or that if the suction refrigerant throttle valve 150 is put into the fully opened state, the dehumidifying capacity in the evaporator 127 is not deficient, the control flag of the suction refrigerant throttle valve 150 is held set at 1 and the control processing is returned (proceeds to step S230 shown in FIG. 27).

In the case where it is determined in step S227a that even if the suction refrigerant throttle valve 150 is put into the fully opened state, the dehumidifying capacity in the evaporator 127 is deficient, the control flag of the suction refrigerant throttle valve 150 is set at 0 (step S228) and the control processing is returned (proceeds to step S230 shown in FIG. 27).

According to the construction and the action of the present embodiment, the ECU 110 controls the amount of discharge of the refrigerant of the compressor 121 in such a way that the value of the condenser temperature TAV of a physical amount related to the heating capacity of the condenser 122 becomes equal to the target blowoff temperature TAO of a heating target value, and the ECU 110 controls the amount of pressure reduction of the refrigerant by the suction refrigerant throttle valve 150 in such a way that the value of the evaporator temperature TE of a physical amount related to the heat absorbing capacity of the evaporator 127 becomes equal to the target evaporator temperature TEO of a heat-absorption target value.

Also in this embodiment, as in the case of the 12th embodiment, the amount of discharge of the refrigerant of the compressor 121 and the amount of pressure reduction of the refrigerant by the suction refrigerant throttle valve 150 can be controlled in such a way that even if the evaporator temperature TE is made equal to, for example, the target evaporator temperature TEO (for example, 1° C.) having a limitation for preventing the evaporator 127 from being frosted, the temperature TAV of the condenser 122 becomes equal to the target blowoff temperature TAO capable of sufficiently heating the air passing through the air duct 102.

The amount of flow of refrigerant circulated in the refrigerant cycle is determined by a limitation of the heat absorbing capacity of the evaporator 127, and in the case where even if the cooling variable throttle valve 126 is fully opened and the heat absorbing capacity of the outdoor heat exchanger 124 is maximized, the heating capacity in the condenser 122 is deficient, a cycle state shown by solid lines in the pressure vs. enthalpy diagram in FIG. 34 can be formed, and hence the same effects as in the 12th embodiment can be produced.

14th Embodiment

Next, a 14th embodiment will be described on the basis of FIG. 37 and FIG. 38.

When the 14th embodiment is compared with the 13th embodiment, the 14th embodiment is different from the 13th embodiment in that the suction refrigerant throttle valve is a constant pressure valve. Here, the parts equivalent to the parts in the 13th embodiment are denoted by the same reference symbols and their descriptions will be omitted.

Figure 37:
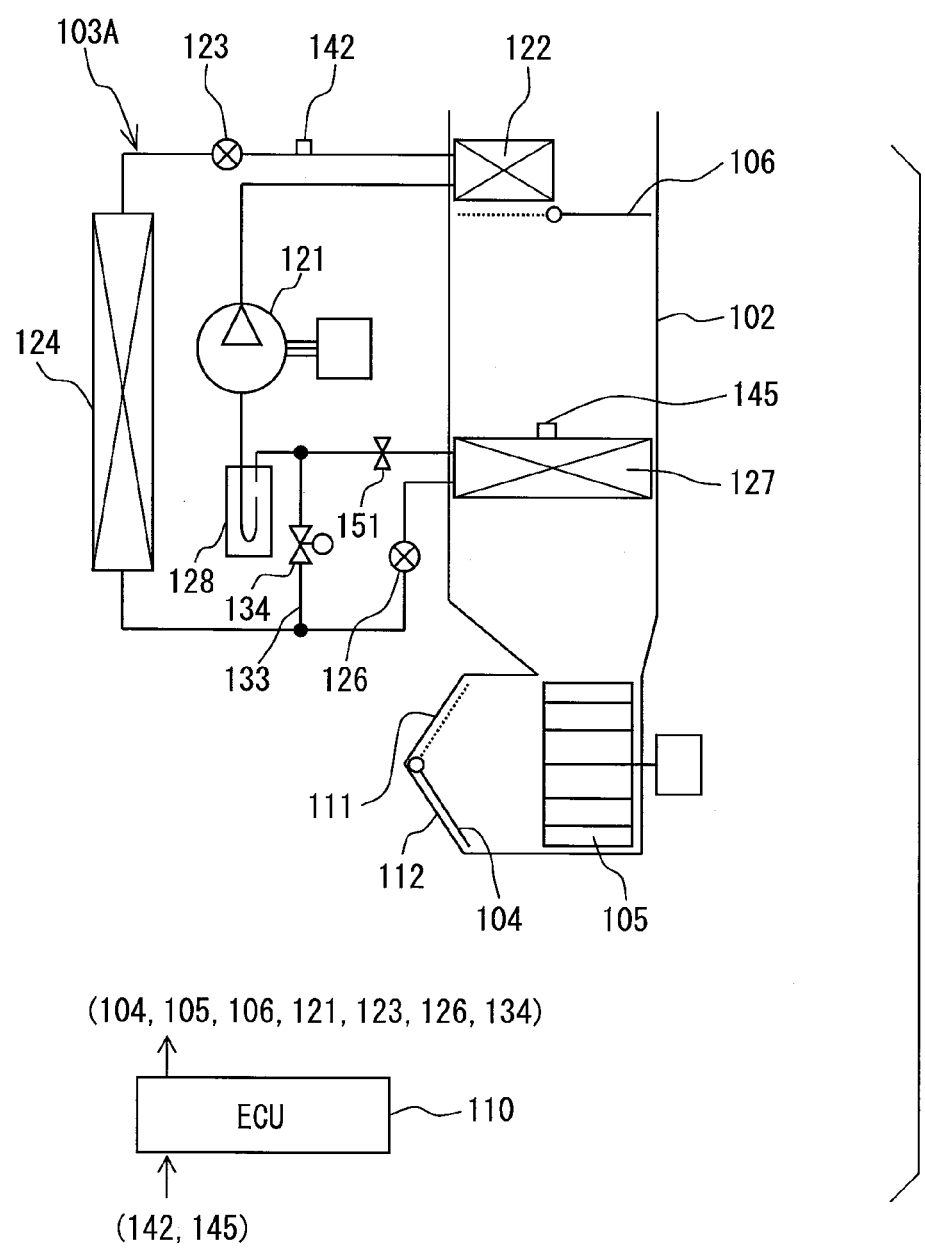
FIG. 37 is a schematic diagram to show a general configuration of a vehicular air conditioner using a refrigerant cycle device in a 14th embodiment.

As shown in FIG. 37, a refrigerant cycle 103A of the present embodiment is provided with a suction refrigerant throttle valve 151 (corresponding to a second pressure reducing part) for reducing the pressure of the refrigerant evaporated by the evaporator 127 and to be sucked by the compressor 121 via the accumulator 128. The suction refrigerant throttle valve 151 is an autonomous constant-pressure valve (so-called evaporation pressure adjusting valve) for preventing the pressure of the refrigerant in the evaporator 127 from becoming less than a specified pressure (for example, 0.3 MPa) even if the pressure of the refrigerant sucked by the compressor 121 is decreased.

The suction refrigerant throttle valve 151 is set, specifically, in a portion on the more upstream side than a downstream connection point of a bypass piping 133 of the refrigerant piping for coupling the refrigerant outlet of the evaporator 127 to the refrigerant inlet of the accumulator 128.

Figure 38:
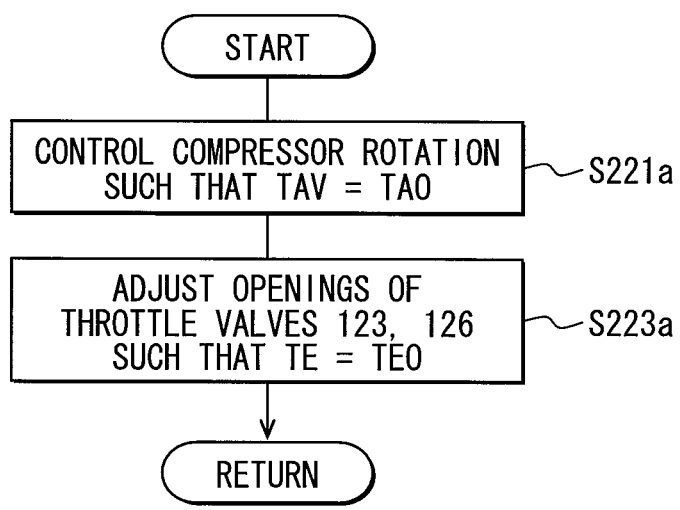
FIG. 38 is a flow chart to show a flow of control of step S220 of FIG. 27 in the 14th embodiment.

As shown in FIG. 38, in the present embodiment, when step S220 shown in FIG. 27 is executed, first, the rotation control of the compressor 121 (that is, the control of the amount of discharge of the refrigerant) is performed in such a way that the condenser temperature TAV obtained on the basis of the refrigerant pressure detected by the refrigerant pressure sensor 142 becomes equal (as close as possible) to the target blowoff temperature TAO (step S221a).

After step S221a is executed, next, the opening of the heating variable throttle valve 123 and the opening of the cooling variable throttle valve 126 are controlled in such a way that the evaporator temperature TE detected by the evaporator temperature sensor 145 becomes equal (as close as possible) to the target evaporator temperature TEO calculated in step S180 (step S223a).

In the present embodiment, in the case where even if step S223a is executed, the opening of the heating variable throttle valve 123 and the opening of the cooling variable throttle valve 126 cannot be controlled in such a way that the evaporator temperature TE becomes equal to the target evaporator temperature TEO, the evaporation pressure of the refrigerant in the evaporator 127 is adjusted to a specified pressure by the function of the suction refrigerant throttle valve 151 of the constant-pressure valve and hence the dehumidifying capacity of the evaporator 127 can be autonomously made a specified dehumidifying capacity.

According to the construction and the action of the present embodiment, the ECU 110 controls the amount of discharge of the refrigerant of the compressor 121 in such a way that the value of the condenser temperature TAV of a physical amount related to the heating capacity of the condenser 122 becomes equal to the target blowoff temperature TAO of a heating target value, and the amount of pressure reduction of the refrigerant is autonomously controlled by the suction refrigerant throttle valve 151 of the constant-pressure valve in such a way that the value of the evaporator temperature TE of a physical amount related to the heat absorbing capacity of the evaporator 127 becomes equal to the target evaporator temperature TEO of a heat-absorption target value.

Thus, the amount of flow of refrigerant circulated in the refrigerant cycle is determined by a limitation of the heat absorbing capacity of the evaporator 127, and in the case where even if the cooling variable throttle valve 126 is fully opened and the heat absorbing capacity of the outdoor heat exchanger 124 is maximized, the heating capacity in the condenser 122 is deficient, a cycle state shown by solid lines in the pressure vs. enthalpy diagram in FIG. 34 can be formed and hence the same effects as in the 12th and 13th embodiments can be produced.

Further, the ECU 110 does not need to control the amount of pressure reduction of the refrigerant by the suction refrigerant throttle valve 151, so that the control logic can be simplified.

15th Embodiment

Next, a 15th embodiment will be described on the basis of FIG. 39 and FIG. 40.

When the 15th embodiment is compared with the 12th embodiment, the 15th embodiment is different from the 12th embodiment in that the second pressure reducing part capable of varying the amount of pressure reduction of the refrigerant is constructed of a fixed throttle valve and an electromagnetic opening/closing valve. Here, the parts equivalent to the parts in the 12th embodiment are denoted by the same reference symbols and their descriptions will be omitted.

Figure 39:
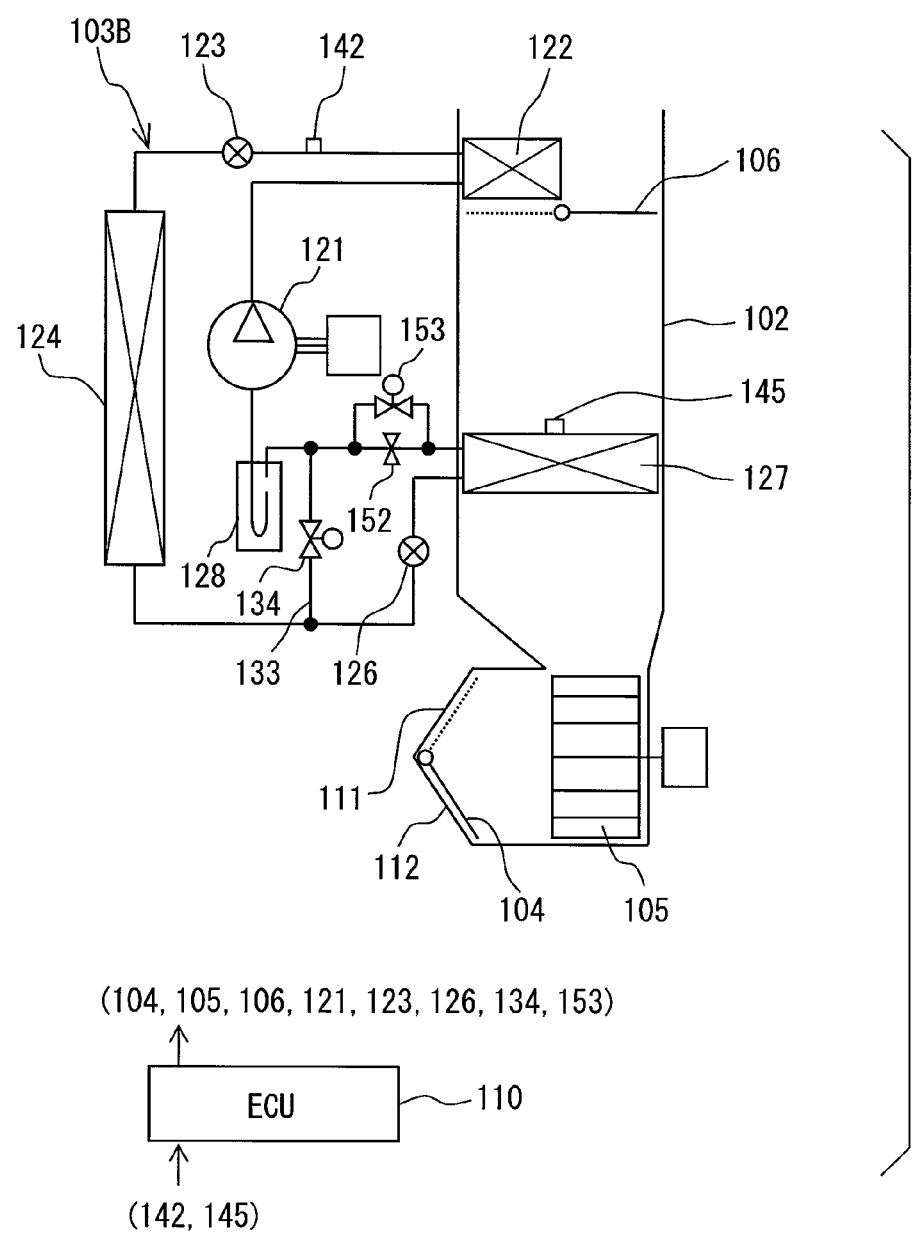
FIG. 39 is a schematic diagram to show a general configuration of a vehicular air conditioner using a refrigerant cycle device in a 15th embodiment.

As shown in FIG. 39, a refrigerant cycle 103B of the present embodiment is provided with: a suction refrigerant throttle valve 152 for reducing the pressure of the refrigerant evaporated by the evaporator 127 and to be sucked by the compressor 121 via the accumulator 128; and an electromagnetic opening/closing valve 153 set in the refrigerant piping bypassing the suction refrigerant throttle valve 152. In other words, the suction refrigerant throttle valve 152 and the electromagnetic opening/closing valve 153 are provided in parallel to each other in a portion on a more upstream side than a downstream side connection point of the bypass piping 133 of the refrigerant piping for coupling the refrigerant outlet of the evaporator 127 to the refrigerant inlet of the accumulator 128.

The suction refrigerant throttle valve 152 is a fixed-throttle valve and the electromagnetic opening/closing valve 153 is an opening/closing valve in which a fully opened state and a fully closed state are selectively switched and controlled. The suction refrigerant throttle valve 152 and the electromagnetic opening/closing valve 153 correspond to the second pressure reducing part in the present embodiment.

The suction refrigerant throttle valve 152 and the electromagnetic opening/closing valve 153 are provided, specifically, in a portion on the more upstream side than the downstream side connection point of the bypass piping 133 of the refrigerant piping for coupling the refrigerant outlet of the evaporator 127 to the refrigerant inlet of the accumulator 128.

Figure 40:
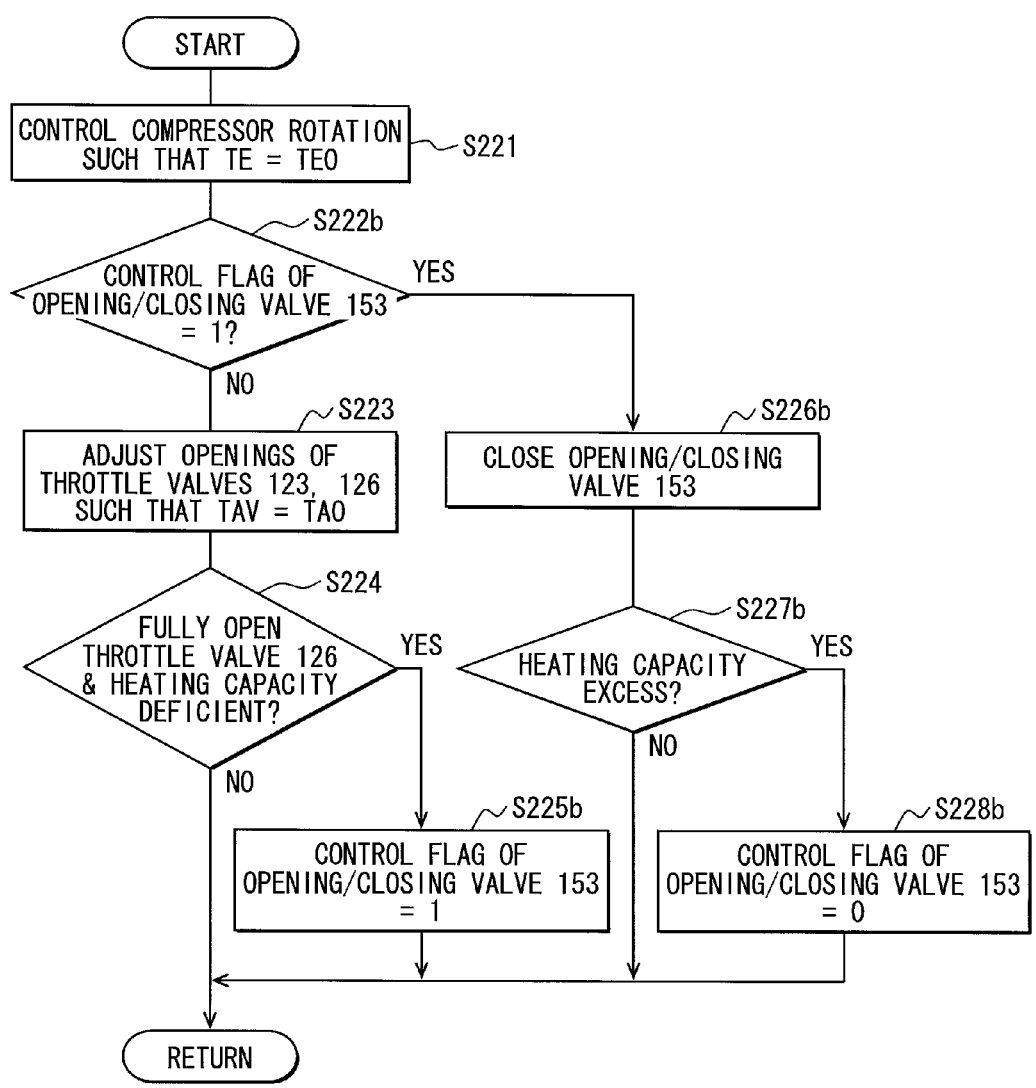
FIG. 40 is a flow chart to show a flow of control of step S220 of FIG. 27 in the 15th embodiment.

As shown in FIG. 40, in the present embodiment, when step S220 shown in FIG. 27 is executed, first, the rotation control of the compressor 121 (that is, the control of the amount of discharge of the refrigerant) is performed in such a way that the evaporator temperature TE detected by the evaporator temperature sensor 145 becomes equal (as close as possible) to the target evaporator temperature TEO calculated in step S180 (step S221).

After step S221 is executed, next, it is determined whether or not the control flag of the electromagnetic opening/closing valve 153 is set at 1 (step S222b). That the control flag of the electromagnetic opening/closing valve 153 is set at 1 means that the opening state of the electromagnetic opening/closing valve 153 is controlled into a fully closed state, whereas that the control flag of the electromagnetic opening/closing valve 153 is set at 0 means that the opening state of the electromagnetic opening/closing valve 153 is controlled into a fully opened state.

In the case where it is determined in step S222b that the control flag of the electromagnetic opening/closing valve 153 is not set at 1, that is, the control flag is set at 0, the opening of the heating variable throttle valve 123 and the opening of the cooling variable throttle valve 126 are adjusted in such a way that the condenser temperature TAV obtained on the basis of the refrigerant pressure detected by the refrigerant pressure sensor 142 becomes equal (as close as possible) to the target blowoff temperature TAO (step S223).

As the result of the execution of step S223, the cooling variable throttle valve 126 is opened, thereby reaching a fully opened state. It is determined whether or not even if the cooling variable throttle valve 126 is put into the fully opened state, a heating capacity in the condenser 122 is deficient (step S224). In step S224, it is determined whether or not even if step S223 is executed to control the opening of the heating variable throttle valve 123 and the opening of the cooling variable throttle valve 126 in such a way as to make the condenser temperature TAV equal to the target blowoff temperature TAO, the condenser temperature TAV cannot be increased to the target blowoff temperature TAO and the heating capacity is deficient as shown in FIG. 33.

In the case where it is determined in step S224 that even if the cooling variable throttle valve 126 is not put into the fully opened state, the heating capacity in the condenser 122 is not deficient, or that if the cooling variable throttle valve 126 is put into the fully opened state, the heating capacity in the condenser 122 is not deficient, the control flag of the electromagnetic opening/closing valve 153 is held set at 0 and the control processing is returned (proceeds to step S230 shown in FIG. 27).

In the case where it is determined in step S224 that even if the cooling variable throttle valve 126 is put into the fully opened state, the heating capacity in the condenser 122 is deficient, that is, even if the outdoor heat exchanger 124 is made to function as an evaporator (heat absorbing device) that is nearly equal in the refrigerant pressure to the evaporator 127, the heating capacity in the condenser 122 is deficient, the control flag of the electromagnetic opening/closing valve 153 is set at 1 (step S225b) and the control processing is returned (proceeds to step S230 shown in FIG. 27).

In the case where it is determined in step S222b that the control flag of the electromagnetic opening/closing valve 153 is set at 1, the opening of the electromagnetic opening/closing valve 153 is put into the fully closed state (step S226b). It is determined whether or not the heating capacity in the condenser 122 is excess in the state where the electromagnetic opening/closing valve 153 is fully closed (step S227b). In step S227b, it is determined whether or not even if the electromagnetic opening/closing valve 153 is closed and the pressure of the refrigerant is reduced by the fixed-throttle suction refrigerant throttle valve 152, the condenser temperature TAV cannot be decreased to the target blowoff temperature TAO and the heating capacity is excess, as shown in FIG. 33.

In the case where it is determined in step S227b that even if the electromagnetic opening/closing valve 153 is put into the fully closed state, the heating capacity in the condenser 122 does not become excess, the control flag of the electromagnetic opening/closing valve 153 is held set at 1 and the control processing is returned (proceeds to step S230 shown in FIG. 27).

In the case where it is determined in step S227b that if the electromagnetic opening/closing valve 153 is put into the fully closed state, the heating capacity in the condenser 122 is excess, the control flag of the electromagnetic opening/closing valve 153 is set at 0 (step S228b) and the control processing is returned (proceeds to step S230 shown in FIG. 27).

According to the construction and the action of the present embodiment, the second pressure reducing part is constructed of: the suction refrigerant throttle valve 152 having a throttle fixed; and the electromagnetic opening/closing valve 153 which is provided in parallel to the suction refrigerant throttle valve 152 and which is selectively switched between a fully opened state and a fully closed state. The ECU 110 controls the amount of discharge of the refrigerant of the compressor 121 in such a way that the value of the evaporator temperature TE of a physical amount related to the heat absorbing capacity of the evaporator 127 becomes equal to the target evaporator temperature TEO of the heat-absorption target value. Further, the ECU 110 opens or closes the electromagnetic opening/closing valve 153 in such a way that the value of the condenser temperature TAV of a physical amount related to the heating capacity of the condenser 122 becomes equal to the target blowoff temperature TAO of the heating target value, thereby controlling the amount of pressure reduction of the refrigerant in two steps.

Also in this embodiment, as in the case of the 12th embodiment, the amount of discharge of the refrigerant of the compressor 121 and the amount of pressure reduction of the refrigerant of the second pressure reducing part, which is constructed of the suction refrigerant throttle valve 152 and the electromagnetic opening/closing valve 153, can be controlled in such a way that even if the evaporator temperature TE is made equal to, for example, the target evaporator temperature TEO having a limitation for preventing the evaporator from being frosted, the temperature TAV of the condenser 122 becomes equal to the target blowoff temperature TAO capable of sufficiently heating the air passing through the air duct 102.

Thus, the amount of flow of refrigerant circulated in the refrigerant cycle is determined by a limitation of the heat absorbing capacity of the evaporator 127, and in the case where even if the cooling variable throttle valve 126 is fully opened and the heat absorbing capacity of the outdoor heat exchanger 124 is maximized, the heating capacity in the condenser 122 is deficient, a cycle state shown by solid lines in the pressure vs. enthalpy diagram in FIG. 34 can be formed, and hence the same effects as in the 12th embodiment can be produced.

Further, the second pressure reducing part capable of varying the amount of pressure reduction is simply constructed of the suction refrigerant throttle valve 152, which is the fixed throttle valve, and the electromagnetic opening/closing valve 153, and hence the variable control of the amount of pressure reduction of the refrigerant can be simplified.

In this regard, in the example described above, the ECU 110 controls the amount of discharge of the refrigerant of the compressor 121 in such a way that the value of the evaporator temperature TE of a physical amount related to the heat absorbing capacity of the evaporator 127 becomes equal to the target evaporator temperature TEO of the heat-absorption target value. Further, the ECU 110 opens or closes the electromagnetic opening/closing valve 153 in such a way that the value of the condenser temperature TAV of a physical amount related to the heating capacity of the condenser 122 becomes equal to the target blowoff temperature TAO of the heating target value, thereby controlling the amount of pressure reduction of the refrigerant.

In contrast to this, the ECU 110 may control the amount of discharge of the refrigerant of the compressor 121 in such a way that the value of the condenser temperature TAV of a physical amount related to the heating capacity of the condenser 122 becomes equal to the target blowoff temperature TAO of the heating target value and may open or close the electromagnetic opening/closing valve 153 in such a way that the value of the evaporator temperature TE of a physical amount related to the heat absorbing capacity of the evaporator 127 becomes equal to the target evaporator temperature TEO of the heat-absorption target value, thereby controlling the amount of pressure reduction of the refrigerant.

Other Embodiments

Figure 41:
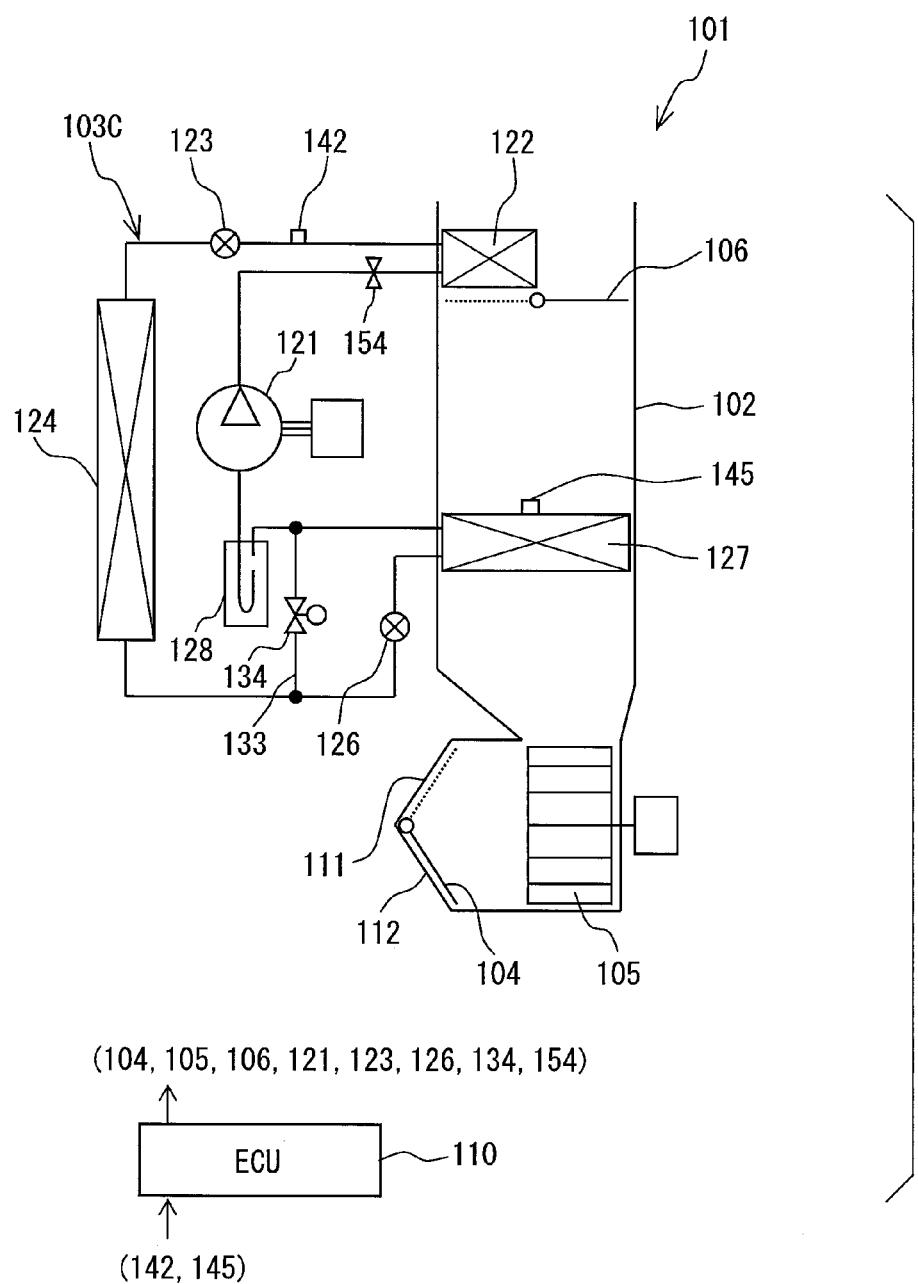
FIG. 41 is a schematic diagram to show a general configuration of a vehicular air conditioner using a refrigerant cycle device in another embodiment.
Figure 42:
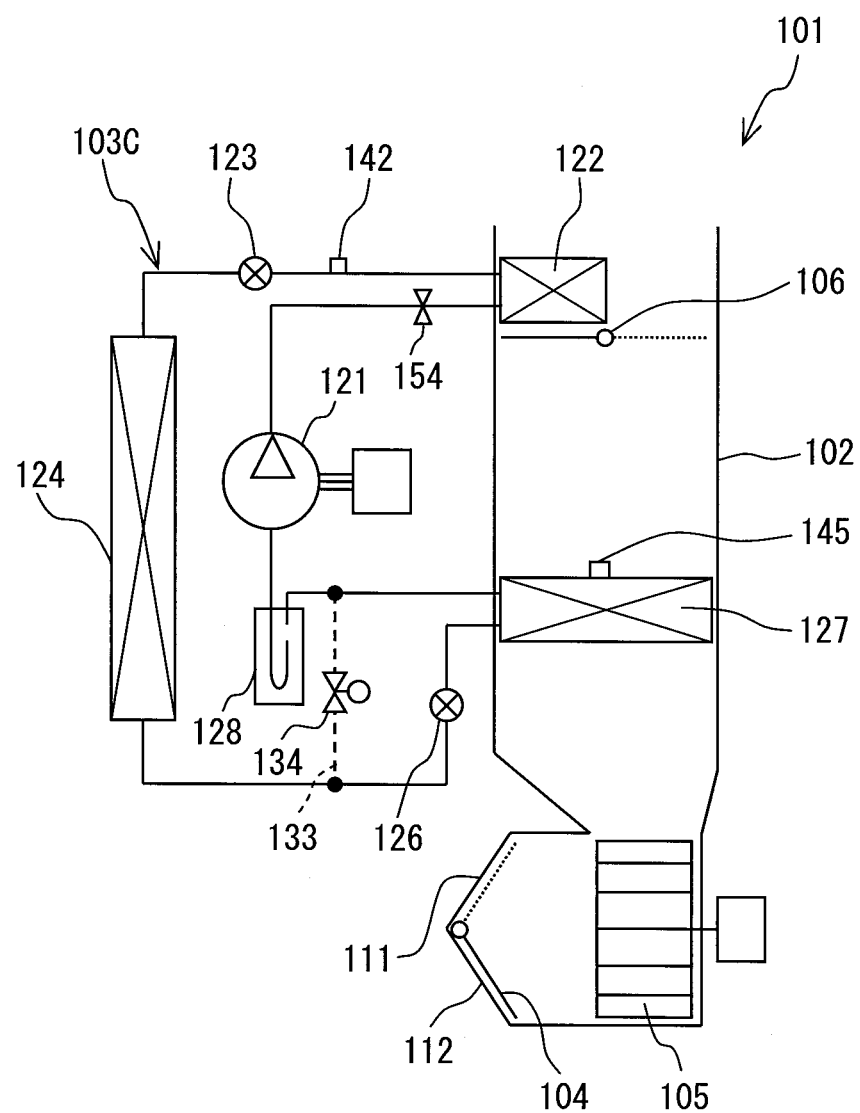
FIG. 42 is a schematic diagram to show the vehicular air conditioner at the time of a cooling operation in the another embodiment.
Figure 43:
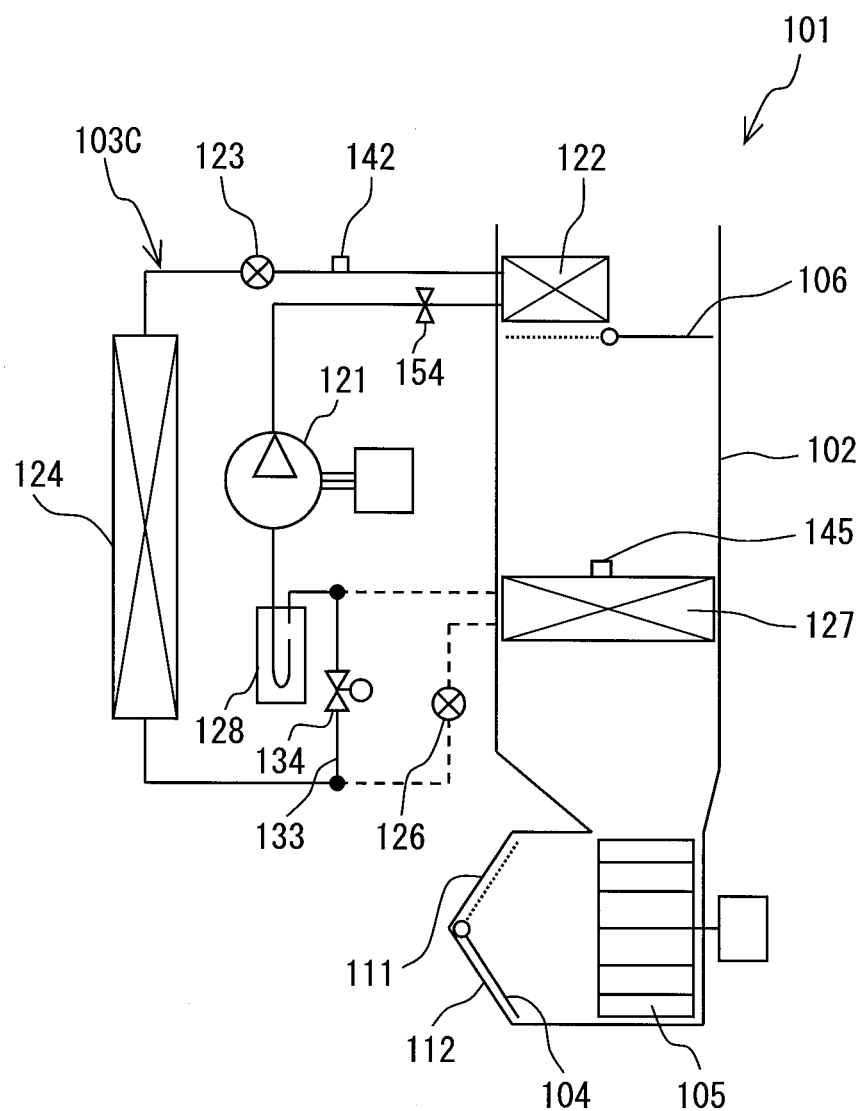
FIG. 43 is a schematic diagram to show the vehicular air conditioner at the time of a heating operation in the another embodiment.
Figure 44:
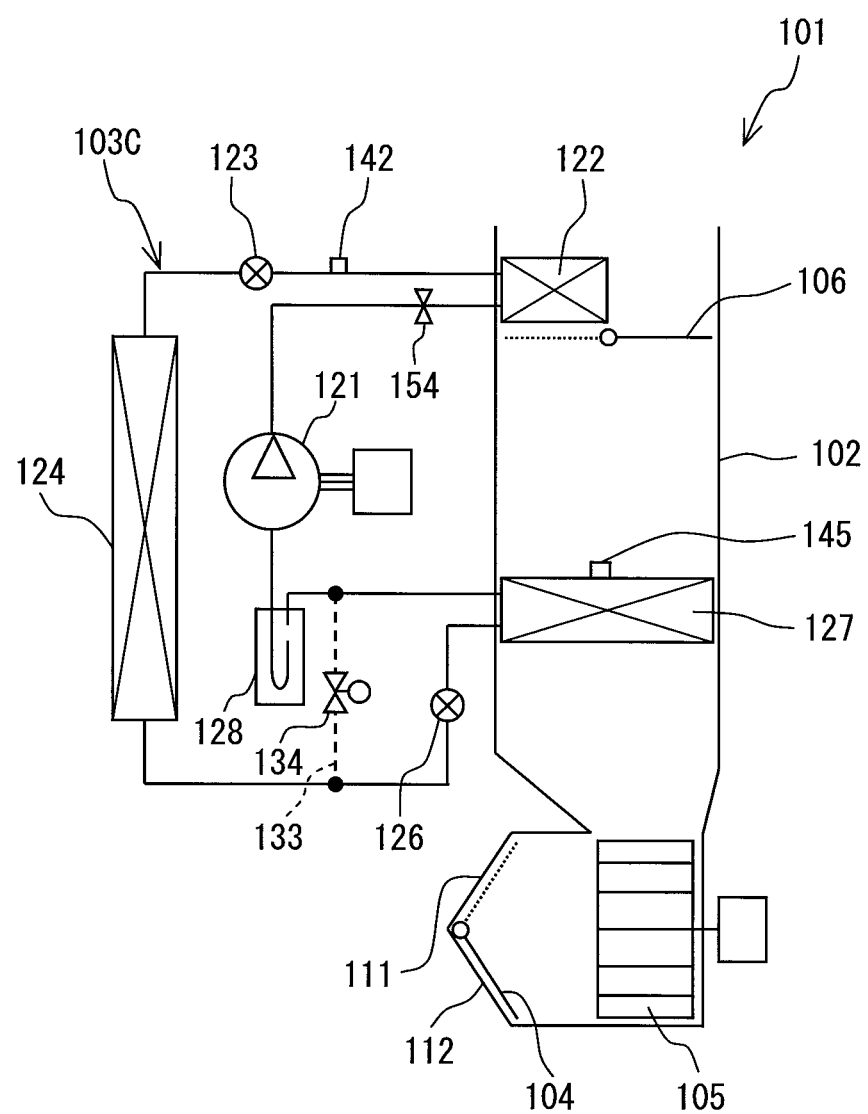
FIG. 44 is a schematic diagram to show the vehicular air conditioner at the time of a dehumidifying and heating operation in the another embodiment.

Modified embodiments will be described by the use of FIG. 41 to FIG. 46. FIG. 41 is a schematic view to show a general construction of a vehicular air conditioner using a refrigerant cycle 103c.

The vehicular air conditioner of the present embodiment illustrated in FIG. 41 is provided with an air-conditioning unit 101 for air-conditioning the interior of the vehicle compartment of an automobile or the like. The air-conditioning unit 101 includes: an air duct 102 (corresponding to a duct) for forming an air passage to guide air-conditioned air into the vehicle compartment of the automobile; a centrifugal blower 105 for generating an air flow toward the interior of the vehicle compartment in the air duct 102; an evaporator 127 for cooling the air flowing in the air duct 102; and a refrigerant cycle 103c (corresponding to a refrigerant cycle device) having a condenser 122 (corresponding to a refrigerant radiator) for reheating the air passing through the evaporator 127.

As shown in FIG. 41, the refrigerant cycle 103c of the present embodiment is provided with a discharge refrigerant throttle valve 154 for reducing the pressure of the refrigerant discharged from the compressor 121 and flowing into the condenser 122. The discharge refrigerant throttle valve 154 is a pressure reducing device for reducing the pressure of the refrigerant discharged from the compressor 121 according to a valve opening, and an electric expansion valve whose valve opening is electrically controlled by the ECU 110 is used for the discharge refrigerant throttle valve 154. Further, a fully open mode for fully opening a valve opening by the control of the ECU 110 can be set to the discharge refrigerant throttle valve 154. The discharge refrigerant throttle valve 154 is provided, specifically, in the refrigerant piping for coupling the refrigerant outlet of the compressor 121 to the refrigerant inlet of the condenser 122.

The ECU 110 of a control part for controlling respective air-conditioning parts (actuator and the like) in the air-conditioning unit 101, as in the case of the 12th embodiment, performs a control processing according to a control flow shown in FIG. 27.

Figure 45:
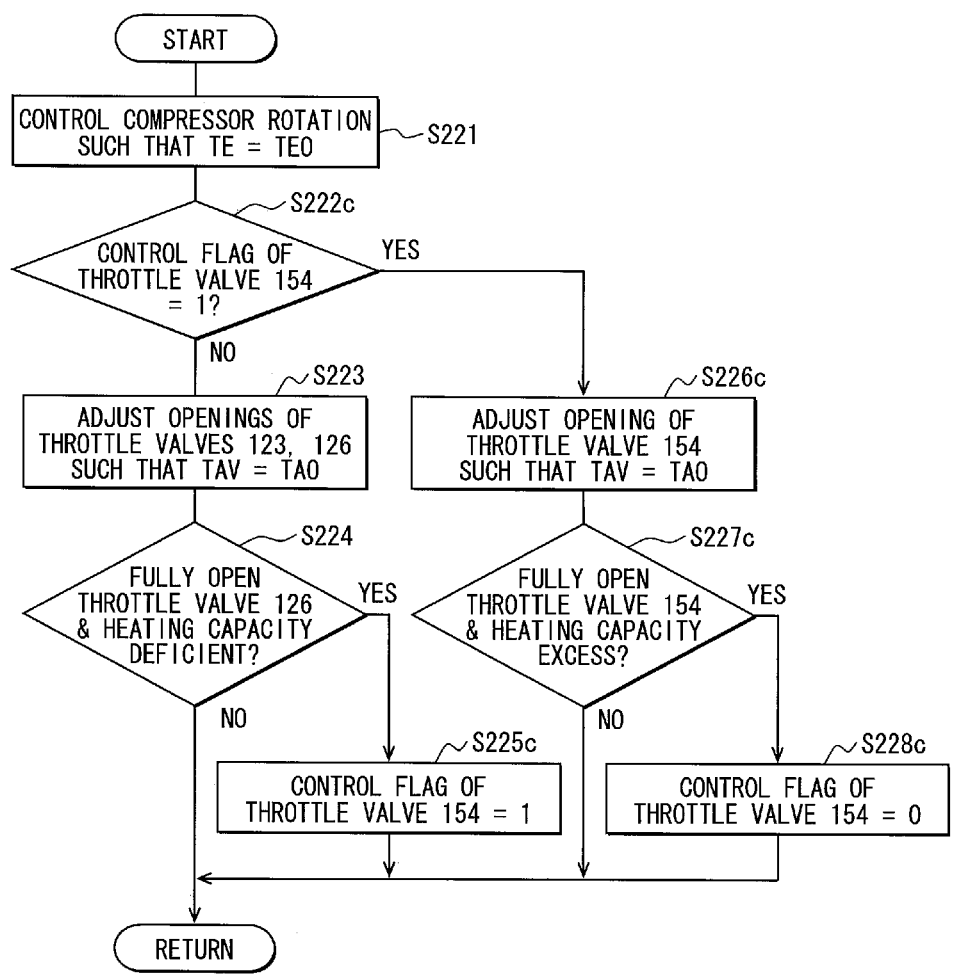
FIG. 45 is a flow chart to show a flow of control of step S220 of FIG. 27 in the another embodiment.

In the present embodiment, when step S220 shown in FIG. 27 is executed, as shown in FIG. 45, first, the rotation control (that is, the control of the amount of discharge of the refrigerant) of the compressor 121 is performed in such a way that the evaporator temperature TE detected by the evaporator temperature sensor 145 becomes equal (as close as possible) to the target evaporator temperature TEO calculated in step S180 (step S221).

After step S221 is executed, next, it is determined whether or not the control flag of the discharge refrigerant throttle valve 154 is set at 1 (step S222c). That the control flag of the discharge refrigerant throttle valve 154 is set at 1 means that the discharge refrigerant throttle valve 154 is set to an opening of throttling the amount of flow of the refrigerant flowing though the discharge refrigerant throttle valve 154 in such a way that the condenser temperature TAV obtained (calculated) on the basis of the refrigerant pressure detected by the refrigerant pressure sensor 142 becomes equal (as close as possible) to the target blowoff temperature TAO. On the other hand, that the control flag of the discharge refrigerant throttle valve 154 is set at 0 means that the discharge refrigerant throttle valve 154 is fixedly set to a full opening and hence does not throttle the amount of flow of the refrigerant flowing though the discharge refrigerant throttle valve 154.

In the case where it is determined in step S222c that the control flag of the discharge refrigerant throttle valve 154 is not set at 1, that is, the control flag is set at 0, the opening of the heating variable throttle valve 123 and the opening of the cooling variable throttle valve 126 are adjusted in such a way that the condenser temperature TAV obtained on the basis of the refrigerant pressure detected by the refrigerant pressure sensor 142 becomes equal (as close as possible) to the target blowoff temperature TAO (step S223).

As the result of the execution of step S223, the cooling variable throttle valve 126 is opened, thereby reaching a fully opened state. It is determined whether or not even if the cooling variable throttle valve 126 is put into the fully opened state, a heating capacity in the condenser 122 is deficient (step S224). In step S224, it is determined whether or not even if step S223 is executed to control the opening of the heating variable throttle valve 123 and the opening of the cooling variable throttle valve 126 in such a way as to make the condenser temperature TAV equal to the target blowoff temperature TAO, the condenser temperature TAV cannot be increased to the target blowoff temperature TAO and the heating capacity is deficient as shown in FIG. 33.

In the case where it is determined in step S224 that even if the cooling variable throttle valve 126 is not put into the fully opened state, the heating capacity in the condenser 122 is not deficient, or that if the cooling variable throttle valve 126 is put into the fully opened state, the heating capacity in the condenser 122 is not deficient, the control flag of the discharge refrigerant throttle valve 154 is held set at 0 and the control processing is returned (proceeds to step S230 shown in FIG. 27).

In the case where it is determined in step S224 that even if the cooling variable throttle valve 126 is put into the fully opened state, the heating capacity in the condenser 122 is deficient, that is, even if the outdoor heat exchanger 124 is made to function as an evaporator (heat absorbing device) that is nearly equal in the refrigerant pressure to the evaporator 127, the heating capacity in the condenser 122 is deficient, the control flag of the discharge refrigerant throttle valve 154 is set at 1 (step S225c) and the control processing is returned (proceeds to step S230 shown in FIG. 27).

In the case where it is determined in step S222c that the control flag of the discharge refrigerant throttle valve 154 is set at 1, the opening of the discharge refrigerant throttle valve 154 is adjusted in such a way that the condenser temperature TAV becomes equal (as close as possible) to the target blowoff temperature TAO (step S226c).

As the result of the execution of step S226c, the discharge refrigerant throttle valve 154 is opened, thereby reaching a fully opened state. It is determined whether or not even if the discharge refrigerant throttle valve 154 is put into the fully opened state, the heating capacity in the condenser 122 is excess (step S227c). In step S227c, it is determined whether or not even if step S226c is executed to control the opening of the discharge refrigerant throttle valve 154 in such a way as to make the condenser temperature TAV equal to the target blowoff temperature TAO, the condenser temperature TAV cannot be decreased to the target blowoff temperature TAO and the heating capacity is deficient as shown in FIG. 33.

In the case where it is determined in step S227c that even if the discharge refrigerant throttle valve 154 is not put into the fully opened state, the heating capacity in the condenser 122 does not become excess, or that if the discharge refrigerant throttle valve 154 is put into the fully opened state, the heating capacity in the condenser 122 does not become excess, the control flag of the discharge refrigerant throttle valve 154 is held set at 1 and the control processing is returned (proceeds to step S230 shown in FIG. 27).

In the case where it is determined in step S227c that even if the discharge refrigerant throttle valve 154 is put into the fully opened state, the heating capacity in the condenser 122 is excess, the control flag of the discharge refrigerant throttle valve 154 is set at 0 (step S228c) and the control processing is returned (proceeds to step S230 shown in FIG. 27).

According to the construction and the action described above, when the cooling operation of step S200 is set by the determination of step S190 shown in FIG. 27, the heating variable throttle valve 123 is set to the fully open mode and the heating electromagnetic valve 134 is closed and the cooling variable throttle valve 126 is set to a flow control opening of reducing the pressure of the refrigerant to expand the refrigerant (that is, a pressure-reducing and expanding mode). In this way, the refrigerant is circulated as shown by the solid line in FIG. 42 and hence the operation mode of the refrigerant cycle 103c is put into the cooling operation mode. Here, at the time of cooling operation mode, the discharge refrigerant throttle valve 154 is put into a fully open mode. Further, the air mixing door 106 closes the air inlet portion of the condenser 122, whereby the condensation of the refrigerant in the condenser 122 is inhibited.

In this way, the air passing in the air duct 102 is cooled by the evaporator 127 and is blown off into the vehicle compartment. The amount of heat absorbed by the evaporator 127 and the amount of heat of an increase in enthalpy caused by the adiabatic compression of the refrigerant by the compressor 121 are radiated to the outdoor air by the outdoor heat exchanger 124.

When the heating operation of the step S210 is set by the determination of step S190, the heating variable throttle valve 123 is put into a flow control opening of reducing the pressure of the refrigerant to expand the refrigerant (that is, a pressure-reducing and expanding mode) and the heating electromagnetic valve 134 is opened and the cooling variable throttle valve 126 is put to a fully closed mode. In this way, the refrigerant is circulated as shown by the solid line in FIG. 43 and the operation mode of the refrigerant cycle 103c is put to the heating operation mode. In this regard, at the time of the heating operation mode, the air mixing door 106 opens the air inlet portion of the condenser 122, whereby the air of an external fluid is heated by the condensation of the refrigerant in the condenser 122.

In this way, the air passing in the air duct 102 is heated by the condenser 122 and is blown off into the vehicle compartment. The amount of heat radiated to the air in the condenser 122 is compensated by the amount of heat absorbed from the outdoor air in the outdoor heat exchanger 124 and the amount of heat of an increase in enthalpy caused by the adiabatic compression of the refrigerant by the compressor 121.

When the dehumidifying and heating operation of the step S220 is set by the determination of step S190, the heating variable throttle valve 123 is put to a flow control opening of reducing the pressure of the refrigerant to expand the refrigerant (that is, a pressure-reducing and expanding mode) and the heating electromagnetic valve 134 is closed. In this way, the refrigerant is circulated as shown by the solid line in FIG. 44 and the operation mode of the refrigerant cycle 103c is put to the dehumidifying and heating operation mode. In this regard, at the time of the dehumidifying and heating operation mode, in the case where an air heating capacity in the condenser 122 can be small, the cooling variable throttle valve 126 is put to a flow control opening of reducing the pressure of the refrigerant to expand the refrigerant (that is, a pressure-reducing and expanding mode) and the discharge refrigerant throttle valve 154 is put to a fully open mode.

In contrast to this, in the case where the air heating capacity in the condenser 122 is increased, the cooling variable throttle valve 126 is put to a fully open mode and the discharge refrigerant throttle valve 154 is put to a flow control opening of reducing the pressure of the refrigerant to expand the refrigerant (that is, a pressure-reducing and expanding mode). Further, in any case, the air mixing door 106 opens the air inlet portion of the condenser 122. In this way, the air, which is cooled by the evaporator 127 and is dehumidified because water vapor included is condensed and removed, is reheated by the condensation of the refrigerant in the condenser 122 and is blown off into the vehicle compartment.

The amount of heat absorbed from the air passing in the air duct 102 in the evaporator 127 and the amount of heat of an increase in enthalpy caused by the adiabatic compression of the refrigerant by the compressor 121 (the amount of heat increased by the compression power) are radiated to the air passing in the air duct 102 by the condenser 122. The difference between the total sum of the amount of heat absorbed in the evaporator 127 and the amount of heat of an increase in enthalpy by the compressor 121 and the amount of heat radiated in the condenser 122 is compensated by the amount of heat absorbed or the amount of heat radiated in the outdoor heat exchanger 124.

The refrigerant cycle 103c of the present embodiment is provided with the discharge refrigerant throttle valve 154 which reduces the pressure of the refrigerant discharged from the compressor 121 and flowing into the condenser 122 and which can vary the amount of pressure reduction of the refrigerant. In the case where the total sum of the amount of heat absorbed in the evaporator 127, the amount of heat absorbed in the outdoor heat exchanger 124, and the amount of heat of an increase in enthalpy by the compressor 121 is deficient for the amount of heat radiated in the condenser 122, the compressor 121 increases the amount of work of adiabatically compressing the refrigerant to increase the amount of heat of an increase in enthalpy by the compressor 121 and the refrigerant discharged from the compressor 121 is reduced in pressure by the discharge refrigerant throttle valve 154 and is fed into the condenser 122. In this way, the amount of heat that is deficient for the amount of heat radiated in the condenser 122 can be ensured.

As described by the use of FIG. 45, the ECU 110 controls the amount of discharge of the refrigerant of the compressor 121 in such a way that the value of the evaporator temperature TE of a physical amount related to the heat absorbing capacity of the evaporator 127 becomes equal to the target evaporator temperature TEO of a heat-absorption target value, and the ECU 110 controls the amount of pressure reduction of the refrigerant of the discharge refrigerant throttle valve 154 in such a way that the value of the condenser temperature TAV of a physical amount related to the heating capacity of the condenser 122 becomes equal to the target blowoff temperature TAO of a heating target value.

In this way, the amount of discharge of the refrigerant of the compressor 121 and the amount of pressure reduction of the refrigerant of the discharge refrigerant throttle valve 154 can be controlled in such a way that even if the evaporator temperature TE is made equal to, for example, the target evaporator temperature TEO (for example, 1° C.) having a limitation for preventing the evaporator 127 from being frosted, the temperature TAV of the condenser 122 becomes equal to the target blowoff temperature TAO capable of sufficiently heating the air passing through the air duct 102.

Figure 46:
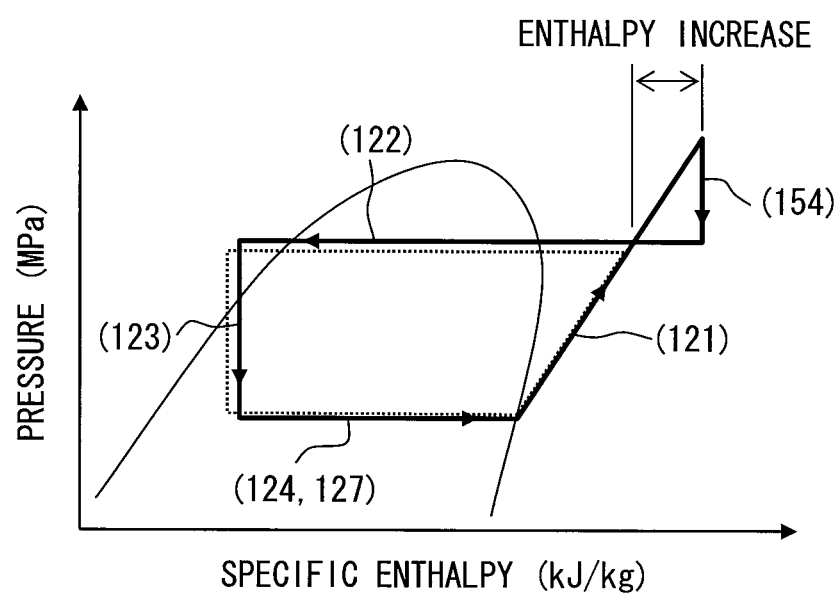
FIG. 46 is a Mollier diagram to illustrate an effect of enhancing a heating capacity in a condenser in the another embodiment.

In other words, the amount of flow of refrigerant circulated in the refrigerant cycle is determined by a limitation of the heat absorbing capacity of the evaporator 127, and in the case where even if the cooling variable throttle valve 126 is fully opened and the heat absorbing capacity of the outdoor heat exchanger 124 is maximized, the heating capacity in the condenser 122 is deficient, a cycle state shown by solid lines in a pressure vs. enthalpy diagram in FIG. 46 can be formed.

Specifically, the amount of work of adiabatic compression of the refrigerant by the compressor 121 is increased to increase a discharge pressure and the increased discharge pressure is decreased isentropically by the discharge refrigerant throttle valve 154, whereby the enthalpy of the refrigerant flowing into the condenser 122 can be increased.

A cycle shown by broken lines in a pressure vs. enthalpy diagram in FIG. 46 is a comparative example which is not provided with the discharge refrigerant throttle valve 154 and in which the amount of work of adiabatic compression of the refrigerant by the compressor 121 cannot be increased.

According to the refrigerant cycle 103c of the present embodiment, even in the case where even if the heat absorbing capacity of the outdoor heat exchanger 124 is maximized, the heating capacity in the condenser 122 is deficient, when the amount of work of compressing and discharging the refrigerant by the compressor 121 is increased to increase the discharge pressure and the increased refrigerant pressure is reduced by the discharge refrigerant throttle valve 154, the value of the condenser temperature TAV of a physical amount related to the heating capacity of the condenser 122 can be made equal to the target blowoff temperature TAO of a heating target value capable of sufficiently heating the air passing in the air duct 102. In this way, even if there is a limit to the heat absorbing capacity of the evaporator 127, a sufficient capacity of heating an external fluid can be obtained in the condenser 122.

Further, both of the adjustment of the amount of discharge of the refrigerant of the compressor 121 such that the evaporator temperature TE is made equal to the target evaporator temperature TEO and the adjustment of the amount of pressure reduction of the refrigerant of the discharge refrigerant throttle valve 154 such that the condenser temperature TAV is made equal to the target blowoff temperature TAO are performed by the ECU 110 of the control part. Thus, the adjustment accuracy of the amount of discharge of the refrigerant of the compressor 121 and the adjustment accuracy of the amount of pressure reduction of the refrigerant of the suction refrigerant throttle valve 150 can be easily ensured.

Next, an embodiment will be described on the basis of FIG. 47. As compared with the embodiment described above, in the present embodiment, the ECU 110 controls the amount of discharge of the refrigerant of the compressor 121 in such a way that the value of condenser temperature TAV of a physical amount related to the heating capacity of the condenser 122 becomes equal to the target blowoff temperature TAO of a heating target value. Further, the ECU 110 controls the amount of pressure reduction of the refrigerant of the discharge refrigerant throttle valve 154 in such a way that the value of the evaporator temperature TE of a physical amount related to the heat absorbing capacity of the evaporator 127 becomes equal to the target evaporator temperature TEO of a heat-absorption target value.

Figure 47:
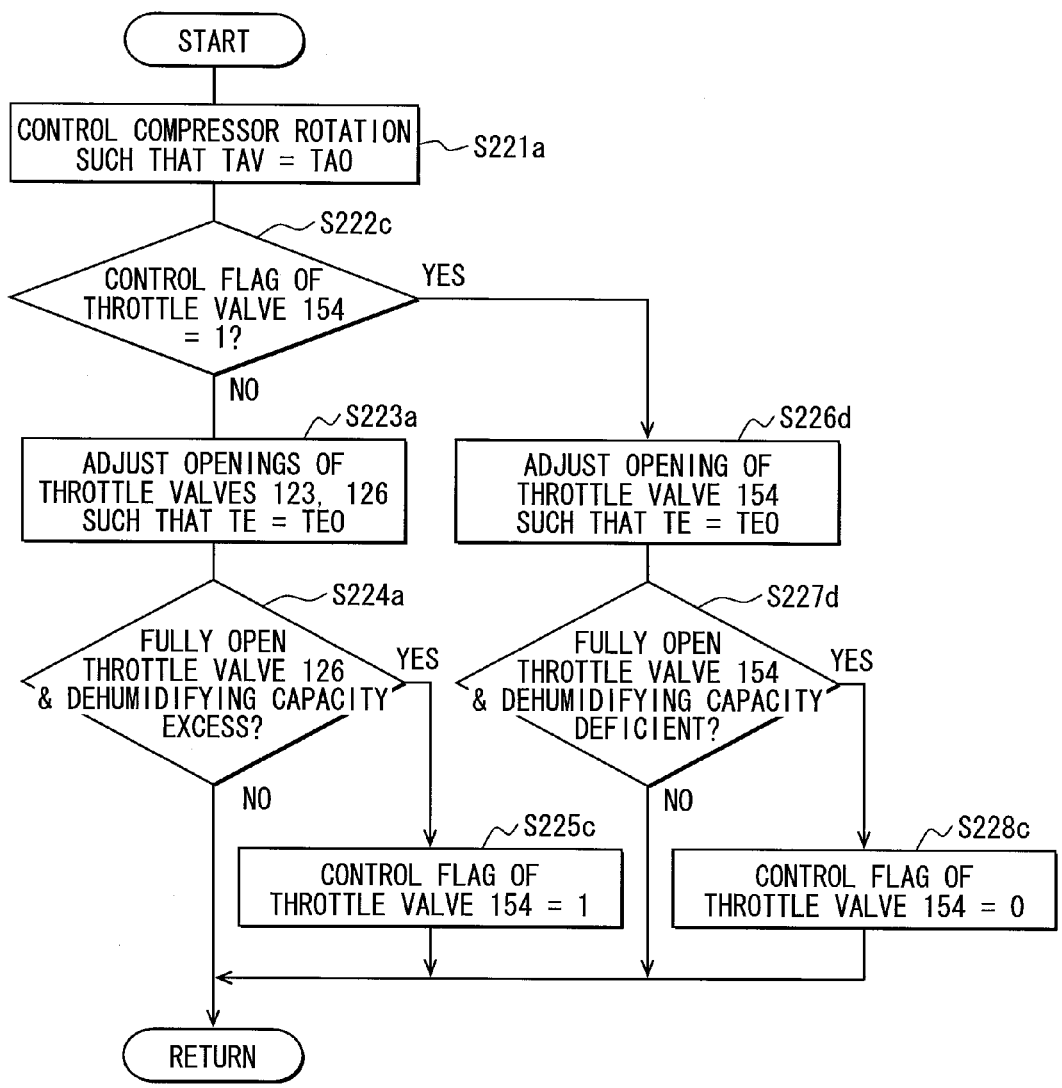
FIG. 47 is a flow chart to show a flow of control of step S220 of FIG. 27 in the another embodiment.

As shown in FIG. 47, in the present embodiment, when step S220 shown in FIG. 27 is executed, first, the rotation control of the compressor 121 (that is, the control of the amount of discharge of the refrigerant) is performed in such a way that the condenser temperature TAV obtained on the basis of the refrigerant pressure detected by the refrigerant pressure sensor 142 becomes equal (as close as possible) to the target blowoff temperature TAO (step S221a).

After step S221a is executed, next, it is determined whether or not the control flag of the discharge refrigerant throttle valve 154 is set at 1 (step S222c). That the control flag of the discharge refrigerant throttle valve 154 is set at 1 means that the discharge refrigerant throttle valve 154 is set to an opening of throttling the amount of flow of the refrigerant flowing though the discharge refrigerant throttle valve 154 in such a way that the evaporator temperature TE detected by the evaporator temperature sensor 145 becomes equal (as close as possible) to the target evaporator temperature TEO calculated in step S180. On the other hand, that the control flag of the discharge refrigerant throttle valve 154 is set at 0 means that the discharge refrigerant throttle valve 154 is fixedly set to a full opening and hence does not throttle the amount of flow of the refrigerant flowing though the discharge refrigerant throttle valve 154.

In the case where it is determined in step S222c that the control flag of the discharge refrigerant throttle valve 154 is not set at 1, that is, the control flag is set at 0, the opening of the heating variable throttle valve 123 and the opening of the cooling variable throttle valve 126 are adjusted in such a way that the evaporator temperature TE detected by the evaporator temperature sensor 145 becomes equal (as close as possible) to the target evaporator temperature TEO calculated in step S180 (step S223a).

As the result of the execution of step S223a, the cooling variable throttle valve 126 is opened, thereby reaching a fully opened state. It is determined whether or not even if the cooling variable throttle valve 126 is put into the fully opened state, a dehumidifying capacity (heat absorbing capacity) in the evaporator 127 is excess (step S224a). In step S224a, it is determined whether or not even if step S223a is executed to control the opening of the heating variable throttle valve 123 and the opening of the cooling variable throttle valve 126 in such a way as that the evaporator temperature TE becomes equal to the target evaporator temperature TEO, the evaporator temperature TE cannot be increased to the target evaporator temperature TEO and the dehumidifying capacity is excess as shown in FIG. 36.

In the case where it is determined in step S224a that even if the cooling variable throttle valve 126 is not put into the fully opened state, the dehumidifying capacity in the evaporator 127 is not excess, or that if the cooling variable throttle valve 126 is put into the fully opened state, the dehumidifying capacity in the evaporator 127 is not excess, the control flag of the discharge refrigerant throttle valve 154 is held set at 0 and the control processing is returned (proceeds to step S230 shown in FIG. 27).

In the case where it is determined in step S224a that even if the cooling variable throttle valve 126 is put into the fully opened state, the dehumidifying capacity in the evaporator 127 is excess, that is, even if the outdoor heat exchanger 124 is made to function as an evaporator (heat absorbing device) that is nearly equal in the refrigerant pressure to the evaporator 127, the dehumidifying capacity in the evaporator 127 is excess, the control flag of the discharge refrigerant throttle valve 154 is set at 1 (step S225c) and the control processing is returned (proceeds to step S230 shown in FIG. 27).

In the case where it is determined in step S222c that the control flag of the discharge refrigerant throttle valve 154 is set at 1, the opening of the discharge refrigerant throttle valve 154 is adjusted in such a way that the evaporator temperature TE becomes equal (as close as possible) to the target evaporator temperature TEO (step S226d).

As the result of the execution of step S226d, the discharge refrigerant throttle valve 154 is opened, thereby reaching a fully opened state. It is determined whether or not even if the discharge refrigerant throttle valve 154 is put into the fully opened state, the dehumidifying capacity in the evaporator 127 is deficient (step S227d). In step S227d, it is determined whether or not even if step S226d is executed to control the opening of the refrigerant throttle valve 154 in such a way that the evaporator temperature TE becomes equal to the target evaporator temperature TEO, the evaporator temperature TE cannot be decreased to the target evaporator temperature TEO and the dehumidifying capacity is deficient as shown in FIG. 36.

In the case where it is determined in step S227d that even if the discharge refrigerant throttle valve 154 is not put into the fully opened state, the dehumidifying capacity in the evaporator 127 is not deficient, or that if the discharge refrigerant throttle valve 154 is put into the fully opened state, the dehumidifying capacity in the evaporator 127 is not deficient, the control flag of the discharge refrigerant throttle valve 154 is held set at 1 and the control processing is returned (proceeds to step S230 shown in FIG. 27).

In the case where it is determined in step S227d that even if the discharge refrigerant throttle valve 154 is put into the fully opened state, the dehumidifying capacity in the evaporator 127 is deficient, the control flag of the discharge refrigerant throttle valve 154 is set at 0 (step S228c) and the control processing is returned (proceeds to step S230 shown in FIG. 27).

According to the construction and the action of the present embodiment, the ECU 110 controls the amount of discharge of the refrigerant of the compressor 121 in such a way that the value of the condenser temperature TAV of a physical amount related to the heating capacity of the condenser 122 becomes equal to the target blowoff temperature TAO of a heating target value, and the ECU 110 controls the amount of pressure reduction of the refrigerant of the discharge refrigerant throttle valve 154 in such a way that the value of the evaporator temperature TE of a physical amount related to the heat absorbing capacity of the evaporator 127 becomes equal to the target evaporator temperature TEO of a heat-absorption target value.

Also in this embodiment, as in the case of the embodiment described above, the amount of discharge of the refrigerant of the compressor 121 and the amount of pressure reduction of the refrigerant of the discharge refrigerant throttle valve 154 can be controlled in such a way that even if the evaporator temperature TE is made equal to, for example, the target evaporator temperature TEO having a limitation for preventing the evaporator 127 from being frosted, the temperature TAV of the condenser 122 becomes equal to the target blowoff temperature TAO capable of sufficiently heating the air passing through the air duct 102.

The amount of flow of refrigerant circulated in the refrigerant cycle is determined by a limitation of the heat absorbing capacity of the evaporator 127, and in the case where even if the cooling variable throttle valve 126 is fully opened and the heat absorbing capacity of the outdoor heat exchanger 124 is maximized, the heating capacity in the condenser 122 is deficient, a cycle state shown by solid lines in a pressure vs. enthalpy diagram in FIG. 46 can be formed, and hence the same effects as in the embodiment described above can be produced.

It can be said that the refrigerant cycle 103c of the two embodiments described here is a refrigerant cycle device having the following features.

The refrigerant cycle 103c includes: a compressor for sucking, compressing, and discharging a refrigerant (to which the compressor 121 corresponds); a refrigerant radiator for radiating heat of the refrigerant discharged from the compressor to heat an external fluid (to which the condenser 122 corresponds); a first pressure reducing part for reducing the pressure of the refrigerant flowing out of the refrigerant radiator to expand the refrigerant (to which the heating variable throttle valve 123 corresponds); an evaporator for evaporating the refrigerant reduced in pressure by the first pressure reducing part to absorb heat from the external fluid (to which the evaporator 127 corresponds); and a second pressure reducing part that reduces the pressure of the refrigerant discharged from the compressor and flowing into the refrigerant radiator and that can vary the amount of pressure reduction of the refrigerant (to which the discharge refrigerant throttle valve 150 corresponds). One of the amount of discharge of the refrigerant of the compressor and the amount of pressure reduction of the refrigerant of the second pressure reducing part is adjusted in such a way that the heating capacity of the refrigerant radiator or the value of a physical amount related to the heating capacity (to which TAV corresponds) becomes equal to a heating target value (to which TAO corresponds), and the other of the amount of discharge of the refrigerant of the compressor and the amount of pressure reduction of the refrigerant of the second pressure reducing part is adjusted in such a way that the heat absorbing capacity of the evaporator or the value of a physical amount related to the heat absorbing capacity (to which TE corresponds) becomes equal to a heat-absorption target value (to which TEO corresponds).

In this case, the amount of discharge of the refrigerant of the compressor and the amount of pressure reduction of the refrigerant of the second pressure reducing part can be adjusted in such a way that when the heat absorbing capacity of the evaporator or the value of a physical amount related to the heat absorbing capacity is made equal to a heat-absorption target value having a limitation, the heating capacity of the refrigerant radiator or the value of a physical amount related to the heating capacity becomes equal to a heating target value capable of sufficiently heating the external fluid. That is, even in the case of the amount of circulation flow of the refrigerant determined by a limitation of the heat absorbing capacity of the evaporator, when the amount of work of compressing and discharging the refrigerant by the compressor is increased to increase a discharge pressure of the refrigerant and the increased pressure of the refrigerant is isentropically reduced by the second pressure reducing part and the refrigerant is flowed into the refrigerant radiator, the enthalpy of the refrigerant flowing into the refrigerant radiator can be increased as compared with the case where the discharge pressure of the refrigerant is not increased by increasing the amount of work by the compressor and where the increased discharge pressure of the refrigerant is not reduced. In this way, the heating capacity of the refrigerant radiator or the value of a physical amount related to the heating capacity can be made equal to the heating target value capable of sufficiently heating the external fluid. In this way, even if the heat absorbing capacity of the evaporator has a limitation, a sufficient capacity of heating the external fluid can be acquired in the refrigerant radiator.

For this reason, even if the heat absorbing capacity of the evaporator has a limitation, the sufficient capacity of heating an external fluid can be acquired in the heating radiating device also in a plurality of embodiments to be described below by the use of the drawings.

Figure 48:
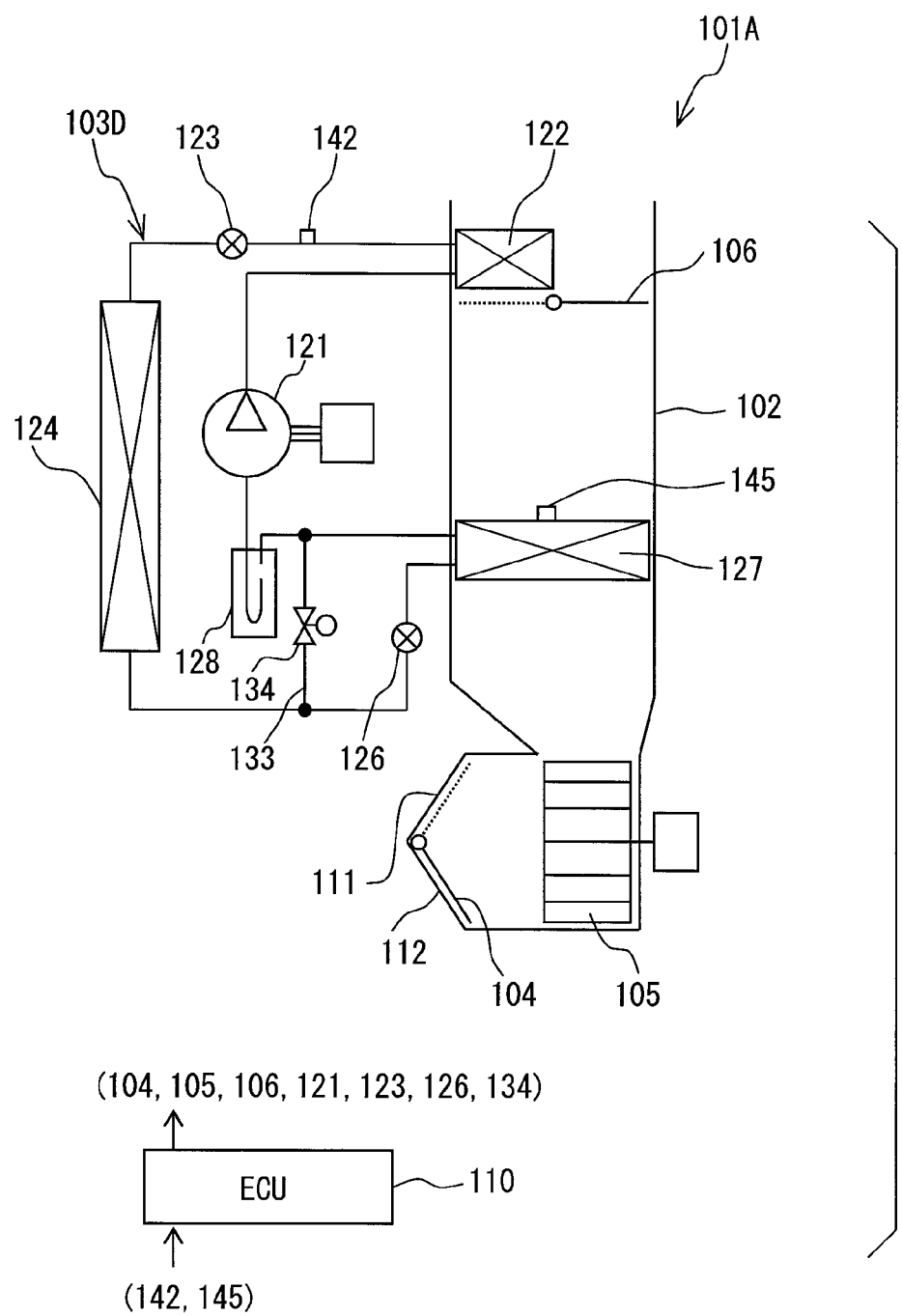
FIG. 48 is a schematic diagram to show a general configuration of a vehicular air conditioner using a refrigerant cycle device in further another embodiment.
Figure 49:
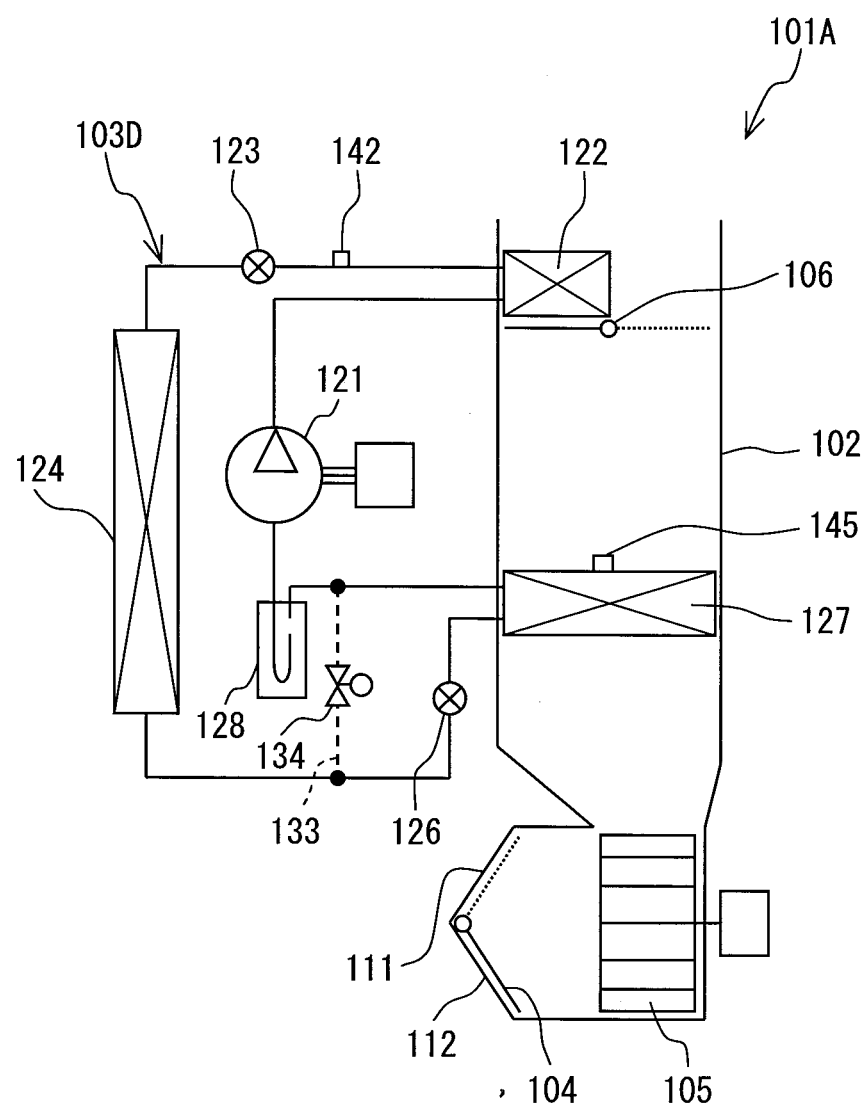
FIG. 49 is a schematic diagram to show the vehicular air conditioner at the time of a cooling operation in further another embodiment.

First, one embodiment will be described by the use of FIG. 48 to FIG. 53. FIG. 48 is a schematic view to show a general construction of a vehicular air conditioner using a refrigerant cycle device 103D.

The vehicular air conditioner of the present embodiment illustrated in FIG. 48 is provided with an air conditioning unit 101A for air-conditioning the interior of a vehicle compartment of an automobile or the like. The air-conditioning unit 101A includes: an air duct 102 (corresponding to a duct) that forms an air passage for introducing air-conditioned wind into the vehicle compartment of an automobile; a centrifugal blower 105 for generating an air flow toward the interior of the vehicle compartment in the air duct 102; an evaporator 127 for cooling air flowing in the air duct 102; and a refrigerant cycle 103D (corresponding to a refrigerant cycle device) having a condenser 122 (corresponding to a refrigerant radiator) for reheating the air after passing through the evaporator 127.

As shown in FIG. 48, the refrigerant cycle 103D of the present embodiment is not provided with the suction refrigerant throttle valve and the discharge refrigerant throttle valve which have been described in the previous embodiments.

The ECU 110 of a control part for controlling respective air-conditioning parts (actuators and the like) in the air-conditioning unit 101A, as in the case of the 12th embodiment described above, may perform a control processing according to the control flow shown in FIG. 27.

Figure 52:
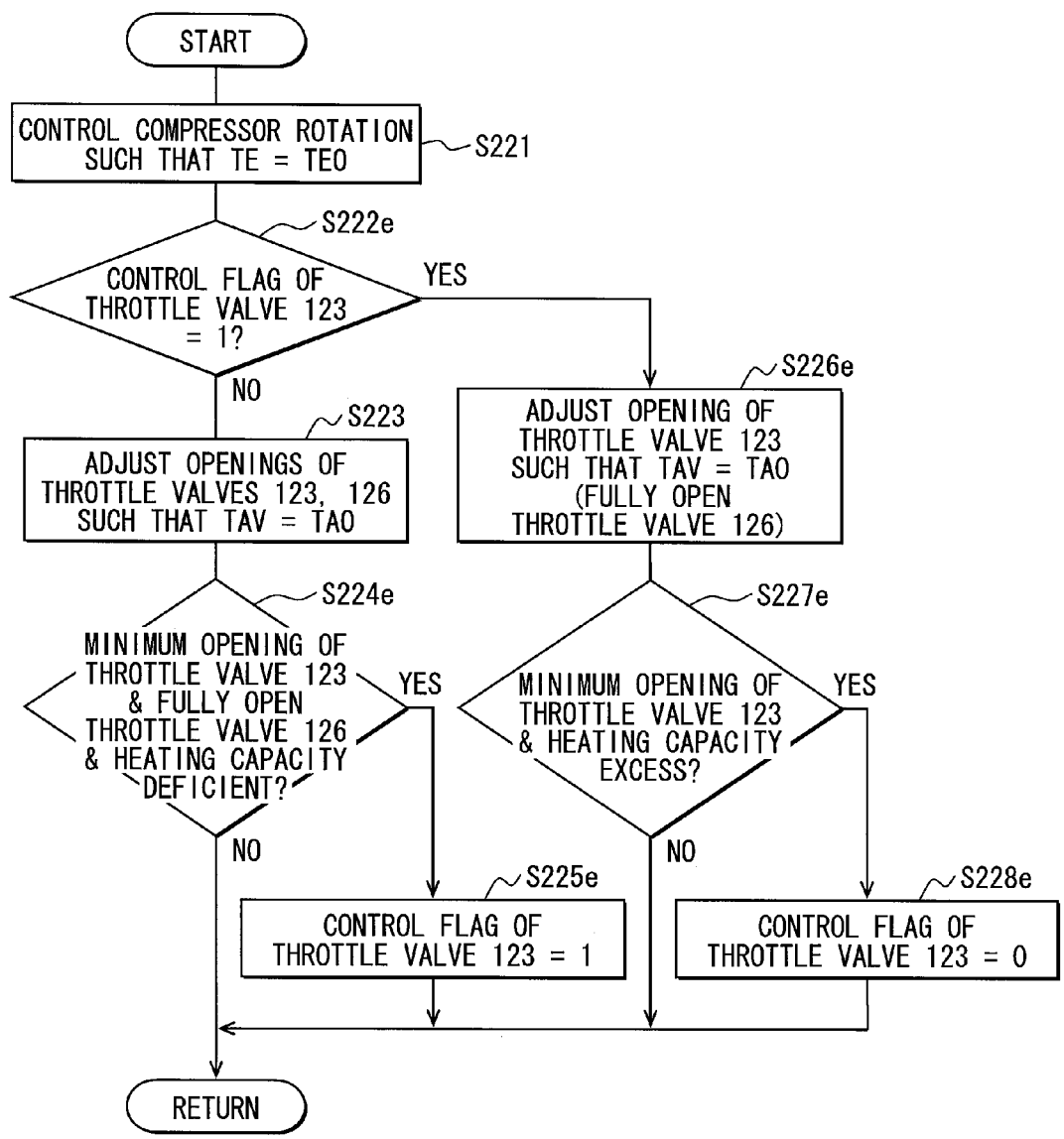
FIG. 52 is a flow chart to show a flow of control of step S220 of FIG. 27 in further another embodiment.

In the present embodiment, when step S220 shown in FIG. 27 is executed, as shown in FIG. 52, first, the rotation control of the compressor 121 (that is, the control of the amount of discharge of the refrigerant) is performed in such a way that the evaporator temperature TE detected by the evaporator temperature sensor 145 becomes equal (as close as possible) to the target evaporator temperature TEO calculated in step S180 (step S221).

After step S221 is executed, next, it is determined whether or not the control flag of the heating variable throttle valve 123 is set at 1 (step S222e). That the control flag of the heating variable throttle valve 123 is set at 1 means that the heating variable throttle valve 123 is set to an opening of increasing the amount of flow of the refrigerant regardless of a cycle efficiency of the refrigerant cycle 103D in such a way that the condenser temperature TAV obtained (calculated) on the basis of the refrigerant pressure detected by the refrigerant pressure sensor 142 becomes equal (as close as possible) to the target blowoff temperature TAO. On the other hand, that the control flag of the heating variable throttle valve 123 is set at 0 means that the heating variable throttle valve 123 is set to an opening of optimizing the cycle efficiency of the refrigerant cycle 103D.

In the case where it is determined in step S222e that the control flag of the heating variable throttle valve 123 is not set at 1, that is, the control flag is set at 0, the opening of the heating variable throttle valve 123 and the opening of the cooling variable throttle valve 126 are adjusted in such a way that the condenser temperature TAV obtained on the basis of the refrigerant pressure detected by the refrigerant pressure sensor 142 becomes equal (as close as possible) to the target blowoff temperature TAO (step S223).

As the result of the execution of step S223, the heating variable throttle valve 123 is throttled and the cooling variable throttle valve 126 is opened, thereby reaching a fully opened state. It is determined whether or not even in the state where the heating variable throttle valve 123 is put to a minimum opening and where the cooling variable throttle valve 126 is put into the fully opened state, a heating capacity in the condenser 122 is deficient (step S224e). In step S224e, it is determined whether or not even if step S223 is executed to control the opening of the heating variable throttle valve 123 and the opening of the cooling variable throttle valve 126 in such a way that the heat absorbing capacity of the outdoor heat exchanger 124 is maximized to make the condenser temperature TAV equal to the target blowoff temperature TAO, the condenser temperature TAV cannot be increased to the target blowoff temperature TAO and the heating capacity is deficient as shown in FIG. 33.

In the case where it is determined in step S224e that even if the heating variable throttle valve 123 is put to the minimum opening and the cooling variable throttle valve 126 is not put into the fully opened state, the heating capacity in the condenser 122 is not deficient, or that if the heating variable throttle valve 123 is put to the minimum opening and the cooling variable throttle valve 126 is put into the fully opened state, the heating capacity in the condenser 122 is not deficient, the control flag of the heating variable throttle valve 123 is held set at 0, and the control processing is returned (proceeds to step S230 shown in FIG. 27).

In the case where it is determined in step S224e that even if the heating variable throttle valve 123 is put to the minimum opening and the cooling variable throttle valve 126 is put into the fully opened state, the heating capacity in the condenser 122 is deficient, that is, that even if the outdoor heat exchanger 124 is made to function as an evaporator (heat absorbing device) that is nearly equal in the refrigerant pressure to the evaporator 127 to thereby maximize the heat absorbing capacity of the outdoor heat exchanger 124, the heating capacity in the condenser 122 is deficient, the control flag of the heating variable throttle valve 123 is set at 1 (step S225e) and the control processing is returned (proceeds to step S230 shown in FIG. 27).

In the case where it is determined in step S222e that the control flag of the heating variable throttle valve 123 is set at 1, the opening of the heating variable throttle valve 123 is adjusted in such a way that the condenser temperature TAV becomes equal (as close as possible) to the target blowoff temperature TAO (step S226e). At this time, the cooling variable throttle valve 126 is put into the fully opened state.

As the result of the execution of step S226e, the opening of the heating variable throttle valve 123 reaches a minimum opening. It is determined whether or not even if the heating variable throttle valve 123 is put into the minimum opening state under condition that the cooling variable throttle valve 126 is put into the fully opened state, the heating capacity in the condenser 122 is excess (step S227e). In step S227e, it is determined whether or not even if step S226e is executed to control the opening of the heating variable throttle valve 123 and the opening of the cooling variable throttle valve 126 in such a way that the condenser temperature TAV becomes equal to the target blowoff temperature TAO, the condenser air temperature TAV cannot be decreased to the target blowoff temperature TAO and the heating capacity is excess as shown in FIG. 33.

In the case where it is determined in step S227e that even if the heating variable throttle valve 123 is not put to the minimum opening, the heating capacity in the condenser 122 does not become excess, or that if the heating variable throttle valve 123 is put to the minimum opening, the heating capacity in the condenser 122 does not become excess, the control flag of the heating variable throttle valve 123 is held set at 1 and the control processing is returned (proceeds to step S230 shown in FIG. 27).

In the case where it is determined in step S227e that even if the heating variable throttle valve 123 is put to the minimum opening, the heating capacity in the condenser 122 is excess, the control flag of the heating variable throttle valve 123 is set at 0 (step S228e) and the control processing is returned (proceeds to step S230 shown in FIG. 27).

According to the construction and the action described above, when the cooling operation in step S200 is set by the determination in step S190 shown in FIG. 27, the heating variable throttle valve 123 is put into the fully open mode and the heating electromagnetic valve 134 is closed and the cooling variable throttle valve 126 is put to a flow control opening of reducing the pressure of the refrigerant to expand the refrigerant (pressure-reducing and expanding mode). In this way, the refrigerant is circulated as shown by solid lines in FIG. 49 and the operation mode of the refrigerant cycle 103D becomes the cooling operation mode. Here, at the time of the cooling operation mode, the air mixing door 106 closes the air inlet portion of the condenser 122, whereby the condensation of the refrigerant in the condenser 122 is inhibited.

In this way, the air passing in the air duct 102 is cooled in the evaporator and is blown off into the vehicle compartment. The amount of heat absorbed in the evaporator 127 and the amount of heat of an increase in enthalpy by the adiabatic compression of the refrigerant of the compressor 121 are radiated to the outdoor air by the outdoor heat exchanger 124.

Figure 50:
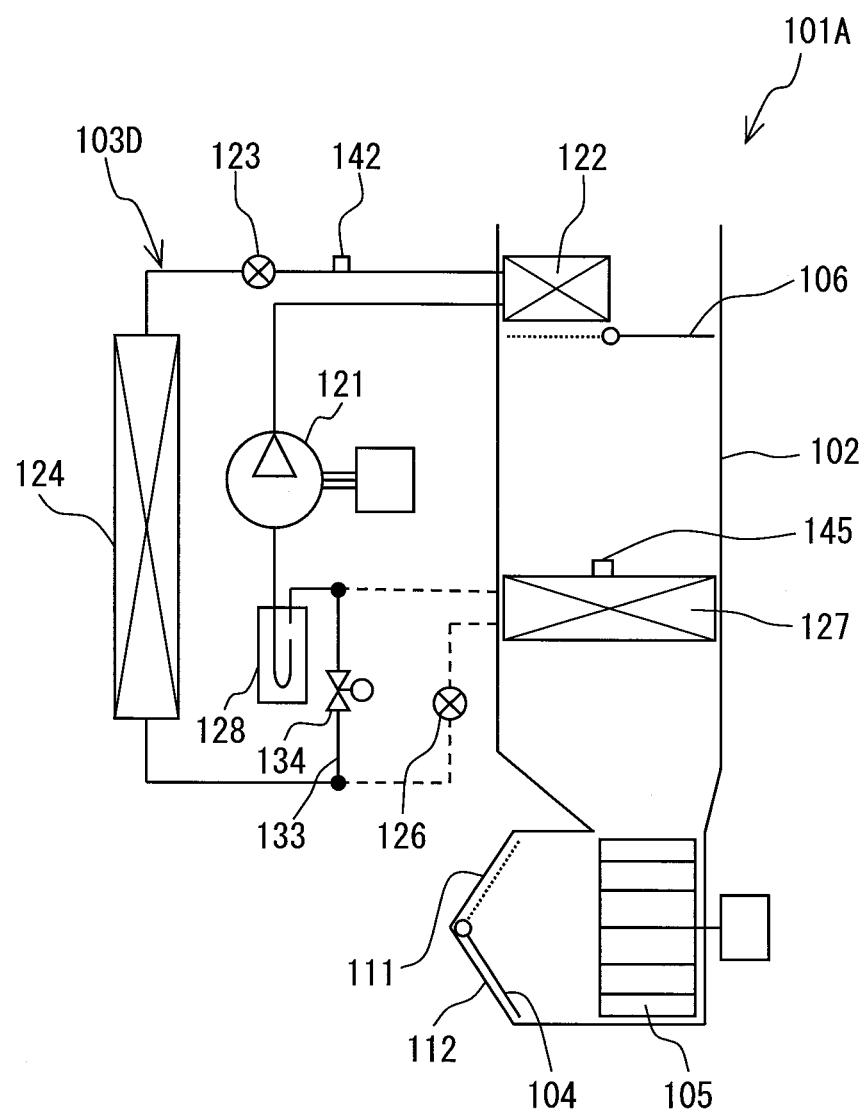
FIG. 50 is a schematic diagram to show the vehicular air conditioner at the time of a heating operation in further another embodiment.

When the heating operation of step S210 is set by the determination in step S190, the heating variable throttle valve 123 is put to a flow control opening of reducing the pressure of the refrigerant to expand the refrigerant (pressure-reducing and expanding mode) and the heating electromagnetic valve 134 is opened and the cooling variable throttle valve 126 is put into the fully closed mode, whereby the refrigerant is circulated as shown by solid line in FIG. 50 and the operation mode of the refrigerant cycle 103D is put into the heating operation mode. In this regard, at the time of the heating operation mode, the air mixing door 106 opens the air inlet portion of the condenser 122, whereby the air of an external fluid is heated by the condensation of the refrigerant in the condenser 122.

In this way, the air passing in the air duct 102 is heated in the condenser 122 and is blown off into the vehicle compartment. The amount of heat radiated to the air in the condenser 122 is compensated by the amount of heat absorbed from the air in the outdoor heat exchanger 124 and the amount of heat of an increase in enthalpy by the adiabatic compression of the refrigerant of the compressor 121.

Figure 51:
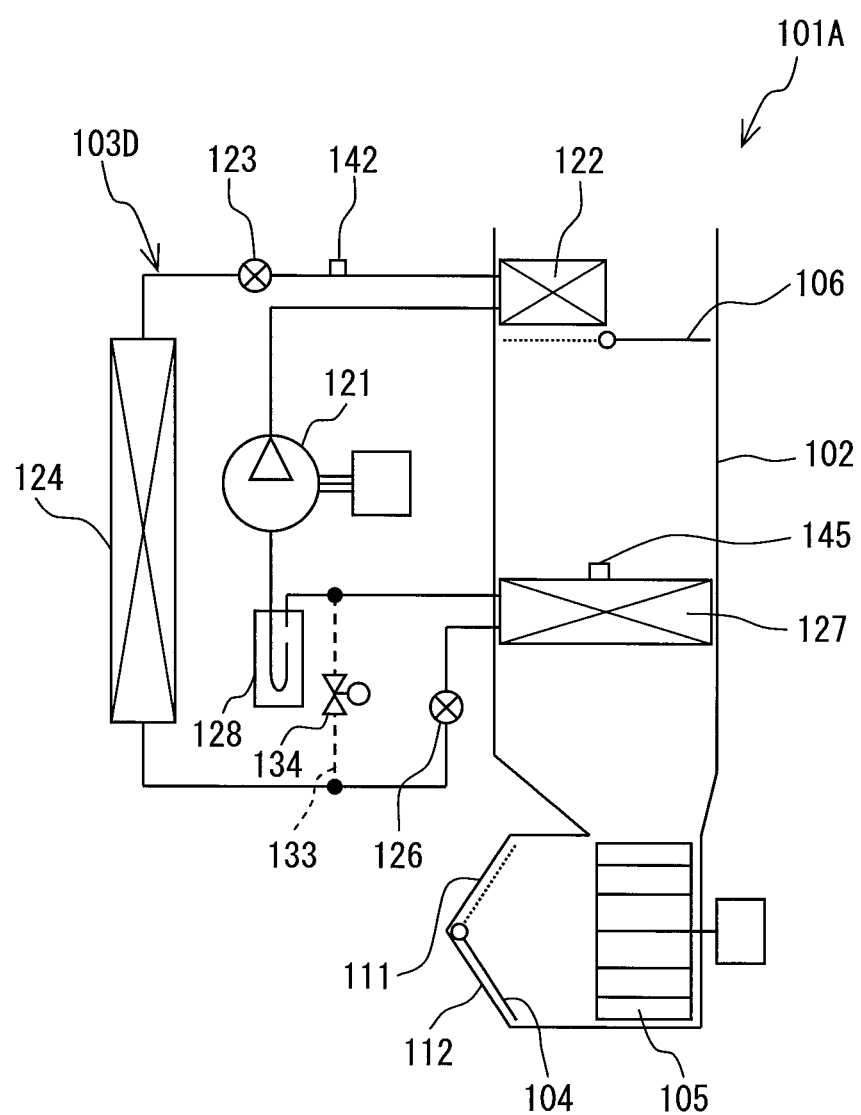
FIG. 51 is a schematic diagram to show the vehicular air conditioner at the time of a dehumidifying and heating operation in further another embodiment.

When the dehumidifying and heating operation of step S220 is set by the determination in step S190, the heating variable throttle valve 123 is put to a flow control opening of reducing the pressure of the refrigerant to expand the refrigerant (pressure-reducing and expanding mode) and the heating electromagnetic valve 134 is closed, whereby the refrigerant is circulated as shown by solid line in FIG. 51 and the operation mode of the refrigerant cycle 103D is put to the dehumidifying and heating operation mode. In this regard, at the time of the dehumidifying and heating operation mode, in the case where the air heating capacity in the condenser 122 can be small, the cooling variable throttle valve 126 is put to a flow control opening of reducing the pressure of the refrigerant to expand the refrigerant (pressure-reducing and expanding mode).

In contrast to this, in the case where the air heating capacity in the condenser 122 needs to be large, the cooling variable throttle valve 126 is put to the fully open mode. Further, in any case, the air mixing door 106 opens the air inlet portion of the condenser 122. In this way, the air, which is cooled in the evaporator 127 and is dehumidified because water vapor included is condensed and removed, is reheated by the condensation of the refrigerant in the condenser 122 and is blown off into the vehicle compartment.

The amount of heat absorbed from the air passing in the air duct 102 in the evaporator 127 and the amount of heat of an increase in enthalpy by the adiabatic compression of the refrigerant by the compressor 121 (the amount of heat increased by the compression power) are radiated to the air passing in the air duct 102 by the condenser 122. The difference between the total sum of the amount of heat absorbed in the condenser 122 and the amount of heat of an increase in enthalpy by the compressor 121 and the amount of heat radiated in the condenser 122 is compensated by the amount of heat absorbed or the amount of heat radiated in the outdoor heat exchanger 124.

In the refrigerant cycle 103D of the present embodiment, in the case where the total sum of the amount of heat absorbed in the evaporator 127, the amount of heat absorbed in the outdoor heat exchanger 124, and the amount of heat of an increase in enthalpy by the compressor 121 is deficient for the amount of heat radiated in the condenser 122, the opening of the cooling variable throttle valve 126 is held set maximum and the opening of the heating variable throttle valve 123 is increased regardless of a cycle efficiency. When only this control is performed, the refrigerant evaporation pressure is increased in the outdoor heat exchanger 124 and the evaporator 127. However, in the present embodiment, the number of revolutions (the amount of discharge) of the compressor 121 is controlled in such a way as to keep the heat absorbing capacity (dehumidifying capacity) in the evaporator 127. That is, an increase in the refrigerant evaporation pressure in the outdoor heat exchanger 124 and the evaporator 127 is inhibited by an increase in the number of revolutions of the compressor 121 and hence the refrigerant evaporation pressure can be adjusted at a constant value.

Figure 53:
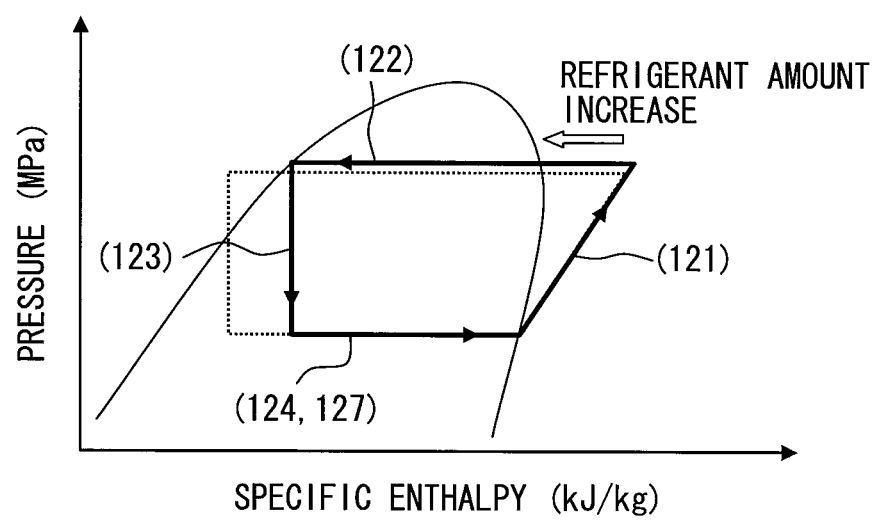
FIG. 53 is a Mollier diagram to illustrate an effect of enhancing a heating capacity in a condenser in further another embodiment.

In this way, the rotation speed (the number of revolutions) of the compressor 121 is increased with the suction pressure (refrigerant evaporation pressure) of the compressor 121 held at a constant value, so that the amount of circulation flow of the refrigerant of the refrigerant cycle 103D can be increased. Thus, as shown in FIG. 53, when the opening of the heating variable throttle valve 123 is increased, enthalpy at the outlet of the condenser 122 is increased and a change in enthalpy in the condenser 122 is decreased. However, since the heating capacity in the condenser 122 is the product of a change in enthalpy and the amount of flow of the refrigerant, when the amount of work of the compressor 121 is increased to increase the amount of flow of the refrigerant, the amount of heat deficient for the amount of heat radiated in the condenser 122 can be ensured.

As described by the use of FIG. 52, the ECU 110 controls the amount of discharge of the refrigerant of the compressor 121 in such a way that the value of the evaporator temperature TE of a physical amount related to the heat absorbing capacity of the evaporator 127 becomes equal to the target evaporator temperature TEO of a heat-absorption target value, and the ECU 110 controls the amount of pressure reduction of the refrigerant of the heating variable throttle valve 123 in such a way that the value of the condenser temperature TAV of a physical amount related to the heating capacity of the condenser 122 becomes equal to the target blowoff temperature TAO of a heating target value.

In this way, the amount of discharge of the refrigerant of the compressor 121 and the amount of pressure reduction of the refrigerant of the heating variable throttle valve 123 can be controlled in such a way that even if the evaporator temperature TE is made equal to, for example, the target evaporator temperature TEO (for example, 1° C.) having a limitation for preventing the evaporator 127 from being frosted, the temperature TAV of the condenser 122 becomes equal to the target blowoff temperature TAO capable of sufficiently heating the air passing in the air duct 102.

In other words, when the amount of flow of refrigerant circulated in the refrigerant cycle is determined by a limitation of the heat absorbing capacity of the evaporator 127, in the case where even if the cooling variable throttle valve 126 is fully opened and the heat absorbing capacity of the outdoor heat exchanger 124 is maximized, the heating capacity in the condenser 122 is deficient, regardless of a cycle operation efficiency, a cycle state shown by solid lines in a pressure vs. enthalpy diagram in FIG. 53 can be formed and the amount of flow of refrigerant circulated in the refrigerant cycle can be increased by increasing the amount of work of the compressor 121.

According to the refrigerant cycle 103D of the present embodiment, even in the case where even if the heat absorbing capacity of the outdoor heat exchanger 124 is maximized, the heating capacity in the condenser 122 is deficient, when the opening of the heating variable throttle valve 123 is increased and the amount of work of compressing and discharging the refrigerant by the compressor 121 is increased to increase the amount of circulation flow of the refrigerant, the value of the condenser temperature TAV of a physical amount related to the heating capacity of the condenser 122 can be made equal to the target blowoff temperature TAO of a heating target value capable of sufficiently heating the air passing in the air duct 102. In this way, even if the heat absorbing capacity of the evaporator 127 has a limitation, a sufficient capacity of heating an external fluid can be acquired in the condenser 122.

Further, both of the adjustment of the amount of discharge of the refrigerant of the compressor 121 such that the evaporator temperature TE is made equal to the target evaporator temperature TEO and the adjustment of the amount of pressure reduction of the refrigerant of the heating variable throttle valve 123 such that the condenser temperature TAV is made equal to the target blowoff temperature TAO are performed by the ECU 110 of the control part. Thus, the adjustment accuracy of the amount of discharge of the refrigerant of the compressor 121 and the adjustment accuracy of the amount of pressure reduction of the refrigerant of the suction refrigerant throttle valve 150 can be easily ensured.

Next, an embodiment will be described on the basis of FIG. 54. As compared with the embodiment described above, in the present embodiment, the ECU 110 controls the amount of discharge of the refrigerant of the compressor 121 in such a way that the value of the condenser temperature TAV of a physical amount related to the heating capacity of the condenser 122 becomes equal to the target blowoff temperature TAO of a heating target value, and the ECU 110 controls the amount of pressure reduction of the refrigerant of the heating variable throttle valve 123 in such a way that the value of the evaporator temperature TE of a physical amount related to the heat absorbing capacity of the evaporator 127 becomes equal to the target evaporator temperature TEO of a heat-absorption target value.

Figure 54:
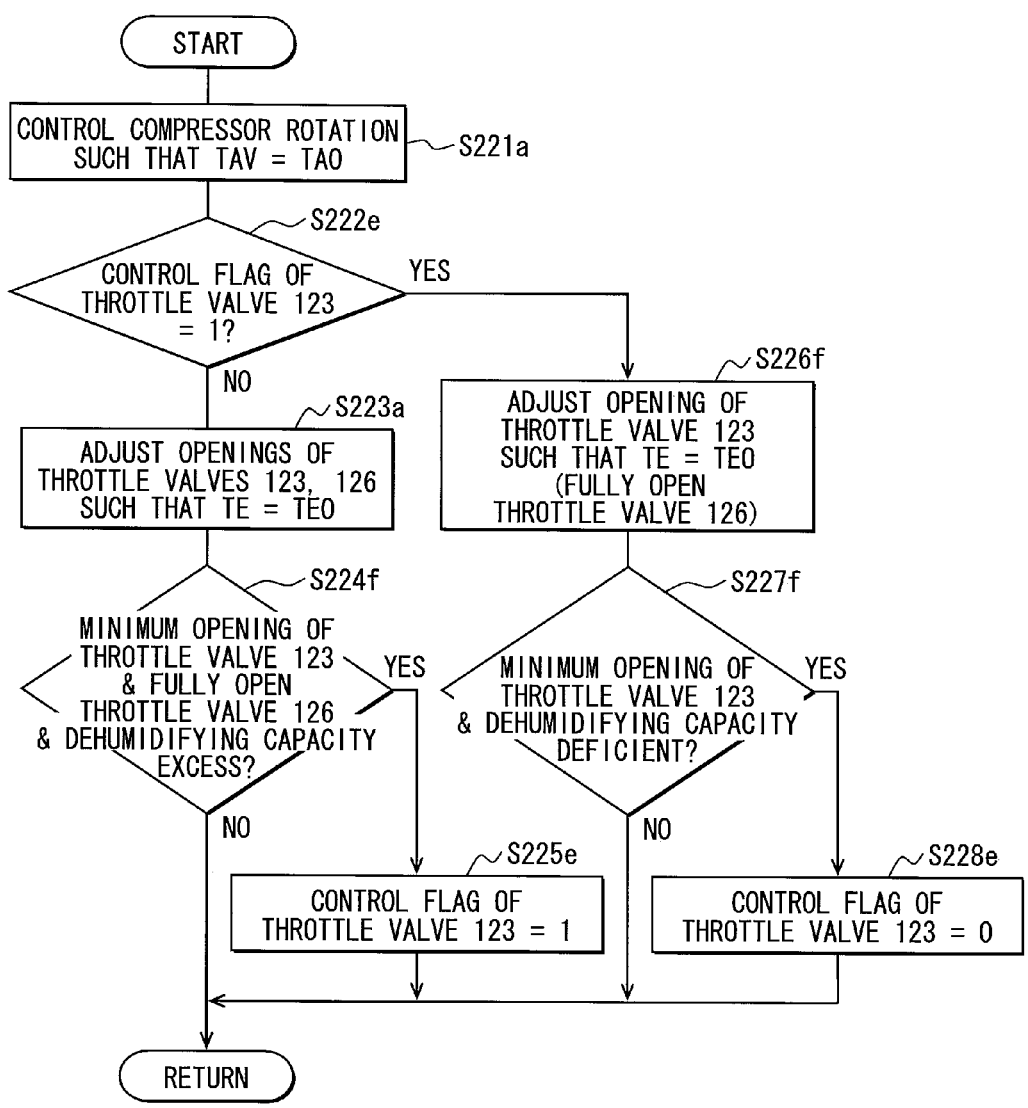
FIG. 54 is a flow chart to show a flow of control of step S220 of FIG. 27 in further another embodiment.

As shown in FIG. 54, in the present embodiment, when step S220 shown in FIG. 27 is executed, first, the rotation control of the compressor 121 (that is, the control of the amount of discharge of the refrigerant) is performed in such a way that the condenser temperature TAV obtained on the basis of the refrigerant pressure detected by the refrigerant pressure sensor 142 becomes equal (as close as possible) to the target blowoff temperature TAO (step S221a).

After step S221a is executed, next, it is determined whether or not the control flag of the heating variable throttle valve 123 is set at 1 (step S222e). That the control flag of the discharge refrigerant throttle valve 154 is set at 1 means that the opening of the heating variable throttle valve 123 is controlled to an opening of increasing the amount of flow of the refrigerant regardless of the cycle efficiency of the refrigerant cycle 103D in such a way that the evaporator temperature TE detected by the evaporator temperature sensor 145 becomes equal (as close as possible) to the target evaporator temperature TEO calculated in step S180. On the other hand, that the control flag of the heating variable throttle valve 123 is set at 0 means that the heating variable throttle valve 123 is set to an opening of optimizing the cycle efficiency of the refrigerant cycle 103D.

In the case where it is determined in step S222e that the control flag of the heating variable throttle valve 123 is not set at 1, that is, the control flag is set at 0, the opening of the heating variable throttle valve 123 and the opening of the cooling variable throttle valve 126 are adjusted in such a way that the evaporator temperature TE detected by the evaporator temperature sensor 145 becomes equal (as close as possible) to the target evaporator temperature TEO calculated in step S180 (step S223a).

As the result of the execution of step S223a, the heating variable throttle valve 123 is throttled and the cooling variable throttle valve 126 is opened, thereby reaching a fully opened state. It is determined whether or not even if the heating variable throttle valve 123 is put to a minimum opening and the cooling variable throttle valve 126 is put into the fully opened state, a dehumidifying capacity (heat absorbing capacity) in the evaporator 127 is excess (step S224f). In step S224f, it is determined whether or not even if step S223a is executed to control the opening of the heating variable throttle valve 123 and the opening of cooling variable throttle valve 126 in such a way that the evaporator temperature TE becomes equal to the target evaporator temperature TEO, the evaporator temperature TE cannot be increased to the target evaporator temperature TEO and the dehumidifying capacity is excess as shown in FIG. 36.

In the case where it is determined in step S224f that even if the heating variable throttle valve 123 is put to the minimum opening and the cooling variable throttle valve 126 is not put into the fully opened state, the dehumidifying capacity in the evaporator 127 is not excess, or that if the heating variable throttle valve 123 is put to the minimum opening and the cooling variable throttle valve 126 is put into the fully opened state, the dehumidifying capacity in the evaporator 127 is not excess, the control flag of the heating variable throttle valve 123 is held set at 0 and the control processing is returned (proceeds to step S230 shown in FIG. 27).

In the case where it is determined in step S224f that even if heating variable throttle valve 123 is put to the minimum opening and the cooling variable throttle valve 126 is put into the fully opened state, the dehumidifying capacity in the evaporator 127 is excess, that is, when the outdoor heat exchanger 124 is made to function as an evaporator (heat absorbing device) that is nearly equal in the refrigerant pressure to the evaporator 127 and the heat absorbing capacity of the outdoor heat exchanger 124 is maximized, the dehumidifying capacity in the evaporator 127 is excess, the control flag of the heating variable throttle valve 123 is set at 1 (step S225e) and the control processing is returned (proceeds to step S230 shown in FIG. 27).

In the case where it is determined in step S222e that the control flag of the heating variable throttle valve 123 is set at 1, the opening of the heating variable throttle valve 123 is adjusted in such a way that the evaporator temperature TE becomes equal (as close as possible) to the target evaporator temperature TEO (step S226f). Here, at this time, the cooling variable throttle valve 126 is put into the fully opened state.

As the result of the execution of step S226f, the opening of the heating variable throttle valve 123 reaches a minimum state. It is determined whether or not even if the cooling variable throttle valve 126 is put into the fully opened state and the heating variable throttle valve 123 is put to the minimum opening, the dehumidifying capacity in the evaporator 127 is deficient (step S227f). In step S227d, it is determined whether or not even if step S226f is executed to control the opening of the heating variable throttle valve 123 and the opening of the cooling variable throttle valve 126 in such a way that the evaporator temperature TE becomes equal to the target evaporator temperature TEO, the evaporator temperature TE cannot be decreased to the target evaporator temperature TEO and the dehumidifying capacity is deficient as shown in FIG. 36.

In the case where it is determined in step S227f that even if the heating variable throttle valve 123 is not put to the minimum opening, the dehumidifying capacity in the evaporator 127 is not deficient, or that if the heating variable throttle valve 123 is put to the minimum opening, the dehumidifying capacity in the evaporator 127 is not deficient, the control flag of the heating variable throttle valve 123 is held set at 1 and the control processing is returned (proceeds to step S230 shown in FIG. 27).

In the case where it is determined in step S227f that even if the heating variable throttle valve 123 is put into the minimum open state, the dehumidifying capacity in the evaporator 127 is deficient, the control flag of the heating variable throttle valve 123 is set to 0 (step S228e) and the control processing is returned (proceeds to step S230 shown in FIG. 27).

According to the construction and the action of the present embodiment, the ECU 110 controls the amount of discharge of the refrigerant of the compressor 121 in such a way that the value of the condenser temperature TAV of a physical amount related to the heating capacity of the condenser 122 becomes equal to the target blowoff temperature TAO of a heating target value, and the ECU 110 controls the amount of pressure reduction of the refrigerant of the heating variable throttle valve 123 in such a way that the value of the evaporator temperature TE of a physical amount related to the heat absorbing capacity of the evaporator 127 becomes equal to the target evaporator temperature TEO of a heat-absorption target value.

Also in this embodiment, as in the case of the embodiment described above, the amount of discharge of the refrigerant of the compressor 121 and the amount of pressure reduction of the refrigerant of the heating variable throttle valve 123 can be controlled in such a way that even if the evaporator temperature TE is made equal to, for example, the target evaporator temperature TEO (for example, 1° C.) having a limitation for preventing the evaporator 127 from being frosted, the temperature TAV of the condenser 122 becomes equal to the target blowoff temperature TAO capable of sufficiently heating the air passing in the air duct 102.

When the amount of flow of refrigerant circulated in the refrigerant cycle is determined by a limitation of the heat absorbing capacity of the evaporator 127, in the case where even if the cooling variable throttle valve 126 is fully opened and the heat absorbing capacity of the outdoor heat exchanger 124 is maximized, the heating capacity in the condenser 122 is deficient, regardless of a cycle operation efficiency, a cycle state shown by solid lines in a pressure vs. enthalpy diagram in FIG. 53 can be formed and the amount of flow of the refrigerant circulated in the refrigerant cycle can be increased by increasing the amount of work of the compressor 121 and hence the same effects as in the embodiment described above can be produced.

Further, the refrigerant cycle 103D does not need to be provided with the suction refrigerant throttle valve for reducing the pressure of the refrigerant sucked by the compressor 121 and the discharge refrigerant throttle valve for reducing the pressure of the refrigerant discharged by the compressor 121, so that the construction of the refrigerant cycle 103D can be simplified.

The refrigerant cycle 103D of the two embodiments described above may include the following examples.

The refrigerant cycle 103D includes: a compressor for sucking, compressing, and discharging a refrigerant (to which the compressor 121 corresponds); a refrigerant radiator for radiating heat of the refrigerant discharged from the compressor to heat an external fluid (to which the condenser 122 corresponds); a pressure reducing part for reducing the pressure of the refrigerant flowing out of the refrigerant radiator to expand the refrigerant (to which the heating variable throttle valve 123 corresponds); and an evaporator for evaporating the refrigerant reduced in pressure by the pressure reducing part to absorb heat from the external fluid (to which the evaporator 127 corresponds). One of the amount of discharge of the refrigerant of the compressor and the amount of pressure reduction of the refrigerant of the pressure reducing part is adjusted in such a way that the heating capacity of the refrigerant radiator or the value of a physical amount related to the heating capacity (to which TAV corresponds) becomes equal to a heating target value (to which TAO corresponds), and the other of the amount of discharge of the refrigerant of the compressor and the amount of pressure reduction of the refrigerant of the second pressure reducing part is adjusted in such a way that the heat absorbing capacity of the evaporator or the value of a physical amount related to the heat absorbing capacity (to which TE corresponds) becomes equal to a heat-absorption target value (to which TEO corresponds).

In this case, the amount of discharge of the refrigerant of the compressor and the amount of pressure reduction of the refrigerant of the pressure reducing part can be adjusted in such a way that when the heat absorbing capacity of the evaporator or the value of a physical amount related to the heat absorbing capacity is made equal to a heat-absorption target value having a limitation, the heating capacity of the refrigerant radiator or the value of a physical amount related to the heating capacity becomes equal to a heating target value capable of sufficiently heating the external fluid. In the case where the heating capacity of the refrigerant radiator is deficient in the amount of flow of the refrigerant circulated in the refrigerant cycle, which is determined by an operation efficiency of the refrigerant cycle and a limitation of the heat absorbing capacity of the evaporator, the amount of pressure reduction of the refrigerant of the pressure reducing part is deceased and the amount of work for compressing and discharging the refrigerant by the compressor is increased to increase the amount of flow of the refrigerant circulated in the refrigerant cycle. In this way, the heating capacity of the refrigerant radiator or the value of a physical amount related to the heating capacity can be made equal to the heating target value capable of sufficiently heating the external fluid. In this way, even if the heat absorbing capacity of the evaporator has a limitation, a sufficient heating capacity of heating the external fluid can be acquired in the refrigerant radiator.

In the 12th to 15th embodiments and the other four modes in the other embodiments, the condenser temperature TAV of the temperature of the refrigerant radiator is used as the physical amount related to the heating capacity of the refrigerant radiator and the target blowoff temperature TAO is used as the heating target value, but the present invention is not always limited to these. Other physical amount related to the heating capacity of the refrigerant radiator and a heating target value corresponding to the other physical amount may be used, and the heating capacity of the refrigerant radiator (for example, the product of the amount of change in enthalpy and the amount of flow of the refrigerant) and a heating target value corresponding to the heating capacity may be used.

Further, the evaporator temperature TE of the evaporator temperature is used as a physical amount related to the heat absorbing capacity of the evaporator and the target evaporator temperature TEO is used as the target value of heat absorption, but the present invention is not always limited to these. Other physical amount related to the heat absorbing capacity of the evaporator and a heat-absorption target value corresponding to the other physical amount may be used, and the heat absorbing capacity of the evaporator (for example, the product of the amount of change in enthalpy and the amount of flow of the refrigerant) and a heat-absorption target value corresponding to the heat absorbing capacity may be used.

Still further, in the respective embodiments described above, the refrigerant radiator is used as the condenser 122, but the present invention is not always limited to these. For example, the present invention may be applied to a so-called supercritical refrigerant cycle device in which the pressure of the refrigerant discharged from the compressor becomes equal to or higher than a supercritical pressure and the refrigerant radiator may be a gas cooler.

Still further, in the respective embodiments described above, each of the refrigerant cycles 103, 103A, 103B, 103C, 103D is provided with the outdoor heat exchanger 124 in addition to the condenser 122 and the evaporator 127, but a refrigerant cycle device having no outdoor heat exchanger may be employed.

Still further, in the respective embodiments described above, the evaporator 127 is arranged on the upstream side of the air flow of the condenser 122. That is, the external fluid of the condenser 122 and the evaporator 127 is the same fluid (air), but the present invention is not always limited to these. The external fluid may be other fluid, and the external fluid of the condenser 122 may be different from the external fluid of the evaporator 127.

Still further, in the respective embodiments described above have been described examples in which the refrigerant cycles 103, 103A, 103B, 103C, 103D are applied to the vehicular air conditioner, but the present invention is not always limited to these. A device to which the refrigerant cycle 103 or the like is applied may be a refrigerant cycle device of an air conditioner designed for other than the vehicle and may be a refrigerant cycle device used for other than the air conditioner.

What is claimed is:

1. A refrigerant cycle device comprising:
a compressor configured to suck, compress, and discharge refrigerant;

a refrigerant radiator disposed to radiate heat of the refrigerant discharged from the compressor to thereby heat an external fluid;

a first pressure reducing part disposed to reduce pressure of the refrigerant flowing out of the refrigerant radiator to thereby expand the refrigerant;

an evaporator disposed to evaporate the refrigerant reduced in pressure by the first pressure reducing part to thereby absorb heat from the external fluid; and a second pressure reducing part that reduces pressure of the refrigerant evaporated by the evaporator and to be sucked by the compressor and that is configured to vary an amount of pressure reduction, wherein one of an amount of the refrigerant discharged from the compressor and an amount of pressure reduction of the refrigerant of the second pressure reducing part is adjusted in such a way that a heating capacity of the refrigerant radiator or a value of a physical amount related to the heating capacity becomes equal to a heating target value, and the other of the amount of the refrigerant discharged from the compressor and the amount of pressure reduction of the refrigerant of the second pressure reducing part is adjusted in such a way that a heat absorbing capacity of the evaporator or a value of a physical amount related to the heat absorbing capacity becomes equal to a heat-absorption target value; the refrigerant cycle device further comprising:

a control part for controlling the amount of discharge of the refrigerant of the compressor on the basis of the heating capacity or the value of the physical amount related to the heating capacity, wherein the second pressure reducing part is a constant-pressure valve that prevents a refrigerant pressure in the evaporator from becoming less than a specified pressure even if pressure of the refrigerant sucked by the compressor becomes lower, the control part controls the amount of discharge of the refrigerant in such a way that the heating capacity or the value of the physical amount related to the heating capacity becomes equal to the heating target value, and the second pressure reducing part adjusts the amount of pressure reduction of the refrigerant in such a way that the heat absorbing capacity or the physical amount related to the heat absorbing capacity becomes equal to the heat-absorption target value.

2. The refrigerant cycle device as in claim 1, wherein the refrigerant radiator and the evaporator are arranged in a duct in such a way that the evaporator is arranged on a more upstream side of a flow of the air than the refrigerant radiator, the evaporator is configured to absorb heat from the air to dehumidify the air, and the refrigerant radiator is configured to heat the air flowing from the evaporator.

3. A refrigerant cycle device comprising:

a compressor configured to suck, compress, and discharge refrigerant;

a refrigerant radiator disposed to radiate heat of the refrigerant discharged from the compressor to thereby heat an external fluid;

a first pressure reducing part disposed to reduce pressure of the refrigerant flowing out of the refrigerant radiator to thereby expand the refrigerant;

an evaporator disposed to evaporate the refrigerant reduced in pressure by the first pressure reducing part to thereby absorb heat from the external fluid; and a second pressure reducing part that reduces pressure of the refrigerant evaporated by the evaporator and to be sucked by the compressor and that is configured to vary an amount of pressure reduction, wherein one of an amount of the refrigerant discharged from the compressor and an amount of pressure reduction of the refrigerant of the second pressure reducing part is adjusted in such a way that a heating capacity of the refrigerant radiator or a value of a physical amount related to the heating capacity becomes equal to a heating target value, and the other of the amount of the refrigerant discharged from the compressor and the amount of pressure reduction of the refrigerant of the second pressure reducing part is adjusted in such a way that a heat absorbing capacity of the evaporator or a value of a physical amount related to the heat absorbing capacity becomes equal to a heat-absorption target value; the refrigerant cycle device further comprising:

a control part for controlling the amount of discharge of the refrigerant of the compressor and the amount of pressure reduction of the refrigerant of the second pressure reducing part on the basis of the heating capacity or the value of the physical amount related to the heating capacity and the heat absorbing capacity or the value of physical amount related to the heat absorbing capacity, wherein the control part controls one of the amount of discharge of the refrigerant and the amount of pressure reduction of the refrigerant in such a way that the heating capacity or the value of the physical amount related to the heating capacity becomes equal to the heating target value, and the control part controls the other of the amount of discharge of the refrigerant and the amount of pressure reduction of the refrigerant in such a way that the heat absorbing capacity or the value of the physical amount related to the heat absorbing capacity becomes equal to the heat-absorption target value.

4. The refrigerant cycle device as in claim 3, wherein the second pressure reducing part includes a fixed throttle valve having a throttle fixed, and an opening/closing valve that is arranged in parallel to the fixed throttle valve and that is switched between an opened state and a closed state, and the control part switches between the opened state and the closed state of the opening/closing valve to control the amount of pressure reduction of the refrigerant.

* * * * *